(12) United States Patent
Krishnamurthy et al.

(10) Patent No.: US 12,131,516 B2
(45) Date of Patent: Oct. 29, 2024

(54) REDUCING A SEARCH SPACE FOR ITEM IDENTIFICATION USING MACHINE LEARNING

(71) Applicant: 7-Eleven, Inc., Irving, TX (US)

(72) Inventors: Sailesh Bharathwaaj Krishnamurthy, Irving, TX (US); Sumedh Vilas Datar, Grapevine, TX (US); Crystal Maung, Dallas, TX (US); Tejas Pradip Rode, Coppell, TX (US); Shantanu Yadunath Thakurdesai, Denton, TX (US); Shahmeer Ali Mirza, Celina, TX (US)

(73) Assignee: 7-ELEVEN, INC., Irving, TX (US)

( * ) Notice: Subject to any disclaimer, the term of this patent is extended or adjusted under 35 U.S.C. 154(b) by 538 days.

(21) Appl. No.: 17/455,906

(22) Filed: Nov. 19, 2021

(65) Prior Publication Data

US 2022/0414374 A1    Dec. 29, 2022

Related U.S. Application Data

(63) Continuation-in-part of application No. 17/362,261, filed on Jun. 29, 2021, now Pat. No. 11,887,332.

(51) Int. Cl.
*G06V 10/56* (2022.01)
*G01G 19/414* (2006.01)
(Continued)

(52) U.S. Cl.
CPC .......... *G06V 10/56* (2022.01); *G01G 19/414* (2013.01); *G06F 18/21* (2023.01); *G06F 18/22* (2023.01);
(Continued)

(58) Field of Classification Search
CPC ........ G06V 10/56; G06V 20/00; G06V 20/52; G01G 19/414; G01G 21/22; G06F 18/21;
(Continued)

(56) References Cited

U.S. PATENT DOCUMENTS 10,133,933 B1 * 11/2018 Fisher ..................... G06V 20/41
11,790,651 B2 * 10/2023 Datar ...................... G06V 20/41
(Continued)

FOREIGN PATENT DOCUMENTS

CN          109330284 A  *  2/2019  ............. A47F 10/00

OTHER PUBLICATIONS

U.S. Appl. No. 17/455,907—Properly updated and identified herewith this communication as indicated on the PTO Form 1449.*
(Continued)

*Primary Examiner* — Mia M Thomas
(74) *Attorney, Agent, or Firm* — Baker Botts L.L.P.

(57) ABSTRACT

A device configured to receive a first encoded vector and receive one or more feature descriptors for a first object. The device is further configured to remove one or more encoded vectors from an encoded vector library that are not associated with the one or more feature descriptors and to identify a second encoded vector in the encoded vector library that most closely matches the first encoded vector based on the numerical values within the first encoded vector. The device is further configured to identify a first item identifier in the encoded vector library that is associated with the second encoded vector and to output the first item identifier.

20 Claims, 28 Drawing Sheets

(51) Int. Cl.
*G06F 18/21* (2023.01)
*G06F 18/22* (2023.01)
*G06F 18/24* (2023.01)
*G06T 7/90* (2017.01)
*G06V 20/00* (2022.01)
*G06N 3/08* (2023.01)

(52) U.S. Cl.
CPC ............. *G06F 18/24* (2023.01); *G06T 7/90* (2017.01); *G06V 20/00* (2022.01); *G06N 3/08* (2013.01); *G06T 2207/10024* (2013.01)

(58) Field of Classification Search
CPC . G06F 18/22; G06F 18/24; G06T 7/90; G06T 2207/20056; G06T 7/254; G06T 7/60; G06T 2207/20076; G06T 7/73; G06T 7/74; G06T 2207/10016; G06T 2207/20084; G06T 2207/30242; G06N 3/08; G06N 3/0464
See application file for complete search history.

(56) References Cited

U.S. PATENT DOCUMENTS

| | | | |
|---|---|---|---|
| 11,960,569 B2* | 4/2024 | Datar | G06V 20/64 |
| 2017/0161987 A1* | 6/2017 | Bulzacki | G07F 17/3241 |
| 2019/0108396 A1* | 4/2019 | Dal Mutto | G06V 20/52 |
| 2021/0295491 A1* | 9/2021 | Hyatt | G06V 10/25 |
| 2021/0326544 A1* | 10/2021 | Jackson | G06K 7/10445 |
| 2021/0358042 A1* | 11/2021 | Wang | G06N 3/045 |
| 2022/0058381 A1* | 2/2022 | Ionescu | G06V 10/25 |
| 2022/0067436 A1* | 3/2022 | Larson | H04N 23/90 |
| 2022/0299493 A1* | 9/2022 | Pattison | G01N 21/3563 |
| 2022/0343308 A1* | 10/2022 | Yang | G07G 1/0054 |
| 2022/0414373 A1* | 12/2022 | Krishnamurthy | G06F 18/214 |
| 2022/0414375 A1* | 12/2022 | Krishnamurthy | G06N 3/08 |
| 2022/0414378 A1* | 12/2022 | Datar | G06V 20/68 |
| 2022/0414379 A1* | 12/2022 | Krishnamurthy | G06T 7/60 |
| 2022/0414398 A1* | 12/2022 | Krishnamurthy | G06V 10/454 |
| 2022/0414399 A1* | 12/2022 | Datar | G06F 18/2148 |
| 2022/0414899 A1* | 12/2022 | Datar | G06N 20/00 |
| 2022/0414900 A1* | 12/2022 | Datar | G06V 10/25 |
| 2023/0196802 A1* | 6/2023 | Gong | G06V 20/68 382/110 |
| 2023/0207101 A1* | 6/2023 | Vazana | G16H 40/67 705/3 |
| 2023/0252444 A1* | 8/2023 | Bjelcevic | G06V 10/82 705/23 |
| 2023/0252609 A1* | 8/2023 | McDaniel | H04N 13/128 382/103 |
| 2023/0252806 A1* | 8/2023 | DeSantola | G06T 7/70 382/154 |
| 2023/0255556 A1* | 8/2023 | Wexler | A61B 5/7275 600/301 |
| 2023/0325899 A1* | 10/2023 | Gordon | G06T 7/0004 705/26.63 |
| 2023/0359153 A1* | 11/2023 | Bentley | F24C 7/087 |

OTHER PUBLICATIONS

U.S. Appl. No. 17/455,908—Properly updated and identified herewith this communication as indicated on the PTO Form 1449.*
U.S. Appl. No. 17/455,905—Properly updated and identified herewith this communication as indicated on the PTO Form 1449.*
U.S. Appl. No. 17/455,902—Properly updated and identified herewith this communication as indicated on the PTO Form 1449.*
U.S. Appl. No. 17/455,903—Properly updated and identified herewith this communication as indicated on the PTO Form 1449.*
Krishnamurthy, S. B. et al., "Hand Detection Trigger for Item Identification," U.S. Appl. No. 17/455,902, filed Nov. 19, 2021, 108 pages.
Datar, S. V. et al., "Item Location Detection Using Homographies," U.S. Appl. No. 17/455,903, filed Nov. 19, 2021, 109 pages.
Datar, S. V. et al., "Item Identification Using Multiple Cameras," U.S. Appl. No. 17/455,905, filed Nov. 19, 2021, 107 pages.
Krishnamurthy, S. B. et al., "Image Cropping Using Depth Information," U.S. Appl. No. 17/455,907, filed Nov. 19, 2021, 108 pages.
Maung, C. et al., "Determining Dimensions of an Item Using Point Cloud Information," U.S. Appl. No. 17/455,908, filed Nov. 19, 2021, 107 pages.

* cited by examiner

REDUCING A SEARCH SPACE FOR ITEM IDENTIFICATION USING MACHINE LEARNING

CROSS-REFERENCE TO RELATED APPLICATIONS

This application is a continuation-in-part of U.S. patent application Ser. No. 17/362,261 filed Jun. 29, 2021, by Sailesh Bharathwaaj Krishnamurthy et al., and entitled "ITEM IDENTIFICATION USING DIGITAL IMAGE PROCESSING," which is incorporated herein by reference.

TECHNICAL FIELD

The present disclosure relates generally to digital image processing, and more specifically to reducing a search space for item identification using machine learning.

BACKGROUND

Identifying and tracking objects within a space poses several technical challenges. For example, Identifying different features of an item that can be used to later identify the item in an image is computationally intensive when the image includes several items. This process may involve identifying an individual item within the image and then comparing the features for an item against every item in a database that may contain thousands of items. In addition to being computationally intensive, this process requires a significant amount of time which means that this process is not compatible with real-time applications. This problem becomes intractable when trying to simultaneously identify and track multiple items.

SUMMARY

The system disclosed in the present application provides a technical solution to the technical problems discussed above by using a combination of cameras and three-dimensional (3D) sensors to identify and track items that are placed on a platform. The disclosed system provides several practical applications and technical advantages which include a process for selecting a combination of cameras on an imaging device to capture images of items that are placed on a platform, identifying the items that are placed on the platform, and assigning the items to a user. Requiring a user to scan or manually identify items creates a bottleneck in the system's ability to quickly identify items. In contrast, the disclosed process is able to identify items from images of the items and assign the items to a user without requiring the user to scan or otherwise identify the items. This process provides a practical application of image detection and tracking by improving the system's ability to quickly identify multiple items. These practical applications not only improve the system's ability to identify items but also improve the underlying network and the devices within the network. For example, this disclosed process allows the system to service a larger number of users by reducing the amount of time that it takes to identify items and assign items to a user, while improving the throughput of image detection processing. In other words, this process improves hardware utilization without requiring additional hardware resources which increases the number of hardware resources that are available for other processes and increases the throughput of the system. Additionally, these technical improvements allow for scaling of the item identification and tracking functionality described herein.

In one embodiment, the item tracking system comprises an item tracking device that is configured to detect a triggering event at a platform of an imaging device. The triggering event may correspond with when a user approaches or interacts with the imaging device by placing items on the platform. The item tracking device is configured to capture a depth image of items on the platform using a 3D sensor and to determine an object pose for each item on the platform based on the depth image. The pose corresponds with the location and the orientation of an item with respect to the platform. The item tracking device is further configured to identify one or more cameras from among a plurality of cameras on the imaging device based on the object pose for each item on the platform. This process allows the item tracking device to select the cameras with the best views of the items on the platform which reduces the number of images that are processed to identify the items. The item tracking device is further configured to capture images of the items on the platform using the identified cameras and to identify the items within the images based on features of the items. The item tracking device is further configured to identify a user associated with the identified items on the platform, to identify an account that is associated with the user, and to add the items to the account that is associated with the user.

In another embodiment, the item tracking system comprises an item tracking device that is configured to capture a first overhead depth image of the platform using a 3D sensor at a first time instance and a second overhead depth image of a first object using the 3D sensor at a second time instance. The item tracking device is further configured to determine that a first portion of the first object is within a region-of-interest and a second portion of the first object is outside the region-of-interest in the second overhead depth image. The item tracking device is further configured to capture a third overhead depth image of a second object placed on the platform using the 3D sensor at a third time instance. The item tracking device is further configured to capture a first image of the second object using a camera in response to determining that the first object is outside of the region-of-interest and the second object is within the region-of-interest for the platform.

In another embodiment, the item tracking system comprises an item tracking device that is configured to identify a first pixel location within a first plurality of pixels corresponding with an item in a first image and to apply a first homography to the first pixel location to determine a first (x,y) coordinate. The item tracking device is further configured to identify a second pixel location within a second plurality of pixels corresponding with the item in a second image and to apply a second homography to the second pixel location to determine a second (x,y) coordinate. The item tracking device is further configured to determine that the distance between the first (x,y) coordinate and the second (x,y) coordinate is less than or equal to the distance threshold value, to associate the first plurality of pixels and the second plurality of pixels with a cluster for the item, and to output the first plurality of pixels and the second plurality of pixels.

In another embodiment, the item tracking system comprises an item tracking device that is configured to detect a triggering event corresponding with a user placing a first item on the platform, to capture a first image of the first item on the platform using a camera, and to input the first image into a machine learning model that is configured to output a first encoded vector based on features of the first item that are present in the first image. The item tracking device is further configured to identify a second encoded vector in an encoded vector library that most closely matches the first encoded vector and to identify a first item identifier in the encoded vector library that is associated with the second encoded vector. The item tracking device is further configured to identify the user, to identify an account that is associated with the user, and to associate the first item identifier with the account of the user.

In another embodiment, the item tracking system comprises an item tracking device that is configured to receive a first encoded vector and receive one or more feature descriptors for a first object. The item tracking device is further configured to remove one or more encoded vectors from an encoded vector library that are not associated with the one or more feature descriptors and to identify a second encoded vector in the encoded vector library that most closely matches the first encoded vector based on the numerical values within the first encoded vector. The item tracking device is further configured to identify a first item identifier in the encoded vector library that is associated with the second encoded vector and to output the first item identifier.

In another embodiment, the item tracking system comprises an item tracking device that is configured to capture a first image of an item on a platform using a camera and to determine a first number of pixels in the first image that corresponds with the item. The item tracking device is further configured to capture a first depth image of an item on the platform using a three-dimensional (3D) sensor and to determine a second number of pixels within the first depth image that corresponds with the item. The item tracking device is further configured to determine that the difference between the first number of pixels in the first image and the second number of pixels in the first depth image is less than the difference threshold value, to extract the plurality of pixels corresponding with the item in the first image from the first image to generate a second image, and to output the second image.

In another embodiment, the item tracking system comprises an item tracking device that is configured to receive a first point cloud data for a first item, to identify a first plurality of data points for the first object within the first point cloud data, and to extract the first plurality of data points from the first point cloud data. The item tracking device is further configured to receive a second point cloud data for the first item, to identify a second plurality of data points for the first object within the second point cloud data, and to extract a second plurality of data points from the second point cloud data. The item tracking device is further configured to merge the first plurality of data points and the second plurality of data points to generate combined point cloud data and to determine dimensions for the first object based on the combined point cloud data.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
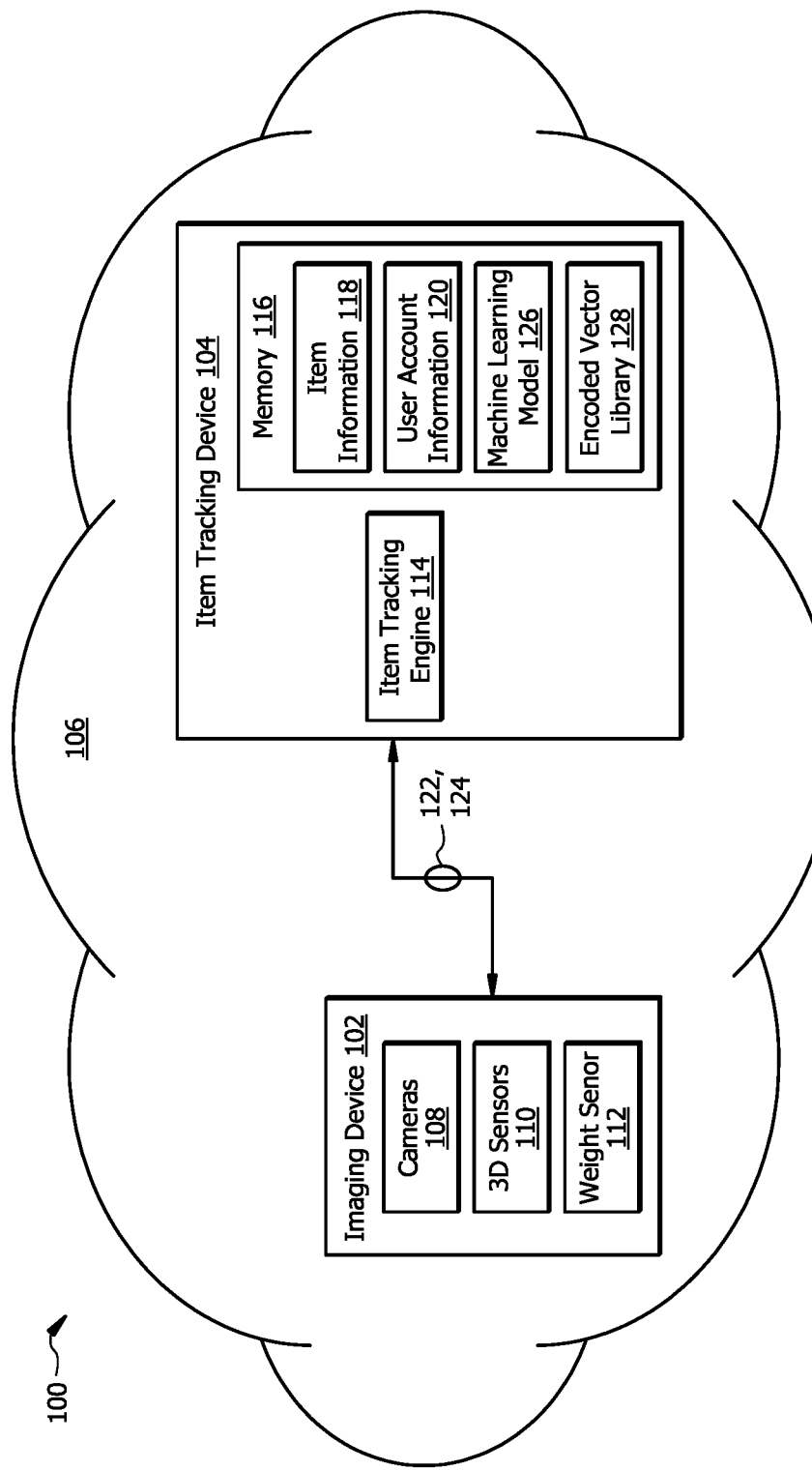
FIG. 1 is a schematic diagram of an embodiment of an item tracking system that is configured to employ digital image processing.

FIG. 1 is a schematic diagram of an embodiment of an item tracking system 100 that is configured to employ digital image processing. The item tracking system 100 may employ digital image processing to identify items 204 that are placed on a platform 202 of an imaging device 102 and to assign the items 204 to a particular user. This process allows the user to obtain items 204 from a space without requiring the user to scan or otherwise manually identify the items 204 they would like to take. In one embodiment, the item tracking system 100 may be installed in a space (e.g. a store) so that shoppers need not engage in the conventional checkout process. Although the example of a store is used in this disclosure, this disclosure contemplates that the item tracking system 100 may be installed and used in any type of physical space (e.g. a room, an office, an outdoor stand, a mall, a supermarket, a convenience store, a pop-up store, a warehouse, a storage center, an amusement park, an airport, an office building, etc.). As an example, the space may be a store that comprises a plurality of items 204 that are available for purchase. The item tracking system 100 may be installed in the store so that shoppers need not engage in the conventional checkout process to purchase items from the store. In this example, the store may be a convenience store or a grocery store. In other examples, the store may not be a physical building, but a physical space or environment where shoppers may shop. For example, the store may be a "grab-and-go" pantry at an airport, a kiosk in an office building, an outdoor market at a park, etc. As another example, the space may be a warehouse or supply room that comprises a plurality of items 204 that are available for a user to use or borrow. In this example, the item tracking system 100 may be installed to allow users to checkout parts or supplies by themselves. In other examples, the item tracking system 100 may be employed for any other suitable application.

In one embodiment, the item tracking system 100 comprises one or more imaging devices 102 and an item tracking device 104 that are in signal communication with each other over a network 106. The network 106 allows communication between and amongst the various components of the item tracking system 100. This disclosure contemplates the network 106 being any suitable network operable to facilitate communication between the components of the item tracking system 100. The network 106 may include any interconnecting system capable of transmitting audio, video, signals, data, messages, or any combination of the preceding. The network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Imaging Devices

The imaging device 102 is generally configured to capture images 122 and depth images 124 of items 204 that are placed on a platform 202 of the imaging device 102. In one embodiment, the imaging device 102 comprises one or more cameras 108, one or more three-dimensional (3D) sensors 110, and one or more weight sensors 112. Additional information about the hardware configuration of the imaging device 102 is described in FIGS. 2A-2C.

The cameras 108 and the 3D sensors 110 are each configured to capture images 122 and depth images 124 of at least a portion of the platform 202. The cameras 108 are configured to capture images 122 (e.g. RGB images) of items 204. Examples of cameras 108 include, but are not limited to, cameras, video cameras, web cameras, and printed circuit board (PCB) cameras. The 3D sensors 110 are configured to capture depth images 124 such as depth maps or point cloud data for items 204. A depth image 124 comprises a plurality of pixels. Each pixel in the depth image 124 comprises depth information identifying a distance between the 3D sensor 110 and a surface in the depth image 124. Examples of 3D sensors 110 include, but are not limited to, depth-sensing cameras, time-of-flight sensors, LiDARs, structured light cameras, or any other suitable type of depth sensing device. In some embodiments, a camera 108 and a 3D sensor 110 be integrated within a single device. In other embodiments, a camera 108 and a 3D sensor 110 be distinct devices.

The weight sensors 112 are configured to measure the weight of items 204 that are placed on the platform 202 of the imaging device 102. For example, a weight sensor 112 may comprise a transducer that converts an input mechanical force (e.g. weight, tension, compression, pressure, or torque) into an output electrical signal (e.g. current or voltage). As the input force increases, the output electrical signal may increase proportionally. The item tracking device 104 is configured to analyze the output electrical signal to determine an overall weight for the items 204 on the weight sensor 112. Examples of weight sensors 112 include, but are not limited to, a piezoelectric load cell or a pressure sensor. For example, a weight sensor 112 may comprise one or more load cells that are configured to communicate electrical signals that indicate a weight experienced by the load cells. For instance, the load cells may produce an electrical current that varies depending on the weight or force experienced by the load cells. The load cells are configured to communicate the produced electrical signals to item tracking device 104 for processing.

Item Tracking Device

Examples of the item tracking device 104 include, but are not limited to, a server, a computer, a laptop, a tablet, or any other suitable type of device. In FIG. 1, the imaging device 102 and the item tracking device 104 are shown as two devices. In some embodiments, the imaging device 102 and the item tracking device 104 may be integrated within a single device. In one embodiment, the item tracking device 104 comprises an item tracking engine 114 and a memory 116. Additional details about the hardware configuration of the item tracking device 104 are described in FIG. 6. The memory 116 is configured to store item information 118, user account information 120, a machine learning model 126, an encoded vector library 128, and/or any other suitable type of data.

In one embodiment, the item tracking engine 114 is generally configured to process images 122 and depth images 124 to identify items 204 that are placed on the platform 202 of the imaging device 102 and to associate the identified items 204 with a user. An example of the item tracking engine 114 in operation is described in more detail below in FIGS. 3 and 7-26.

The item information 118 generally comprises information that is associated with a plurality of items. Examples of item information 118 include, but are not limited to, prices, weights, barcodes, item identifiers, item numbers, features of items, or any other suitable information that is associated with an item 204. Examples of features of an item include, but are not limited to, text, logos, branding, colors, barcodes, patterns, a shape, or any other suitable type of attributes of an item 204. The user account information 120 comprises information for one or more accounts that are associated with a user. Examples of accounts include, but are not limited to, a customer account, an employee account, a school account, a business account, a financial account, a digital cart, or any other suitable type of account. The user account information 120 may be configured to associate user information with accounts that are associated with a user. Examples of user information include, but are not limited to, a name, a phone number, an email address, an identification number, an employee number, an alphanumeric code, reward membership information, or any other suitable type of information that is associated with the user. In some embodiments, the item information 118 and/or the user account information 120 may be stored in a device (e.g. a cloud server) that is external from the item tracking device 104.

Examples of machine learning models 126 include, but are not limited to, a multi-layer perceptron, a recurrent neural network (RNN), an RNN long short-term memory (LSTM), a convolution neural network (CNN), a transformer, or any other suitable type of neural network model. In one embodiment, the machine learning model 126 is generally configured to receive an image 122 as an input and to output an item identifier based on the provided image 122. The machine learning model 126 is trained using supervised learning training data that comprises different images 122 of items 204 with their corresponding labels (e.g. item identifiers). During the training process, the machine learning model 126 determines weights and bias values that allow the machine learning model 126 to map images 122 of items 204 to different item identifiers. Through this process, the machine learning model 126 is able to identify items 204 within an image 122. The item tracking engine 114 may be configured to train the machine learning models 126 using any suitable technique as would be appreciated by one of ordinary skill in the art. In some embodiments, the machine learning model 126 may be stored and/or trained by a device that is external from the item tracking device 104.

Figure 16:
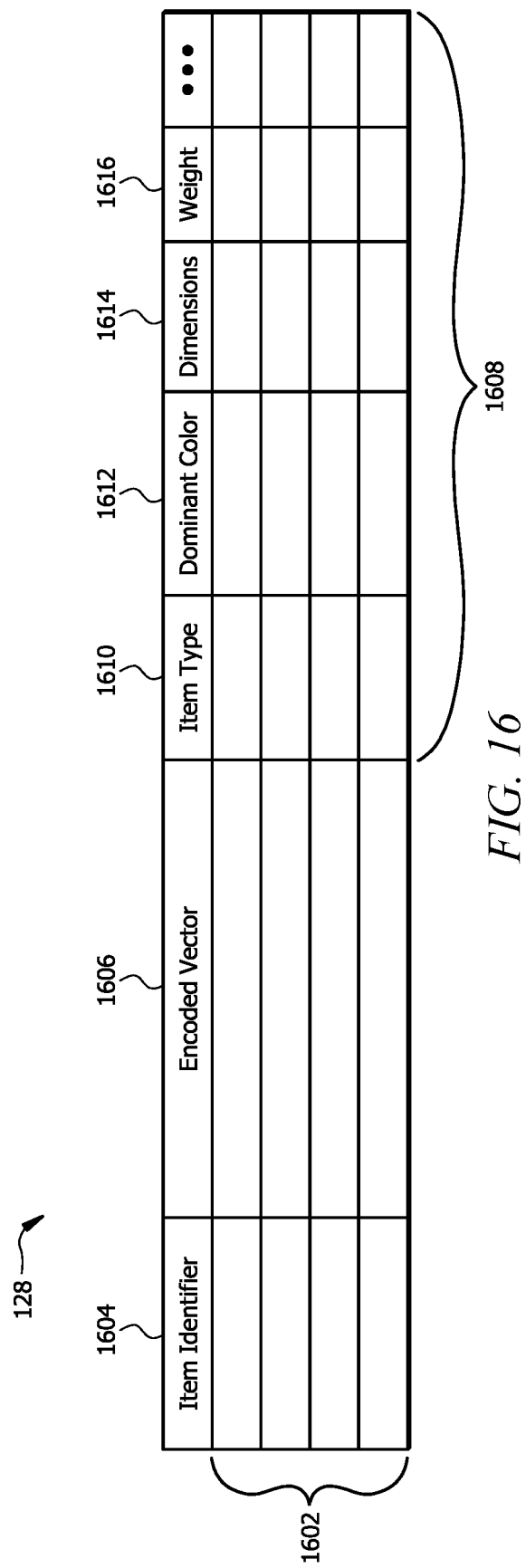
FIG. 16 is an example of an encoded vector library.

The encoded vector library 128 generally comprises information for items 204 that can be identified by the item tracking device 104. An example of an encoded vector library 128 is shown in FIG. 16. In one embodiment, the encoded vector library 128 comprises a plurality of entries 1602. Each entry 1602 corresponds with a different item 204 that can be identified by the item tracking device 104. Referring to FIG. 16 as an example, each entry 1602 may comprise an encoded vector 1606 that is linked with an item identifier 1604 and a plurality of feature descriptors 1608. An encoded vector 1606 comprises an array of numerical values. Each numerical value corresponds with and describes a physical attribute (e.g. item type, size, shape, color, etc.) of an item 204. An encoded vector 1606 may be any suitable length. For example, an encoded vector 1606 may have a size of 1×256, 1×512, 1×1024, or any other suitable length. The item identifier 1604 uniquely identifies an item 204. Examples of item identifiers 1604 include, but are not limited to, a product name, a stock-keeping unit (SKU) number, an alphanumeric code, a graphical code (e.g. a barcode), or any other suitable type of identifier. Each of the feature descriptors 1608 describes a physical characteristic of an item 204. Examples of feature descriptors 1608 include, but are not limited to, an item type 1610, a dominant color 1612, dimensions 1614, weight 1616, or any other suitable type of descriptor that describes the physical attributes of an item 204. An item type 1610 identifies a classification for the item 204. For instance, an item type 1610 may indicate whether an item 204 is a can, a bottle, a box, a fruit, a bag, etc. A dominant color 1612 identifies one or more colors that appear on the surface (e.g. packaging) of an item 204. The dimensions 1614 may identify the length, width, and height of an item 204. In some embodiments, the dimensions 1614 may be listed in ascending order. The weight 1616 identifies the weight of an item 204. The weight 1616 may be shown in pounds, ounces, litters, or any other suitable units.

Hardware Configuration for the Imaging Device

Figure 2A:
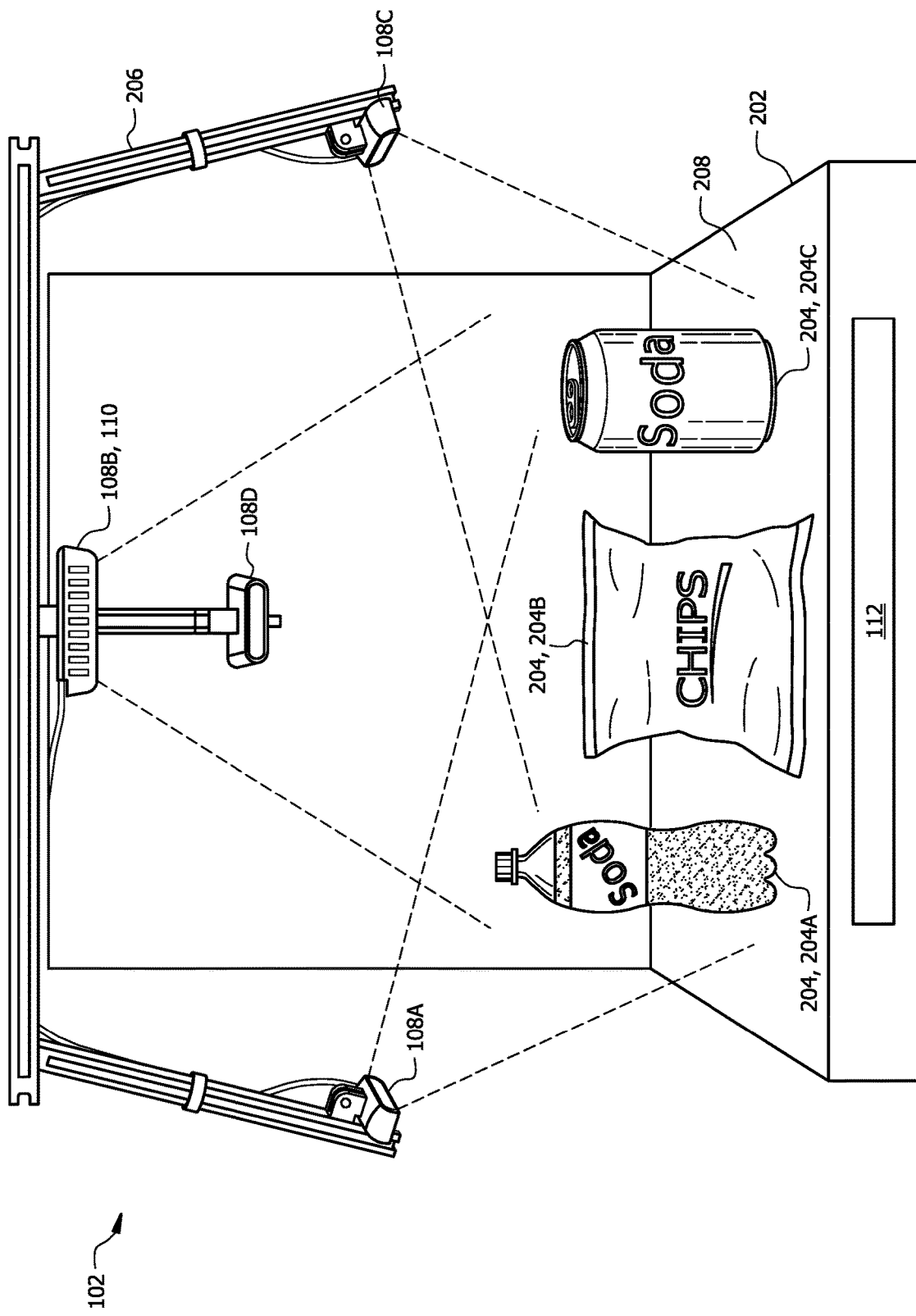
FIG. 2A is a perspective view of an embodiment of an imaging device.

FIG. 2A is a perspective view of an embodiment of an imaging device 102. In this example, the imaging device 102 comprises a platform 202, a frame structure 206, a plurality of cameras 108, a plurality of 3D sensors 110, and a weight sensor 112. The imaging device 102 may be configured as shown in FIG. 2A or in any other suitable configuration. In some embodiments, the imaging device 102 may further comprise additional components including, but not limited to, light, displays, and graphical user interfaces.

The platform 202 comprises a surface 208 that is configured to hold a plurality of items 204. In some embodiments, the platform 202 may be integrated with the weight sensor 112. For example, the platform 202 may be positioned on the weight sensor 112 which allows the weight sensor 112 to measure the weight of items 204 that are placed on the platform 202. As another example, the weight sensor 112 may be disposed within the platform 202 to measure the weight of items 204 that are placed on the platform 202. In some embodiments, at least a portion of the surface 208 may be transparent. In this case, a camera 108 or scanner (e.g. a barcode scanner) may be disposed below the surface 208 of the platform 202 and configured to capture images 122 or scan the bottoms of items 204 placed on the platform 202. For instance, a camera 108 or scanner may be configured to identify and read product labels and/or barcodes (e.g. SKUs) of items 204 through the transparent surface 208 of the platform 202. The platform 202 may be formed of aluminum, metal, wood, plastic, glass, or any other suitable material.

The frame structure 206 is generally configured to support and position cameras 108 and 3D sensors 110. In FIG. 2A, the frame structure 206 is configured to position a first camera 108A and a second camera 108C on the sides of the imaging device 102 with a perspective view of the items 204 on the platform 202. The frame structure 206 is further configured to position a third camera 108D on the back side of the imaging device 102 with a perspective view of the items 204 on the platform 202. In some embodiments, the frame structure 206 may further comprise a fourth camera 108 (not shown) on the front side of the imaging device 102 with a perspective view of items 204 on the platform 202. The frame structure 206 may be configured to use any number and combination of the side cameras 108A and 108C, the back side camera 108D, and the front side camera 108. For example, one or more of the identified cameras 108 may be optional and omitted. A perspective image 122 or depth image 124 is configured to capture the side-facing surfaces of items 204 placed on the platform 202. The frame structure 206 is further configured to position a third camera 108B and a 3D sensor 110 with a top view or overhead view of the items 204 on the platform 202. An overhead image 122 or depth image 124 is configured to capture upward-facing surfaces of items 204 placed on the platform 202. In other examples, the frame structure 206 may be configured to support and position any other suitable number and combination of cameras 108 and 3D sensors 110. The frame structure 206 may be formed of aluminum, metal, wood, plastic, or any other suitable material.

Figure 2B:
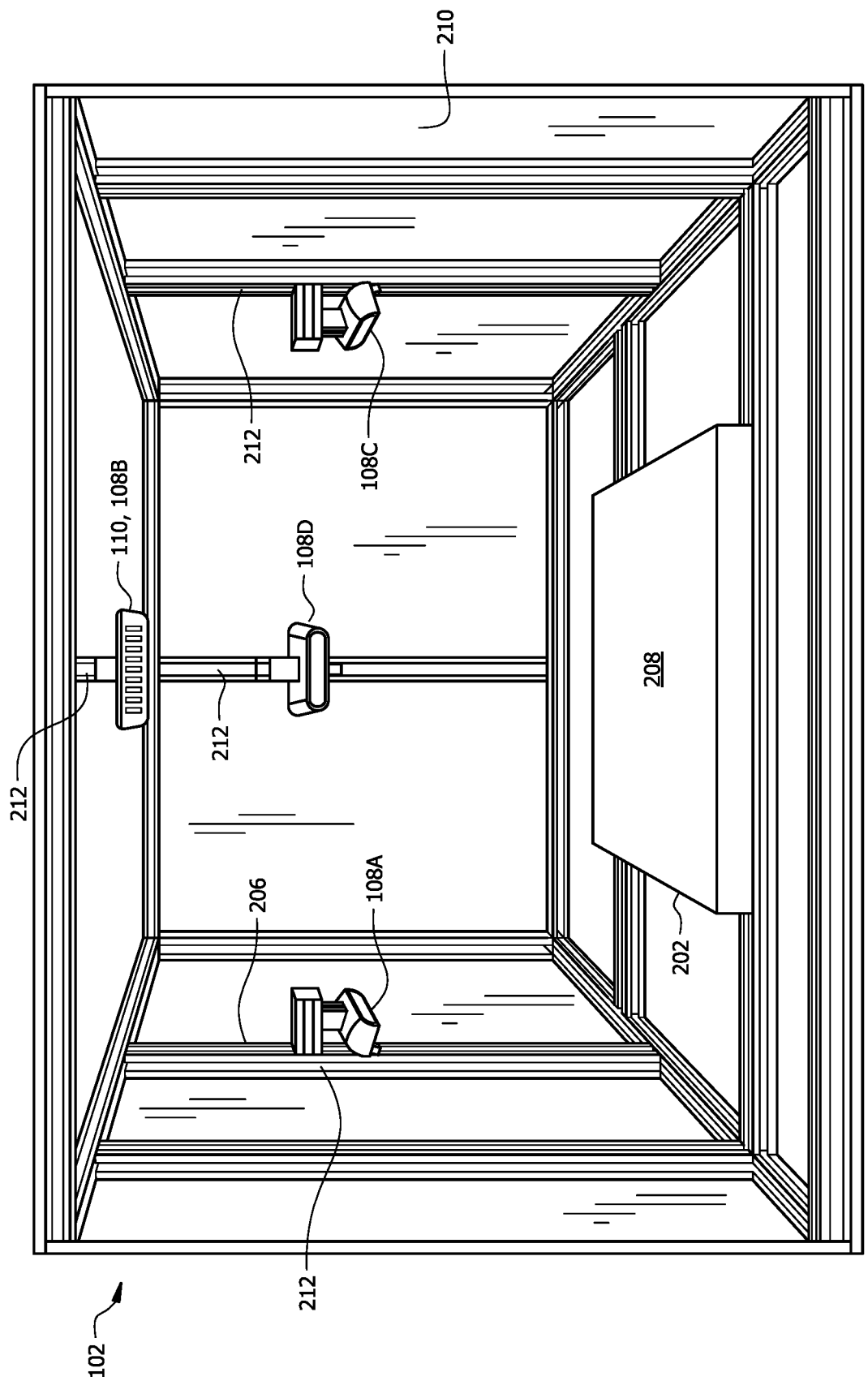
FIG. 2B is a perspective view of another embodiment of an imaging device with an enclosure.

FIG. 2B is a perspective view of another embodiment of an imaging device 102 with an enclosure 210. In this configuration, the enclosure 210 is configured to at least partially encapsulate the frame structure 206, the cameras 108, the 3D sensors 110, and the platform 202 of the imaging device 102. The frame structure 206, the cameras 108, the 3D sensors 110, and the platform 202 may be configured similar to as described in FIG. 2A. In one embodiment, the frame structure 206 may further comprise rails or tracks 212 that are configured to allow the cameras 108 and the 3D sensors 110 to be repositionable within the enclosure 210. For example, the cameras 108A, 108C, and 108D may be repositionable along a vertical axis with respect to the platform 202 using the rails 212. Similarly, camera 108B and 3D sensor 110 may be repositionable along a horizontal axis with respect to the platform 202 using the rails 212.

Figure 2C:
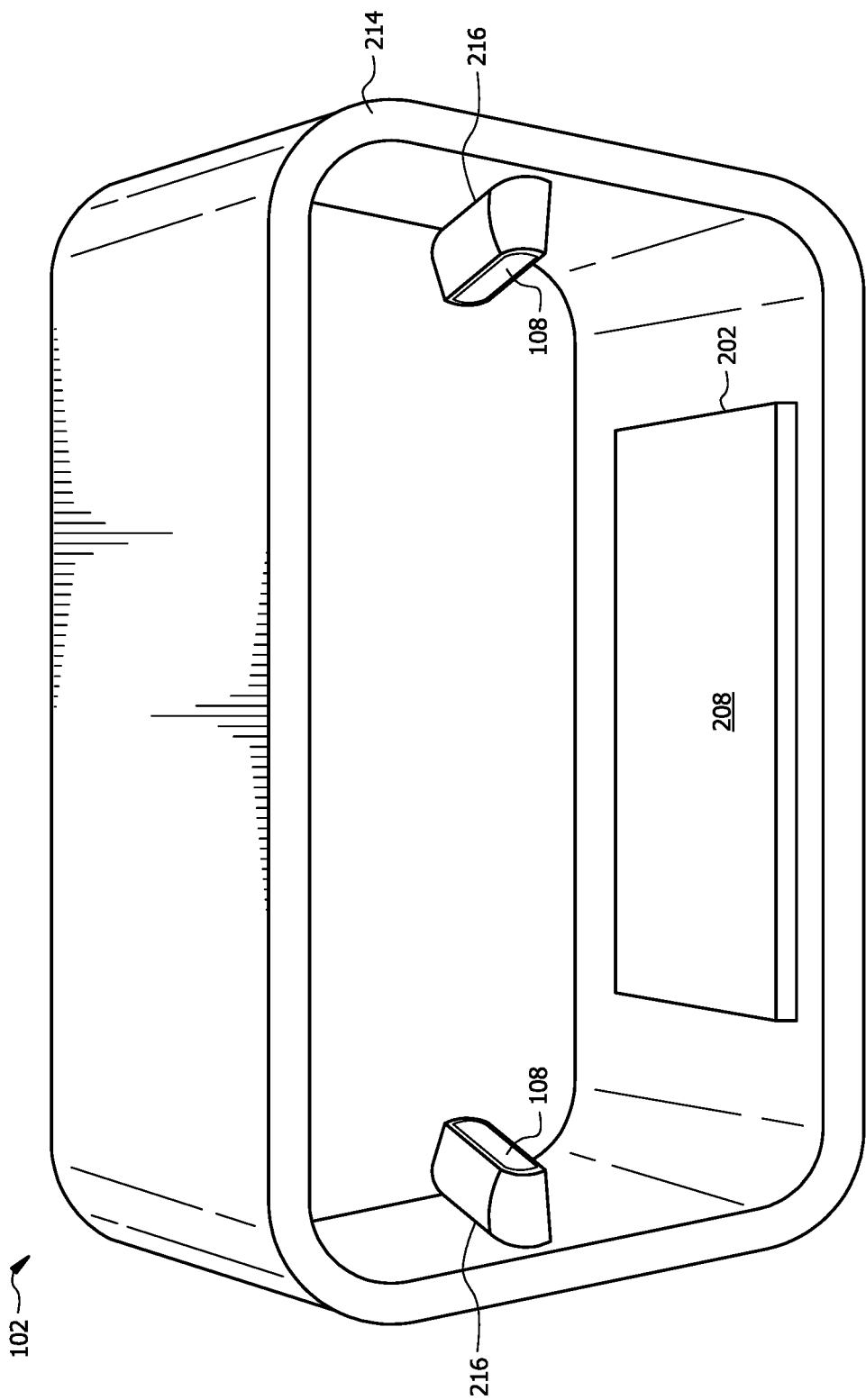
FIG. 2C is a perspective view of another embodiment of an imaging device with an open enclosure.

FIG. 2C is a perspective view of another embodiment of an imaging device 102 with an open enclosure 214. In this configuration, the enclosure 214 is configured to at least partially cover the frame structure 206, the cameras 108, the 3D sensors 110, and the platform 202 of the imaging device 102. The frame structure 206, the cameras 108, the 3D sensors 110, and the platform 202 may be configured similar to as described in FIG. 2A. In one embodiment, the frame structure 206 may be integrated within the enclosure 214. For example, the enclosure 214 may comprise openings 216 that are configured to house the cameras 108 and the 3D sensors 110. In FIG. 2C, the enclosure 214 has a rectangular cross section with rounded edges. In other embodiments, the enclosure 214 may be configured with any other suitable shape cross section.

An Item Tracking Process

Figure 3:
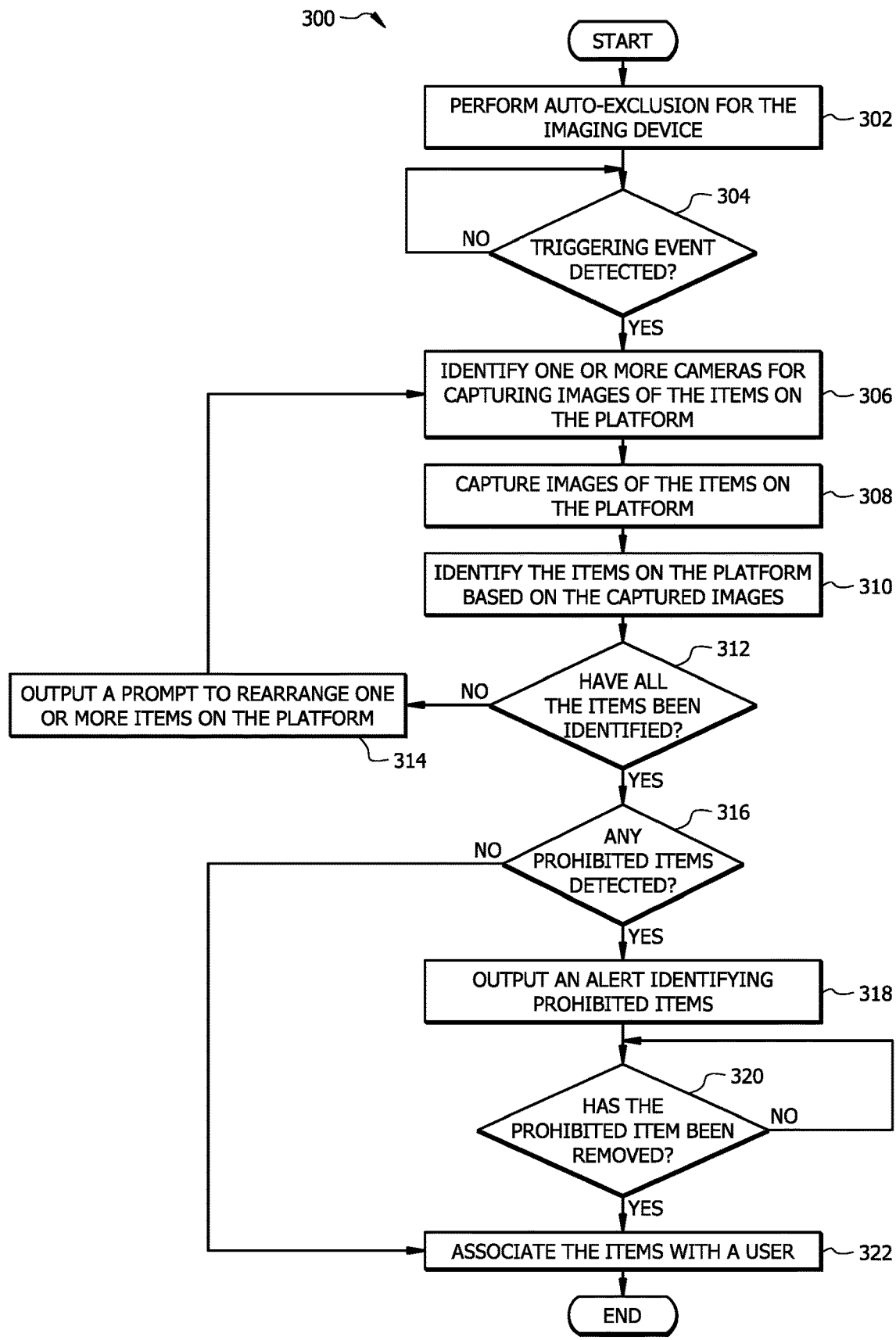
FIG. 3 is a flowchart of an embodiment of an item tracking process for the item tracking system.

FIG. 3 is a flowchart of an embodiment of an item tracking process 300 for the item tracking system 100. The item tracking system 100 may employ process 300 to identify items 204 that are placed on the platform 202 of an imaging device 102 and to assign the items 204 to a particular user. As an example, the item tracking system 100 may employ process 300 within a store to add items 204 to a user's digital cart for purchase. As another example, the item tracking system 100 may employ process 300 within a warehouse or supply room to check out items to a user. In other examples, the item tracking system 100 may employ process 300 in any other suitable type of application where items 204 are assigned or associated with a particular user. This process allows the user to obtain items 204 from a space without having the user scan or otherwise identify the items 204 they would like to take.

At operation 302, the item tracking device 104 performs auto-exclusion for the imaging device 102. During an initial calibration period, the platform 202 may not have any items 204 placed on the platform 202. During this period of time, the item tracking device 104 may use one or more cameras 108 and 3D sensors 110 to capture reference images 122 and reference depth images 124 of the platform without any items 204 placed on the platform 202. The item tracking device 104 can then use the captured images 122 and depth images 124 as reference images to detect when an item is placed on the platform 202. For example, the item tracking device 104 may use a 3D sensor 110 that is configured with a top view or overhead view of the platform 202 to capture a reference depth image 124 of the platform 202 when no items 204 are placed on the platform 202. In this example, the captured depth image 124 may comprise a substantially constant depth value throughout the depth image 124 that corresponds with the surface 208 of the platform 202. At a later time, the item tracking device 104 can detect that an item 204 has been placed on the surface 208 of the platform 202 based on differences in depth values between subsequent depth images 124 and the reference depth image 124. As another example, the item tracking device 104 may use a camera 108 that is configured with a top view or a perspective view of the platform 202 to capture a reference image 122 of the platform when no items 204 are placed on the platform 202. In this example, the captured image 122 comprises pixel values that correspond with a scene of the platform when no items 204 are present on the platform 202. At a later time, the item tracking device 104 can detect that an item 204 has been placed on the platform 202 based on differences in the pixel values between subsequent images 122 and the reference image 122.

Figure 4:
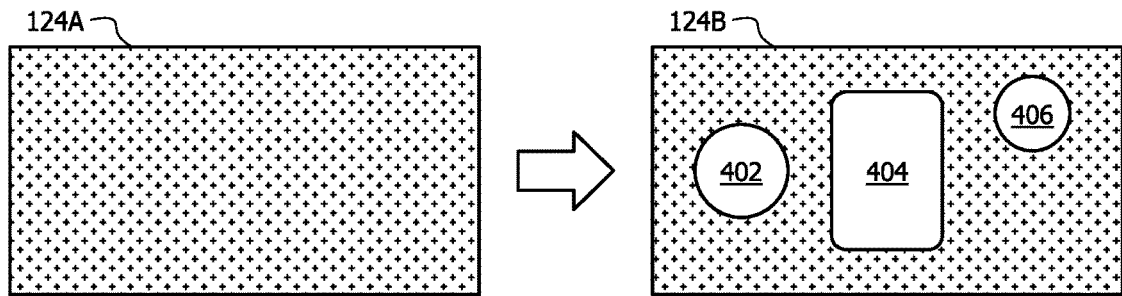
FIG. 4 is an example of a comparison of depth images of a platform of the imaging device before and after placing items on the platform.

At operation 304, the item tracking device 104 determines whether a triggering event has been detected. A triggering event corresponds with an event that indicates that a user is interacting with the imaging device 102. For instance, a triggering event may occur when a user approaches the imaging device 102 or places an item 204 on the imaging device 102. As an example, the item tracking device 104 may determine that a triggering event has occurred in response to detecting motion using a 3D sensor 110 or based on changes in depths images 124 captured by a 3D sensor 110. For example, the item tracking device 104 can detect that an item 204 has been placed on the surface 208 of the platform 202 based on differences in depth values between depth images 124 captured by a 3D sensor 110 and the reference depth image 124. Referring to FIG. 4 as an example, FIG. 4 shows an example of a comparison between depth images 124 from an overhead view of the platform 202 of the imaging device 102 before and after placing items 204 shown in FIG. 2A on the platform 202. Depth image 124A corresponds with a reference depth image 124 that is captured when no items 204 are placed on the platform 202. Depth image 124B corresponds with a depth image 124 that is captured after items 204 are placed on the platform 202. In this example, the colors or pixel values within the depth images 124 represent different depth values. In depth image 124A, the depth values in the depth image 124A are substantially constant which means that there are no items 204 on the platform 202. In depth image 124B, the different depth values correspond with the items 204 (i.e. items 204A, 204B, and 204C) that are placed on the platform 202. In this example, the item tracking device 104 detects a triggering event in response to detecting the presence of the items 204 on the platform 202 based on differences between depth image 124A and depth image 124B. The item tracking device 104 may also use an image 122 or depth image 124 to count the number of items 204 that are on the platform 202. In this example, the item tracking device 104 determines that there are three items 204 placed on the platform 202 based on the depth image 124B. The item tracking device 104 may use the determined number of items 204 later to confirm whether all of the items 204 have been identified. This process is discussed in more detail below in operation 312.

As another example, the item tracking device 104 may determine that a triggering event has occurred in response to detecting motion using a camera 108 or based on changes in images 122 captured by a camera 108. For example, the item tracking device 104 can detect that an item 204 has been placed on the platform 202 based on differences in the pixel values between subsequent images 122 and the reference image 122. As another example, the item tracking device 104 may determine that a triggering event has occurred in response to a weight increase on the weight sensor 112 of the imaging device 102. In this case, the increase in weight measured by the weight sensor 112 indicates that one or more items 204 have been placed on the platform 202. In other examples, the item tracking device 104 may use any other suitable type of sensor or technique for detecting when a user approaches the imaging device 102 or places an item 204 on the imaging device 102.

The item tracking device 104 remains at operation 304 in response to determining that a triggering event has not been detected. In this case, the item tracking device 104 determines that a user has not interacted with the imaging device 102 yet. The item tracking device 104 will remain at operation 304 to continue to check for triggering events until a user begins interacting with the imaging device 102. The item tracking device 104 proceeds to operation 306 in response to determining that a triggering event has been detected. In this case, the item tracking device 104 determines that a user has begun interacting with the imaging device 102. The item tracking device 104 proceeds to operation 306 to begin identifying items that are placed on the platform 202 of the imaging device 102.

At operation 306, the item tracking device 104 identifies one or more cameras 108 for capturing images 122 of the items 204 on the platform 202 of the imaging device 102. The item tracking device 104 may identify cameras 108 for capturing images 122 of the items 204 based at least in part upon the pose (e.g. location and orientation) of the items 204 on the platform 202. The pose of an item 204 corresponds with the location the item 204 and how the item 204 is positioned with respect to the platform 202. Referring to the example in FIG. 2A, a first item 204A and a second item 204C are positioned in a vertical orientation with respect to the platform 202. In the vertical orientation, the identifiable features of an item 204 are primarily in the vertical orientation. Cameras 108 with a perspective view, such as cameras 108A and 108C, may be better suited for capturing images 122 of the identifiable features of item 204 that are in a vertical orientation. For instance, the item tracking device 104 may select camera 108A to capture images 122 of item 204A since most of the identifiable features of item 204A, such as branding, text, and barcodes, are located on the sides of the item 204A and are most visible using a perspective view of the item 204. Similarly, the item tracking device 104 may then select camera 108C to capture images 122 of item 204C. In this example, a third item 204B is positioned in a horizontal orientation with respect to the platform 202. In the horizontal orientation, the identifiable features of an item 204 are primarily in the horizontal orientation. Cameras 108 with a top view or overhead view, such as camera 108B, may be better suited for capturing images 122 of the identifiable features of item 204 that are in a horizontal orientation. In this case, the item tracking device 104 may select camera 108B to capture images 122 of item 204B since most of the identifiable features of item 204B are located on the top of the item 204B and are most visible from using an overhead view of the item 204B.

In one embodiment, the item tracking device 104 may determine the pose of items 204 on the platform 202 using depth images 124. Referring to FIG. 4 as an example, the depth image 124B corresponds with an overhead depth image 124 that is captured after the items 204 shown in FIG. 2A (i.e. items 204A, 204B, and 204C) are placed on the platform 202. In this example, the item tracking device 104 may use areas in the depth image 124B that correspond with each item 204 to determine the pose of the items 204. For example, the item tracking device 104 may determine the area 402 within the depth image 124B that corresponds with item 204A. The item tracking device 104 compares the determined area 402 to a predetermined area threshold value 614. The item tracking device 104 determines that an item 204 is in a vertical orientation when the determined area 402 for the item 204 is less than or equal to the predetermined area threshold value 614. Otherwise, the item tracking device 104 determines that the item 204 is in a horizontal orientation when the determined area 402 for the item 204 is greater than the predetermined area threshold value 614. In this example, the item tracking device 104 determines that items 204A and 204C are in a vertical orientation because their areas 402 and 406, respectively, are less than or equal to the area threshold value 614. The item tracking device 104 determines that item 204B is in a horizontal orientation because its area 404 is greater than the area threshold value 614. This determination means that the item tracking device 104 will select cameras 108 (e.g. cameras 108A and 108C) with a perspective view of the platform 202 to capture images 122 of items 204A and 204C. The item tracking device 104 will select a camera 108 (e.g. camera 108B) with a top view or overhead view of the platform 202 to capture images 122 of item 204B.

In one embodiment, the item tracking device 104 may identify a camera 108 for capturing images 122 of an item 204 based at least in part on the distance between the item 204 and the camera 108. For example, the item tracking device 104 may generate homographies 608 between the cameras 108 and/or the 3D sensors 110 of the imaging device 102. By generating a homography 608 the item tracking device 104 is able to use the location of an item 204 within an image 122 to determine the physical location of the item 204 with respect to the platform 202, the cameras 108, and the 3D sensors 110. This allows the item tracking device 104 to use the physical location of the item 204 to determine distances between the item 204 and each of the cameras 108 and 3D sensors 110. A homography 608 comprises coefficients that are configured to translate between pixel locations in an image 122 or depth image 124 and (x,y) coordinates in a global plane (i.e. physical locations on the platform 202). The item tracking device 104 uses homographies 608 to correlate between a pixel location in a particular camera 108 or 3D sensor 110 with a physical location on the platform 202. In other words, the item tracking device 104 uses homographies 608 to determine where an item 204 is physically located on the platform 202 based on their pixel location within an image 122 or depth image 124 from a camera 108 or a 3D sensor 110, respectively. Since the item tracking device 104 uses multiple cameras 108 and 3D sensors 110 to monitor the platform 202, each camera 108 and 3D sensor 110 is uniquely associated with a different homography 608 based on the camera's 108 or 3D sensor's 110 physical location on the imaging device 102. This configuration allows the item tracking device 104 to determine where an item 204 is physically located on the platform 202 based on which camera 108 or 3D sensor 110 it appears in and its location within an image 122 or depth image 124 that is captured by that camera 108 or 3D sensor 110. Additional information about generating a homography 608 and using a homography 608 is disclosed in U.S. Pat. No. 11,023,741 entitled, "DRAW WIRE ENCODER BASED HOMOGRAPHY" which is hereby incorporated by reference herein as if reproduced in its entirety.

As an example, the item tracking device 104 may use an image 122 or a depth image 124 from a camera 108 or 3D sensor 110, respectively, with a top view or overhead view of the platform 202 to determine the physical location of an item on the platform 202. In this example, the item tracking device 104 may determine a pixel location for the item 204 within the image 122 or depth image 124. The item tracking device 104 may then use a homography 608 to determine the physical location for the item 204 with respect to the platform 202 based on its pixel location. After determining the physical location of the item 204 on the platform 202, the item tracking device 104 may then identify which camera 108 is physically located closest to the item 204 and select the identified camera 108. Returning to the example in FIG. 2A, the item tracking device 104 may select camera 108A to capture images 122 of item 204A since camera 108A is closer to item 204A than camera 108C. Similarly, the item tracking device 104 may select camera 108C to capture images 122 of item 204C since camera 108C is closer to item 204C than camera 108A. This process ensures that the camera 108 with the best view of an item 204 is selected to capture an image 122 of the item 204.

Figure 5A:
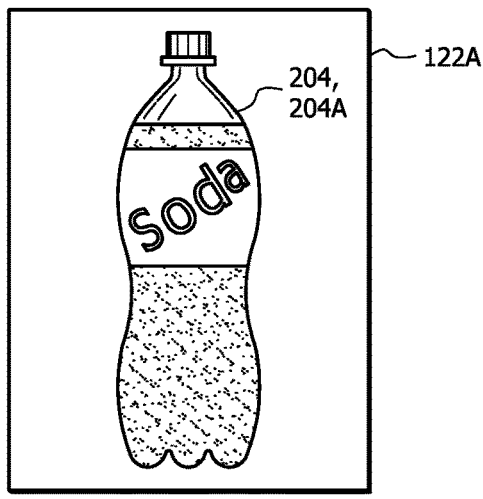
FIGS. 5A-5C are examples of images of items.
Figure 5B:
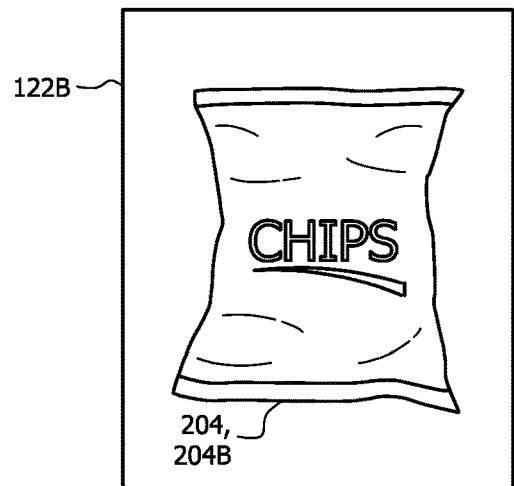
Figure 5C:
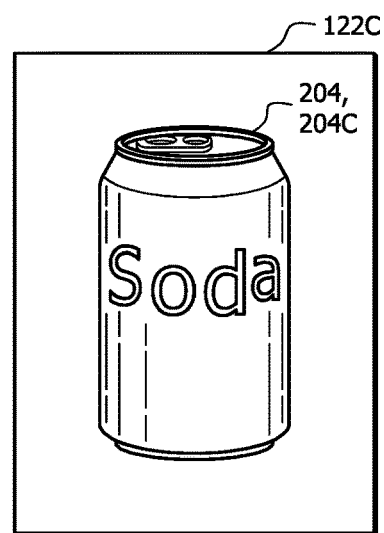

At operation 308, the item tracking device 104 captures images 122 of the items 204 on the platform 202 using the identified cameras 108. Here, the item tracking device 104 uses the identified cameras 108 to capture images of the items 204. Referring to FIGS. 5A, 5B, and 5C as examples, the item tracking device 104 may capture a first image 122A of the item 204A, a second image 122B of item 204B, and a third image 122C of item 204C using cameras 108A, 108B, and 108C, respectively. The item tracking device 104 may collect one or more images 122 of each item 204 for processing. By using a subset of the cameras 108 available on the imaging device 102 to capture images of the items 204, the item tracking device 104 is able to reduce the number of images 122 that will be captured and processed to identify the items 204 on the platform 202. This process reduces the search space for identifying items 204 and improves the efficiency and hardware utilization of the item tracking device 104 by allowing the item tracking device 104 to process fewer images 122 to identify the item 204 instead of processing images 122 from all of the cameras 108 on the imaging device 102, which may include multiple images 122 of the same items 204. In addition, the item tracking device 104 also selects cameras 108 that are positioned to capture features that are the most useful for identifying the items 204 based on the orientation and location of the items 204, as discussed in operation 306. Examples of features include, but are not limited to, text, logos, branding, colors, barcodes, patterns, a shape, or any other suitable type of attributes of an item 204.

Returning to FIG. 3 at operation 310, the item tracking device 104 identifies the items 204 on the platform 202 based on the captured images 122. Here, the item tracking device 104 identifies an item 204 within each image 122 based on the features of the item 204 in the image 122. As an example, the machine learning model 126 may be a CNN. In this example, the machine learning model 126 includes an input layer, an output layer, and one or more hidden layers. The hidden layers include at least one convolution layer. For example, the machine learning model 126 may include the following sequence of layers: input layer, convolution layer, pooling layer, convolution layer, pooling layer, one or more fully connected layers, output layer. Each convolution layer of machine learning model 126 uses a set of convolution kernels to extract features from the pixels that form an image 122. In certain embodiments, the convolution layers of machine learning model 126 are implemented in the frequency domain, and the convolution process is accomplished using discrete Fourier transforms. This may be desirable to reduce the computational time associated with training and using machine learning model 126 for image classification purposes. For example, by converting to the frequency domain, the fast Fourier transform algorithm (FFT) may be implemented to perform the discrete Fourier transforms associated with the convolutions. Not only does the use of the FFT algorithm alone greatly reduce computational times when implemented on a single CPU (as compared with applying convolution kernels in the spatial domain), the FFT algorithm may be parallelized using one or more graphics processing units (GPUs), thereby further reducing computational times. Converting to the frequency domain may also be desirable to help ensure that the machine learning model 126 is translation and rotation invariant (e.g., the assignment made by machine learning model 126 of an image 122 to an item identifier, based on the presence of an item 204 in the image 122, should not depend on the position and/or orientation of the item 204 within image 122).

As another example, the machine learning model 126 may be a supervised learning algorithm. Accordingly, in certain embodiments, item tracking device 104 is configured to train the machine learning model 126 to assign input images 122 to any of a set of predetermined item identifiers. The item tracking device 104 may train the machine learning model 126 in any suitable manner. For example, in certain embodiments, the item tracking device 104 trains the machine learning model 126 by providing the machine learning model 126 with training data (e.g. images 122) that includes a set of labels (e.g. item identifiers) attached to the input images 122. As another example, the machine learning model 126 may be an unsupervised learning algorithm. In such embodiments, the item tracking device 104 is configured to train machine learning model 126 by providing the machine learning model 126 with a collection of images 122 and instructing the machine learning model 126 to classify these images 122 with item identifiers identified by the item tracking device 104, based on common features extracted from the images 122. The item tracking device 104 may train the machine learning model 126 any time before inputting the captured images 122 into the machine learning model 126.

After training the machine learning model 126, the item tracking device 104 may input each of the captured images 122 into the machine learning model 126. In response to inputting an image 122 in the machine learning model 126, the item tracking device 104 receives an item identifier for an item 204 from the machine learning model 126. The item identifier corresponds with an item 204 that was identified within the image 122. Examples of item identifiers include, but are not limited to, an item name, a barcode, an item number, a serial number, or any other suitable type of identifier that uniquely identifies an item 204.

In some embodiments, the item tracking device 104 may employ one or more image processing techniques without using the machine learning model 126 to identify an item 204 within an image 122. For example, the item tracking device 104 may employ object detection and/or optical character recognition (OCR) to identify text, logos, branding, colors, barcodes, or any other features of an item 204 that can be used to identify the item 204. In this case, the item tracking device 104 may process pixels within an image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g. a product name) from an image 122 and may compare the text to a set of text that is associated with different items 204. As another example, the item tracking device 104 may determine a dominant color within an image 122 and may compare the dominant color to a set of colors that are associated with different items 204. As another example, the item tracking device 104 may identify a barcode within an image 122 and may compare the barcode to a set of barcodes that are associated with different items 204. As another example, the item tracking device 104 may identify logos or patterns within the image 122 and may compare the identified logos or patterns to a set of logos or patterns that are associated with different items 204. In other examples, the item tracking device 104 may identify any other suitable type or combination of features and compare the identified features to features that are associated with different items 204. After comparing the identified features from an image 122 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within an image 122 match the features of an item 204, the item tracking device 104 may output an item identifier that corresponds with the matching item 204. In other embodiments, the item tracking device 104 may employ one or more image processing techniques in conjunction with the machine learning model 126 to identify an item 204 within an image 122 using any combination of the techniques discussed above.

In some embodiments, the item tracking device 104 is configured to output a confidence score 610 that indicates a probability that an item 204 has been correctly identified. For example, the item tracking device 104 may obtain an confidence score 610 from the machine learning model 126 with the determined item identifier. In this example, the machine learning model 126 outputs a confidence score 610 that is proportional to the number of features that were used or matched when determining the item identifier. As another example, the item tracking device 104 may determine a confidence score 610 based on how well identified features match the features of the identified item 204. For instance, the item tracking device 104 may obtain a confidence score 610 of 50% when half of the text identified within an image 122 matches the text associated with identified item 204. As another example, the item tracking device 104 may determine obtain a confidence score 610 of 100% when a barcode within an image 122 matches a barcode of the identified item 204. As another example, the item tracking device 104 may obtain a confidence score 610 of 25% when the dominant color within an image 122 matches a dominant color of the identified item 204. In other examples, the item tracking device 104 may obtain a confidence score 610 that is based on how well any other suitable type or combination of features matches the features of the identified item 204. Other information that can impact a confidence score 610 include, but are not limited to, the orientation of the object, the number of items on the platform 202 (e.g., a fewer number of items on the platform 202 are easier to identify than a greater number of items on the platform 202); the relative distance between items on the platform (e.g., spaced apart items on the platform 202 are easier to identify than crowded items on the platform 202); and the like. The item tracking device 104 may compare the confidence score 610 for an identified item 204 to a confidence score threshold value 612 to determine whether the item 204 has been identified. The item tracking device 104 may determine that an item 204 has not been identified when the confidence score 610 for the item 204 is less than the confidence score threshold value 612. The item tracking device 104 determines that the item 204 has been identified when the confidence score 610 for the item 204 is greater than or equal to the confidence score threshold value 612. The confidence score threshold value 612 may be set to 90%, 80%, 75%, or any other suitable value.

At operation 312, the item tracking device 104 determines whether all of the items 204 on the platform 202 have been identified. For example, the item tracking device 104 may compare the number of identified items 204 from the captured images 122 to the number of items 204 on the platform 202 that was determined in operation 304. The item tracking device 104 determines that all of the items 204 on the platform 202 have been identified when the number of items 204 identified items 204 from the captured images 122 matches the determined number of items 204 on the platform 202. Otherwise, the item tracking device 104 determines that at least one of the items 204 has not been identified when the number of items 204 identified items 204 from the captured images 122 does not match the determined number of items 204 on the platform 202.

The item tracking device 104 proceeds to operation 314 in response to determining that one or more of the items 204 on the platform 202 have not been identified. In this case, the item tracking device 104 may output a request for the user to reposition one or more items 204 on the platform 202 to assist the item tracking device 104 with identifying some of the items 204 on the platform. At operation 314, the item tracking device 104 outputs a prompt to rearrange one or more items 204 on the platform 202. As an example, one or more items 204 may be obscuring the view of an item 204 for one of the cameras 108. In this example, the item tracking device 104 may output a message on a graphical user interface that is located at the imaging device 102 with instructions for the user to rearrange the position of the items 204 on the platform 202. In some embodiments, the item tracking device 104 may also identify the locations of the one or more items 204 on the platform 202 that were not identified. For example, the item tracking device 104 may activate a light source above or below the platform 202 that illuminates an item 204 that was not recognized. In one embodiment, after outputting the message to rearrange the items 204 on the platform 202, the item tracking device 104 returns to operation 306 to restart the process of identifying the items 204 on the platform 202. This process prevents the item tracking device 104 from double counting items 204 after the items 204 have been rearranged on the platform 202.

Returning to operation 312, the item tracking device 104 proceeds to operation 316 in response to determining that all of the items 204 on the platform 202 have been identified. In some embodiments, the item tracking device 104 may validate the accuracy of detecting the identified items 204 based on the weight of the items 204 on the platform 202. For example, the item tracking device 104 may determine a first weight that is associated with the weight of the identified items 204 based on item information 118 that is associated with the identified items 204. For instance, the item tracking device 104 may use item identifiers for the identified items 204 to determine a weight that corresponds with each of the identified items 204. The item tracking device 104 may sum the individual weights for the identified items 204 to determine the first weight. The item tracking device 104 may also receive a second weight for the items 204 on the platform 202 from the weight sensor 112. The item tracking device 104 then determines a weight difference between the first weight and the second weight and compares the weight difference to a weight difference threshold value. The weight difference threshold value corresponds with a maximum weight difference between the first weight and the second weight. When the weight difference exceeds the weight difference threshold value, the item tracking device 104 may determine that there is a mismatch between the weight of the items 204 on the platform 202 of the imaging device 102 and the expected weight of the identified items 204. In this case, the item tracking device 104 may output an error message and/or return to operation 306 to restart the item tracking process. When the weight difference is less than or equal to the weight difference threshold value, the item tracking device 104 may determine that there is a match between the weight of the items 204 on the platform 202 of the imaging device 102 and the expected weight of the identified items 204. In this case, the item tracking device 104 may proceed to operation 316.

At operation 316, the item tracking device 104 checks whether any prohibited or restricted item 204 are present on the platform 202. A prohibited or restricted item 204 is an item 204 that the user is not authorized to obtain due to permission restrictions, age restrictions, or any other type of restrictions. The item tracking device 104 may compare item identifiers for the identified items 204 to a list of item identifiers for restricted or prohibited items 616. In response to determining that an item 204 matches one of the items on the list of restricted or prohibited items 616, the item tracking device 104 proceeds to operation 318 to output an alert or notification that indicates that the user is prohibited from obtaining one of the items 204 that is on the platform 202. For example, the item tracking device 104 may output an alert message that identifies the prohibited item 204 and asks the user to remove the prohibited item 204 from the platform 202 using a graphical user interface that is located at the imaging device 102. As another example, the item tracking device 104 may output an alert message that identifies the prohibited item 204 to another user (e.g. an employee) that is associated with the space. In other examples, the item tracking device 104 may output any other suitable type of alert message in response to detecting a prohibited item 204 on the platform 202.

At operation 320, the item tracking device 104 determines whether the prohibited item 204 has been removed from the platform 202. For example, the item tracking device 104 may use the weight sensors 112 to determine whether the measured weight of the item 204 on the platform 202 has decreased by an amount that corresponds with the weight of the prohibited item 204. As another example, the item tracking device 104 may use the cameras 108 and/or 3D sensors 110 to determine whether the prohibited item 204 is still present on the platform 202. In response to determining that the prohibited item 204 is still present on the platform 202, the item tracking device 104 may pause process 300 and remain at operation 320 until the prohibited item 204 has been removed from the platform 202. This process prevents the user from obtaining the prohibited item 204. The item tracking device 104 may proceed to operation 322 after the prohibited item 204 has been removed from the platform 202.

Otherwise, the item tracking device 104 proceeds to operation 322 in response to determining that no prohibited items 204 are present on the platform 202. At operation 322, the item tracking device 104 associates the items 204 with the user. In one embodiment, the item tracking device 104 may identify the user that is associated with the items 204 on the platform 202. For example, the user may identify themselves using a scanner or card reader that is located at the imaging device 102. Examples of a scanner include, but are not limited to, a QR code scanner, a barcode scanner, a near-field communication (NFC) scanner, or any other suitable type of scanner that can receive an electronic code embedded with information that uniquely identifies a person. In other examples, the user may identify themselves by providing user information on a graphical user interface that is located at the imaging device 102. Examples of user information include, but are not limited to, a name, a phone number, an email address, an identification number, an employee number, an alphanumeric code, or any other suitable type of information that is associated with the user.

The item tracking device 104 uses the information provided by the user to identify an account that is associated with the user and then to add the identified items 204 to the user's account. For example, the item tracking device 104 may use the information provided by the user to identify an account within the user account information 120 that is associated with the user. As an example, the item tracking device 104 may identify a digital cart that is associated with the user. In this example, the digital cart comprises information about items 204 that the user has placed on the platform 202 to purchase. The item tracking device 104 may add the items 204 to the user's digital cart by adding the item identifiers for the identified items 204 to the digital cart. The item tracking device 104 may also add other information to the digital cart that is related to the items 204. For example, the item tracking device 104 may use the item identifiers to look up pricing information for the identified items 204 from the stored item information 118. The item tracking device 104 may then add pricing information that corresponds with each of the identified items 204 to the user's digital cart.

After the item tracking device 104 adds the items 204 to the user's digital cart, the item tracking device 104 may trigger or initiate a transaction for the items 204. In one embodiment, the item tracking device 104 may use previously stored information (e.g. payment card information) to complete the transaction for the items 204. In this case, the user may be automatically charged for the items 204 in their digital cart when they leave the space. In other embodiments, the item tracking device 104 may collect information from the user using a scanner or card reader that is located at the imaging device 102 to complete the transaction for the items 204. This process allows the items 204 to be automatically added to the user's account (e.g. digital cart) without having the user scan or otherwise identify the items 204 they would like to take. After adding the items 204 to the user's account, the item tracking device 104 may output a notification or summary to the user with information about the items 204 that were added to the user's account. For example, the item tracking device 104 may output a summary on a graphical user interface that is located at the imaging device 102. As another example, the item tracking device 104 may output a summary by sending the summary to an email address or a user device that is associated with the user.

Hardware Configuration for the Item Tracking Device

Figure 6:
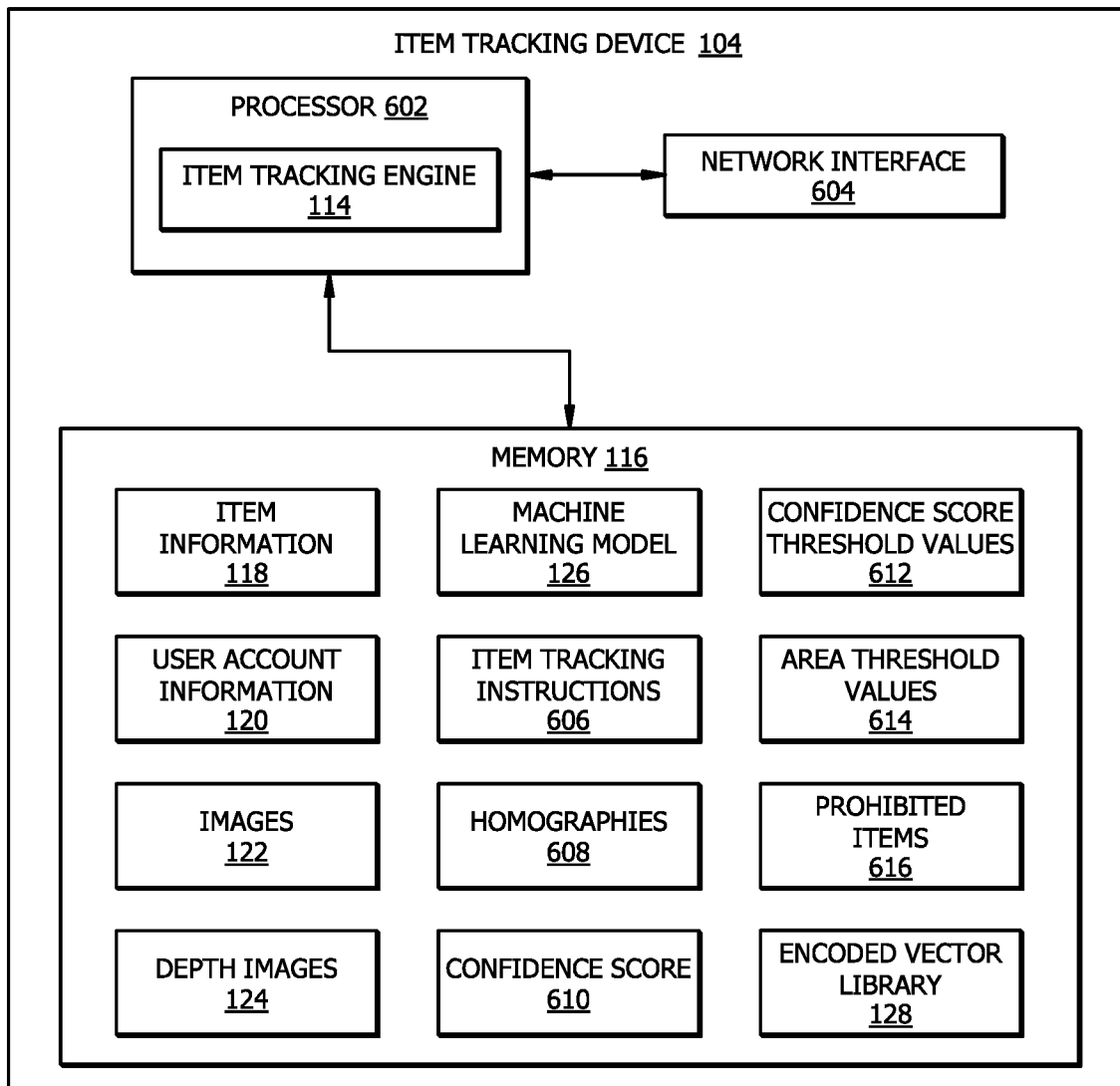
FIG. 6 is an embodiment of an item tracking device configured for the item tracking system.

FIG. 6 is an embodiment of an item tracking device 104 for the item tracking system 100. In one embodiment, the item tracking device 104 may comprise a processor 602, a memory 116, and a network interface 604. The item tracking device 104 may be configured as shown or in any other suitable configuration.

Processor

The processor 602 comprises one or more processors operably coupled to the memory 116. The processor 602 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 116 and the network interface 604. The one or more processors are configured to process data and may be implemented in hardware or software. For example, the processor 602 may be 8-bit, 16-bit, 32-bit, 64-bit, or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute item tracking instructions 606 to implement the item tracking engine 114. In this way, processor 602 may be a special-purpose computer designed to implement the functions disclosed herein. In an embodiment, the item tracking engine 114 is implemented using logic units, FPGAs, ASICs, DSPs, or any other suitable hardware. The item tracking engine 114 is configured to operate as described in FIGS. 1 and 3. For example, the item tracking engine 114 may be configured to perform the operations s of process 300 as described in FIG. 3.

Memory

The memory 116 is operable to store any of the information described above with respect to FIGS. 1 and 3 along with any other data, instructions, logic, rules, or code operable to implement the function(s) described herein when executed by the processor 602. The memory 116 comprises one or more disks, tape drives, or solid-state drives, and may be used as an over-flow data storage device, to store programs when such programs are selected for execution, and to store instructions and data that are read during program execution. The memory 116 may be volatile or non-volatile and may comprise a read-only memory (ROM), random-access memory (RAM), ternary content-addressable memory (TCAM), dynamic random-access memory (DRAM), and static random-access memory (SRAM).

The memory 116 is operable to store item tracking instructions 606, item information 118, user account information 120, machine learning models 126, images 122, depth images 124, homographies 608, confidence scores 610, confidence score threshold values 612, area threshold values 614, a list of restricted or prohibited items 616, encoded vector libraries 128, and/or any other data or instructions. The item tracking instructions 606 may comprise any suitable set of instructions, logic, rules, or code operable to execute the item tracking engine 114. The item information 118, the user account information 120, the machine learning models 126, images 122, depth images 124, homographies 608, confidence scores 610, confidence score threshold values 612, area threshold values 614, the list of restricted or prohibited items 616, and encoded vector libraries 128 are configured similar to the item information 118, the user account information 120, the machine learning models 126, images 122, depth images 124, homographies 608, confidence scores 610, confidence score threshold values 612, area threshold values 614, the list of restricted or prohibited items 616, and encoded vector libraries 128 described in FIGS. 1-26, respectively.

Network Interface

The network interface 604 is configured to enable wired and/or wireless communications. The network interface 604 is configured to communicate data between the imaging device 102 and other devices, systems, or domains. For example, the network interface 604 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 602 is configured to send and receive data using the network interface 604. The network interface 604 may be configured to use any suitable type of communication protocol as would be appreciated by one of ordinary skill in the art.

Hand Detection Process for Triggering Item Identification

Figure 7:
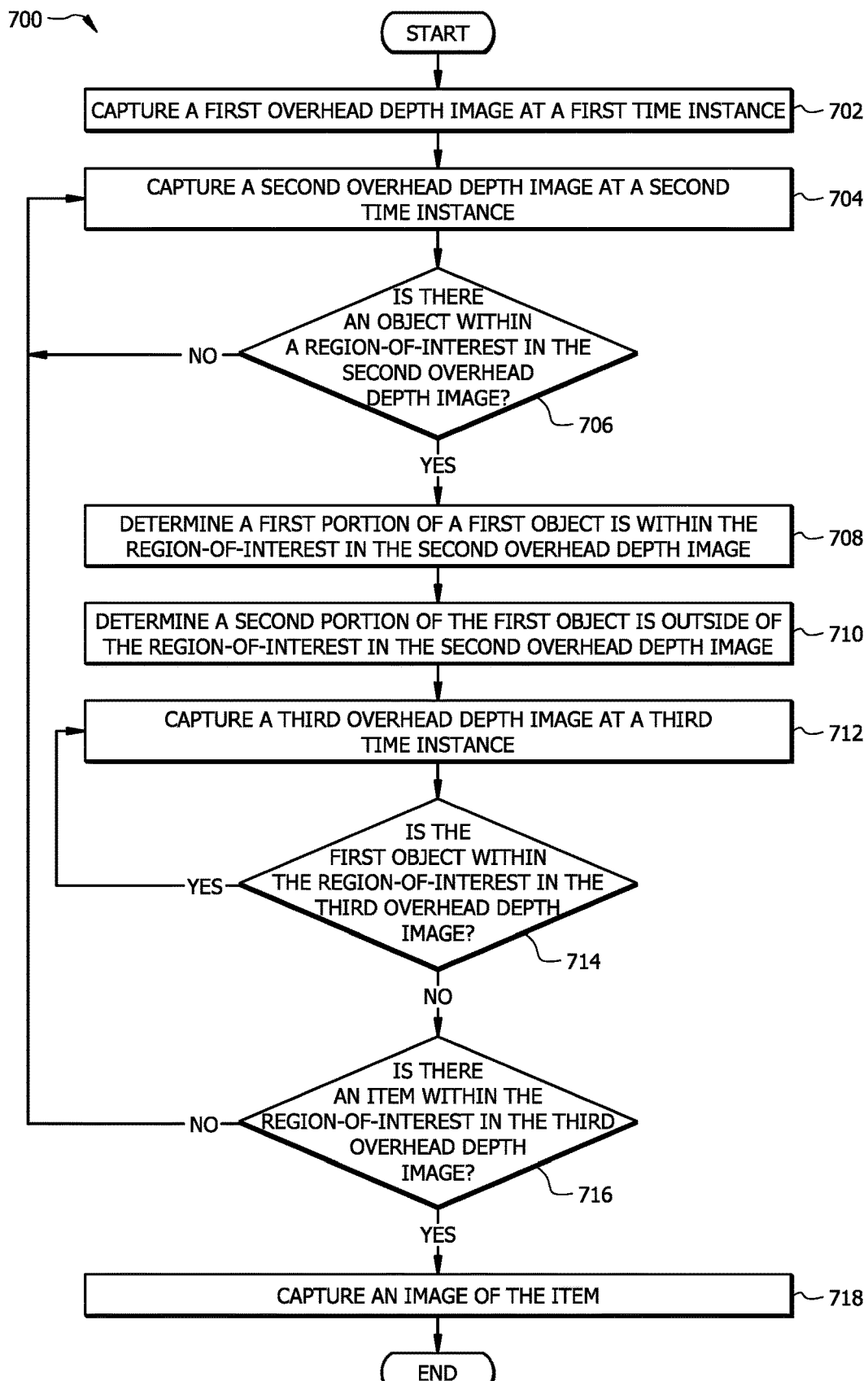
FIG. 7 is a flowchart of an embodiment of a hand detection process for triggering item identification.

FIG. 7 is a flowchart of an embodiment of a hand detection process 700 for triggering an item identification process for the item tracking system 100. The item tracking system 100 may employ process 700 to detect a triggering event that corresponds with when a user puts their hand above the platform 202 to place an item 204 on the platform 202. This process allows the item tracking device 104 to detect the presence of a user interacting with the platform 202 which can be used to initiate an item detection process such as processes 300 and 2300 described in FIGS. 3 and 23, respectively.

Figure 8A:
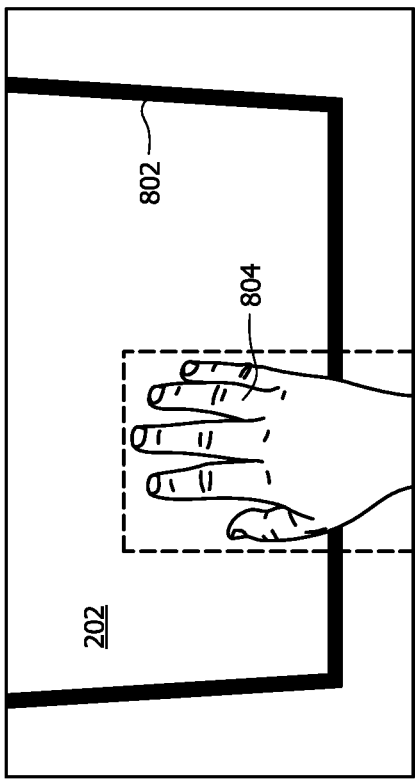
FIG. 8A is an example of an overhead depth image of a platform without any items placed on the platform of the imaging device.

At operation 702, the item tracking device 104 captures a first overhead depth image 124 using a 3D sensor 110 at a first time instance. Here, the item tracking device 104 first captures an overhead depth image 124 of the platform 202 to ensure that there are no items 204 placed on the platform 202 and that there are no hands present above the platform 202 before periodically checking for the presence of a user's hand above the platform 202. The overhead depth image 124 captures any upward-facing surfaces of objects and the platform 202. Referring to FIG. 8A as an example, the item tracking device 104 may employ a 3D sensor 110 that is positioned above the platform 202 to capture an overhead depth image 124 of the platform 202. Within the overhead depth images 124 of the platform 202, the item tracking device 104 defines a region-of-interest 802 for the platform 202. The region-of-interest 802 (outlined with bold lines in FIGS. 8A-8C) identifies a predetermined range of pixels in an overhead depth image 124 that corresponds with the surface of the platform 202. The item tracking device 104 uses the defined region-of-interest 802 to determine whether any item 204 has been placed on the platform 202 or whether a user has their hand positioned above the platform 202. The region-of interest 802 is the same predetermined range of pixels for all of the depth images 124 captured by the 3D sensor 110.

Returning to FIG. 7 at operation 704, the item tracking device 104 captures a second overhead depth image 124 using the same 3D sensor 110 at a second time instance. After capturing the first overhead depth image 124, the item tracking device 104 begins periodically capturing additional overhead depth images 124 of the platform 202 to check whether a user's hand has entered the region-of-interest 802 for the platform 202. The item tracking device 104 may capture additional overhead depth images 124 every second, every ten seconds, every thirty seconds, or at any other suitable time interval. In some embodiments, the item tracking device 104 may capture the second overhead depth image 124 in response to detecting motion near the platform 202. For example, the item tracking device 104 may employ a proximity sensor that is configured to detect motion near the platform 202 before capturing the second overhead depth image 124. As another example, the item tracking device 104 may periodically capture additional overhead depth image 124 to detect motion. In this example, the item tracking device 104 compares the first overhead depth image 124 to subsequently captured overhead depth images 124 and detects motion based on differences, for example, the presence of an object, between the overhead depth images 124.

Figure 8B:
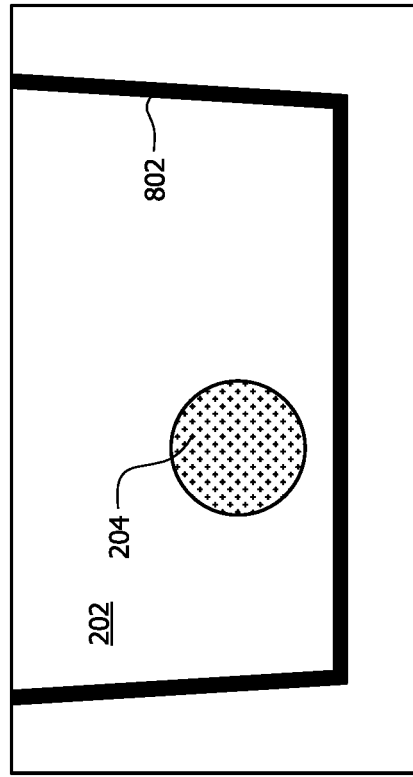
FIG. 8B is an example of an overhead depth image of the platform when a hand is above the platform of the imaging device.
Figure 8C:
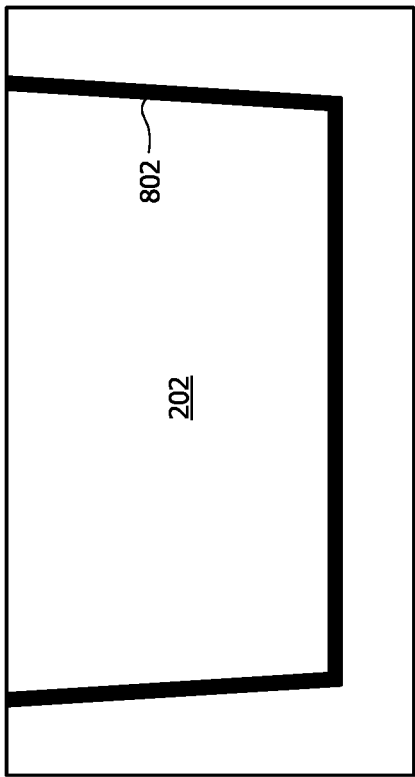
FIG. 8C is an example of an overhead image of the platform when the hand is above the platform of the imaging device.
Figure 8D:
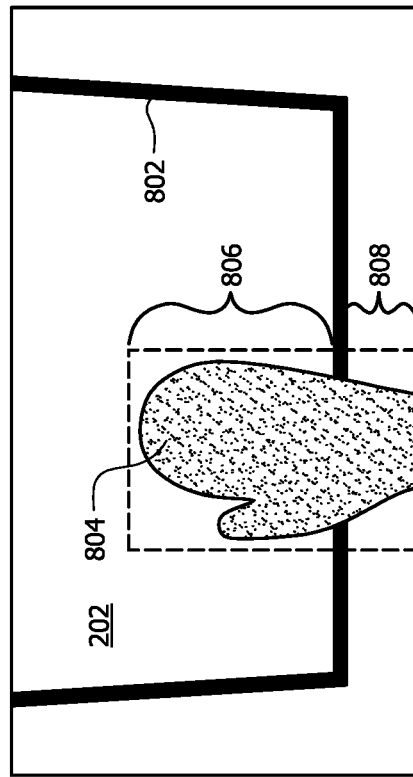
FIG. 8D is an example of an overhead depth image of the platform with an item placed on the platform of the imaging device.

At operation 706, the item tracking device 104 determines whether an object is present within the region-of-interest 802 in the second overhead depth image 124. In one embodiment, the item tracking device 104 determines an object is present within the region-of-interest 802 based on differences between the first overhead depth image 124 and the second overhead depth image 124. Referring to FIG. 8B as an example, the item tracking device 104 compares the second overhead depth image 124 (shown in FIG. 8B) to the first overhead depth image 124 (shown in FIG. 8A) to identify differences between the first overhead depth image 124 and the second overhead depth image 124. In this example, the item tracking device 104 detects an object 804 within the in region-of-interest 802 in the second overhead depth image 124 that corresponds with the hand of a user. FIG. 8C shows a corresponding image 122 of the object 804 that is present in the second overhead depth image 124.

Returning to FIG. 7 at operation 706, the item tracking device 104 returns to operation 704 in response to determining that there is not an object present within the region-of-interest 802 in the second overhead depth image 124. In this case, the item tracking device 104 returns to operation 704 to continue periodically capturing overhead depth image 124 of the platform 202 to check where a user's hand has entered the region-of-interest 802 of the platform 202. The item tracking device 104 proceeds to operation 708 in response to determining that an object is present within the region-of-interest 802 in the second overhead depth image 124. In this case, the item tracking device 104 proceeds to operation 708 to confirm whether the object in the second overhead depth image 124 corresponds with the hand of a user.

The item tracking device 104 is configured to distinguish between an item 204 that is placed on the platform 202 and the hand of a user. When a user's hand is above the platform 202, the user's hand will typically be within the region-of-interest 802 in the second overhead depth image 124 while the user's arm remains outside of the region-of-interest 802 in the second overhead depth image 124. The item tracking device 104 uses these characteristics to confirm that a user's hand is above the platform 202, for example, when the user places an item 204 on the platform 202.

At operation 708, the item tracking device 104 determines that a first portion 806 of a first object (e.g. a user's hand and arm) is within the region-of-interest 802 in the second overhead depth image 124. Here, the item tracking device 104 confirms that a first portion 806 of the detected object which corresponds with the user's hand is within the region-of-interest 802 in the second overhead depth image 124. Returning to the example in FIG. 8B, the user's hand (shown as portion 806 of the object 804) is at least partially within the region-of-interest 802 in the second overhead depth image 124.

Returning to FIG. 7 at operation 710, the item tracking device 104 determines that a second portion 808 of the first object (e.g. a user's wrist or arm) is outside of the region-of-interest 802 while the first portion 806 of the first object (e.g. a user's hand) is within the region-of-interest 802 in the second overhead depth image 124. Returning to the example in FIG. 8B, the user's wrist and arm (shown as portion 808 of the object 804) is at least partially outside of the region-of-interest 802 while the user's hand (shown as portion 806 of the object 804) is within the region-of-interest 802 in the second overhead depth image 124. These characteristics allow the item tracking device 104 to confirm that a user's hand has been detected in the second overhead depth image 124.

After detecting the user's hand, the item tracking device 104 begins periodically capturing additional overhead depth images 124 of the platform 202 to check whether a user's hand has exited the region-of-interest 802 for the platform 202. At operation 712, the item tracking device 104 captures a third overhead depth image 124 using the 3D sensor 110 at a third time instance. The item tracking device 104 may capture additional overhead depth images 124 every second, every ten seconds, every thirty seconds, or at any other suitable time interval. In some embodiments, the item tracking device 104 may capture the third overhead depth image 124 in response to a weight change or difference on the platform 202. For example, the item tracking device 104 may use a weight sensor 112 to determine a first weight value at the first time instance when no items 204 are placed on the platform 202. The item tracking device 104 may then use the weight sensor 122 to determine a second weight value at a later time after the user places an item 204 on the platform 202. In this example, the item tracking device 104 detects a weight difference between the first weight value and the second weight value and then captures the third overhead depth image 124 in response to detecting the weight difference.

At operation 714, the item tracking device 104 determines whether the first object (i.e. the user's hand) is still present within the region-of-interest 802 in the third overhead depth image 124. Here, the item tracking device 104 may determine whether the first object is present still within the region-of-interest 802 based on differences between the second overhead depth image 124 and the third overhead depth image 124. Referring to the example in FIG. 8D, the item tracking device 104 compares the third overhead depth image 124 (shown in FIG. 8D) to the second overhead depth image 124 (shown in FIG. 8B) to identify differences between the third overhead depth image 124 and the second overhead depth image 124. In this example, the item tracking device 104 detects the first object 804 corresponding with the user's hand is no longer present within the in region-of-interest 802 in the third overhead depth image 124.

Returning to FIG. 7 at operation 714, the item tracking device 104 returns to operation 712 in response to determining that the first object 804 is still present within the region-of-interest 802 in the third overhead depth image 124. In this case, the item tracking device 104 returns to operation 712 to continue periodically checking for when the user's hand exits the region-of-interest 802 for the platform 202. The item tracking device 104 proceeds to operation 716 in response to determining that the first object 804 is no longer present within the region-of-interest 802 in the third overhead depth image 124. In this case, the item tracking device 104 begins checking for any items 204 that the user placed onto the platform 202.

At operation 716, the item tracking device 104 determines whether an item 204 is within the region-of-interest 802 in the third overhead depth image 124. When an item 204 is placed on the platform 202, the item 204 will typically be completely within the region-of-interest 802 in the third overhead depth image 124. The item tracking device 104 uses this characteristic to distinguish between an item 204 that is placed on the platform 202 and the hand of a user. Returning to the example in FIG. 8D, the item tracking device 104 detects that there is an item 204 within the region-of-interest 802 in the third overhead depth image 124.

Returning to FIG. 7 at operation 716, the item tracking device 104 returns to operation 704 in response to determining that an item 204 is not present within the region-of-interest 802 in the third overhead depth image 124. In this case, the item tracking device 104 determines that the user did not place any items 204 onto the platform 202. The item tracking device 104 returns to operation 704 to repeat the hand detection process to detect when the user's hand reenters the region-of-interest 802 for the platform 202. The item tracking device 104 proceeds to operation 718 in response to determining that an item 204 is present within the region-of-interest 802 in the third overhead depth image 124. In this case, the item tracking device 104 proceeds to operation 718 to begin capturing images 122 and/or depth images 124 of the item 204 for additional processing such as item identification.

At operation 718, the item tracking device 104 captures an image 122 of the item 204 in response to determining that the first object 804 is no longer present within the region-of-interest 802 in the third overhead depth image 124 and that an item 204 is present within the region-of-interest 802 in the third overhead depth image 124. The item tracking device 104 may use one or more cameras 108 and/or 3D sensors 110 to capture images 122 or depth images 124, respectively, of the item 204 that is placed on the platform 202.

In some embodiments, the item tracking device 104 may capture an image 122 in response to detecting a weight change or difference on the platform 202. For example, the item tracking device 104 may use a weight sensor 112 to determine a first weight value at the first time instance when no items 204 are placed on the platform 202. The item tracking device 104 may then use the weight sensor 122 to determine a second weight value at a later time after the user places the item 204 on the platform 202. In this example, the item tracking device 104 detects a weight difference between the first weight value and the second weight value and then captures image 122 in response to detecting the weight difference.

Figure 23:
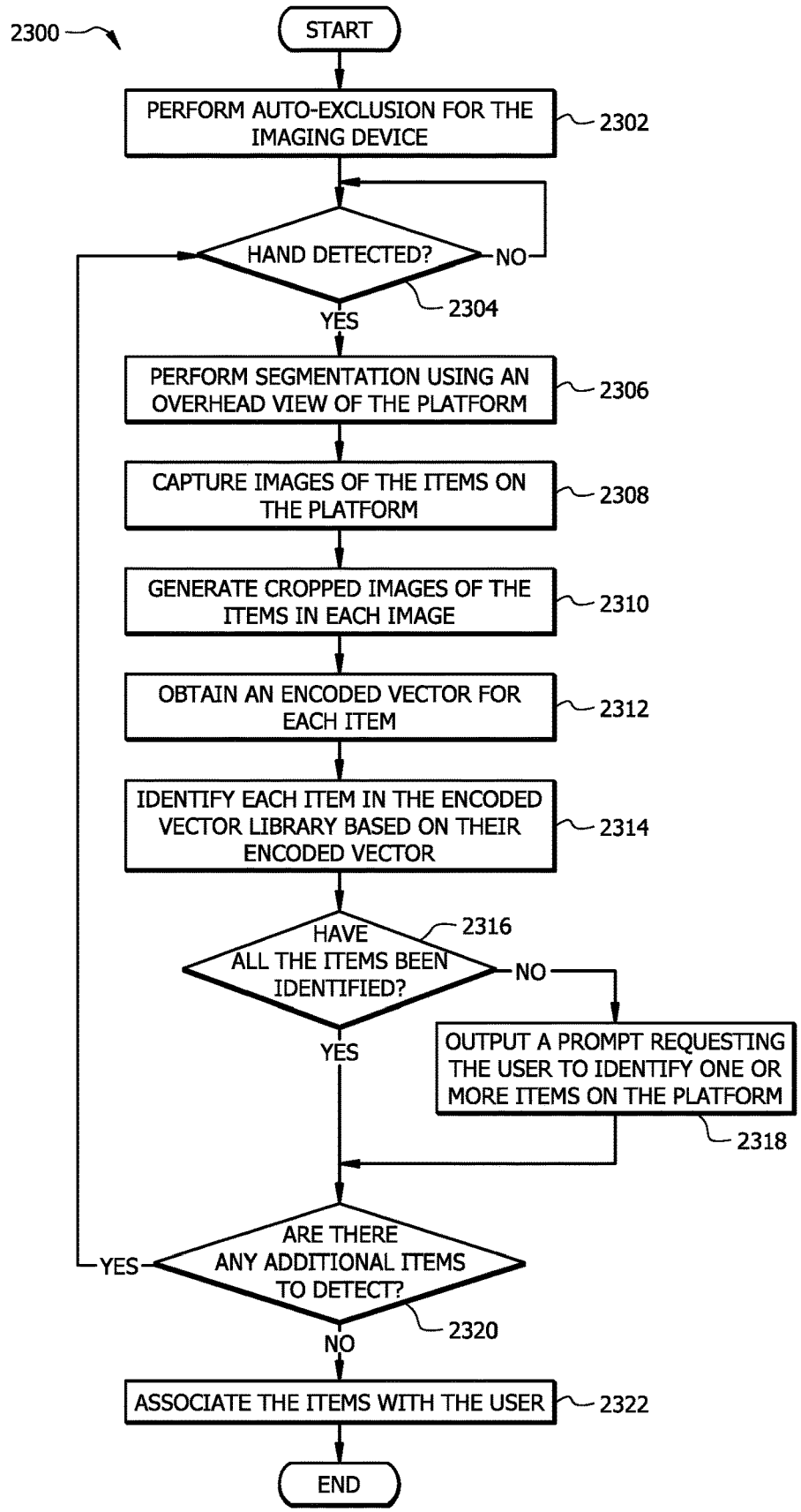
FIG. 23 is a flowchart of an embodiment of an item tracking process using encoded vectors.

After capturing the image 122 of the item 204, the item tracking device 104 may use a process similar to processes 300 and 2300 that are described in FIGS. 3 and 23, respectively, to identify items 204 that are placed on the platform 202 based on physical attributes of the item 204 that are present in the captured image 122.

Image Cropping Process for Item Identification

Figure 9:
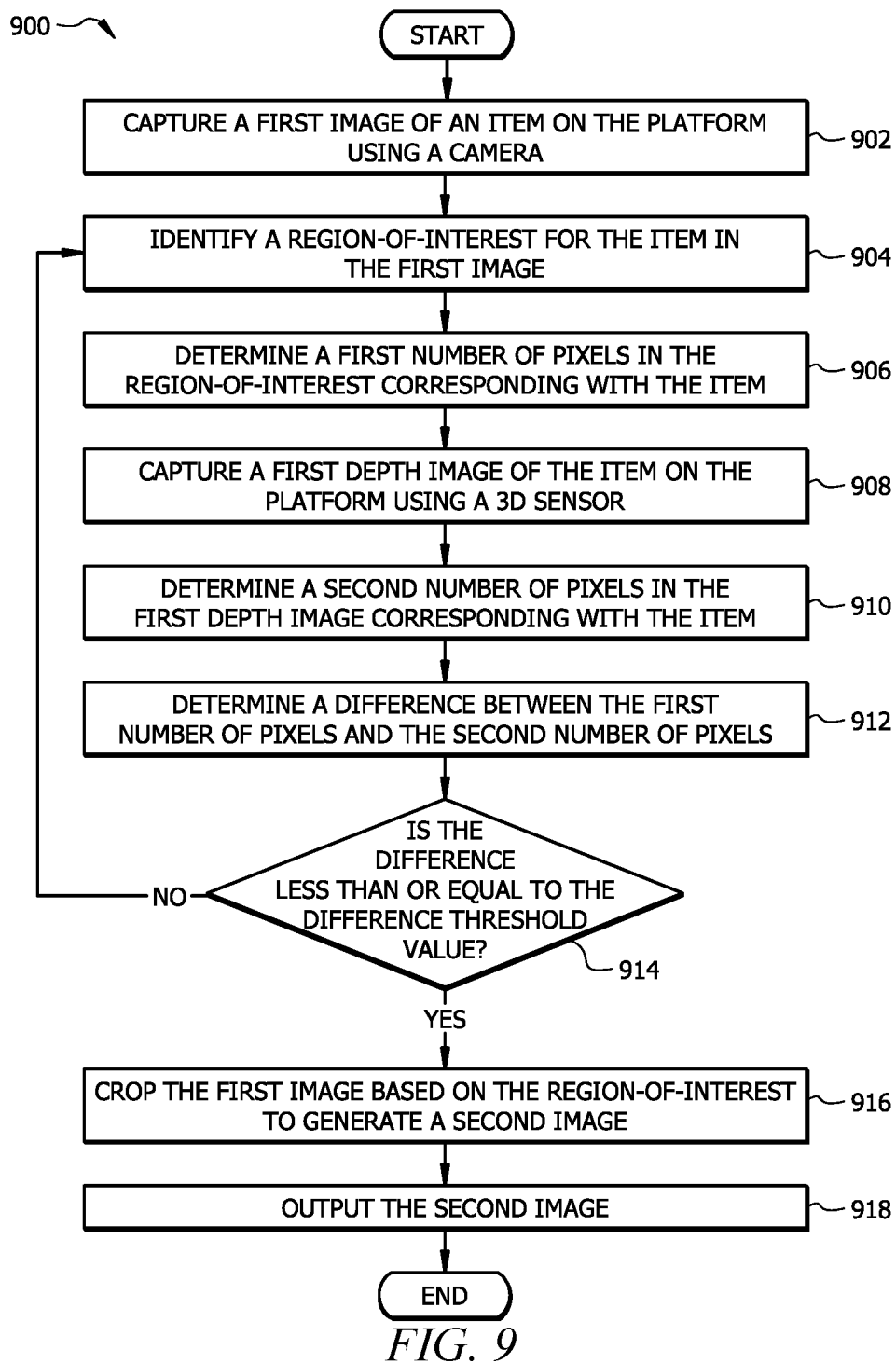
FIG. 9 is a flowchart of an embodiment of an image cropping process for item identification.

FIG. 9 is a flowchart of an embodiment of an image cropping process 900 for item identification by the item tracking system 100. The item tracking system 100 may employ process 900 to isolate items 204 within an image 122. For example, when a camera 108 captures an image 122 of the platform 202, the image 122 may contain multiple items 204 that are placed on the platform 202. To improve the accuracy when identifying an item 204, the item tracking device 104 first crops the image 122 to isolate each item 204 within the image 122. Cropping the image 122 generates a new image 122 (i.e. a cropped image 122) that comprises pixels from the original image 122 that correspond with an item 204. The item tracking device 104 repeats the process to create a set of cropped images 122 that each correspond with an item 204.

At operation 902, the item tracking device 104 captures a first image 122 of an item 204 on the platform 202 using a camera 108. The item tracking device 104 may use a camera 108 with an overhead, perspective, or side profile view to capture the first image 122 of the item 204 on the platform 202. As an example, the camera 108 may be configured with an overhead view to capture upward-facing surfaces of the item 204. As another example, the camera 108 may be configured with a perspective or side profile view to capture the side-facing surfaces of the item 204.

At operation 904, the item tracking device 104 identifies a region-of-interest 1002 for the item 204 in the first image 122. The region-of-interest 1002 comprises a plurality of pixels that correspond with an item 204 in the first image 122. An example of a region-of-interest 1002 is a bounding box. In some embodiments, the item tracking device 104 may employ one or more image processing techniques to identify a region-of-interest 1002 for an item 204 within the first image 122. For example, the item tracking device 104 may employ object detection and/or OCR to identify text, logos, branding, colors, barcodes, or any other features of an item 204 that can be used to identify the item 204. In this case, the item tracking device 104 may process the pixels within the first image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g. a product name) from the first image 122 and may compare the text to a set of text that is associated with different items 204. As another example, the item tracking device 104 may determine a dominant color within the first image 122 and may compare the dominant color to a set of colors that are associated with different items 204. As another example, the item tracking device 104 may identify a barcode within the first image 122 and may compare the barcode to a set of barcodes that are associated with different items 204. As another example, the item tracking device 104 may identify logos or patterns within the first image 122 and may compare the identified logos or patterns to a set of logos or patterns that are associated with different items 204. In other examples, the item tracking device 104 may identify any other suitable type or combination of features and compare the identified features to features that are associated with different items 204.

After comparing the identified features from the first image 122 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within the first image 122 matches the features of an item 204, the item tracking device 104 identifies a region-of-interest 1002 that corresponds with the matching item 204. In other embodiments, the item tracking device 104 may employ any other suitable type of image processing techniques to identify a region-of-interest 1002. FIGS. 10A, 10B, 10C, and 10D illustrate examples of region-of-interest 1002 for the item 204.

At operation 906, the item tracking device 104 determines a first number of pixels in the region-of-interest 1002 that correspond with the item 204 in the first image 122. Here, the item tracking device 104 counts the number of pixels within the plurality of pixels in the identified region-of-interest 1002. The number of pixels within the region-of-interest 1002 is proportional to how much of the first item 204 was detected within the first image 122. For example, a greater number of pixels within the region-of-interest 1002 indicates that a larger portion of the item 204 was detected within the first image 122. Alternatively, a fewer number of pixels within the region-of-interest 1002 indicates that a smaller portion of the item 204 was detected within the first image 122. In some instances, a small number of pixels within the region-of-interest 1002 may indicate that only a small portion of the item 204 was visible to the selected camera 108 or that the region-of-interest 1002 was incorrectly identified. The item tracking device 104 proceeds to operation 908 to determine whether the region-of-interest 1002 was correctly identified.

At operation 908, the item tracking device 104 captures a first depth image 124 of the item 204 on the platform using a 3D sensor 110. Here, the item tracking device 104 uses a 3D sensor 110 to capture a first depth image 124 with a similar view of the item 204 that was captured by the camera 108 in operation 902. For example, the item tracking device 104 may use a 3D sensor 110 that is configured with an overhead view of the item 204 when a camera 108 with an overhead view of the item 204 is used to capture the first image 122. As another example, the item tracking device 104 may use a 3D sensor 110 that is configured with a perspective or side profile view of the item 204 when a camera 108 with a perspective or side profile view of the item 204 is used to capture the first image 122. In other examples, the item tracking device 104 may use a 3D sensor 110 that has any other type of view of the item 204 that is similar the view captured in the first image 122. FIGS. 10A, 10B, 10C, and 10D illustrate examples of the first depth image 124.

At operation 910, the item tracking device 104 determines a second number of pixels in the first depth image 124 corresponding with the item 204. Here, the item tracking device 104 counts the number of pixels within the first depth image 124 that correspond with the item 204. In some embodiments, the item tracking device 104 may use a depth threshold value to distinguish between pixels corresponding with the item 204 and other items 204 or the platform 202. For example, the item tracking device 104 may set a depth threshold value that is behind the surface of the item 204 that is facing the 3D sensor 110. After applying the depth threshold value, the remaining pixels in the first depth image 124 correspond with the item 204. The item tracking device 104 may then count the remaining number of pixels within the first depth image 124 after applying the depth threshold value to the first depth image 124.

At operation 912, the item tracking device 104 determines a difference between the first number of pixels and the second number of pixels. Here, the item tracking device 104 the difference between the number of pixels for the item 204 from the region-of-interest 1002 and the number of pixels for the item 204 from the first depth image 124 to determine how similar the two values are to each other. For example, the item tracking device 104 may subtract the first number of pixels from the second number of pixels to determine the difference between the two values. In this example, the item tracking device 104 may use the absolute value of the difference between the two values.

Figure 10A:
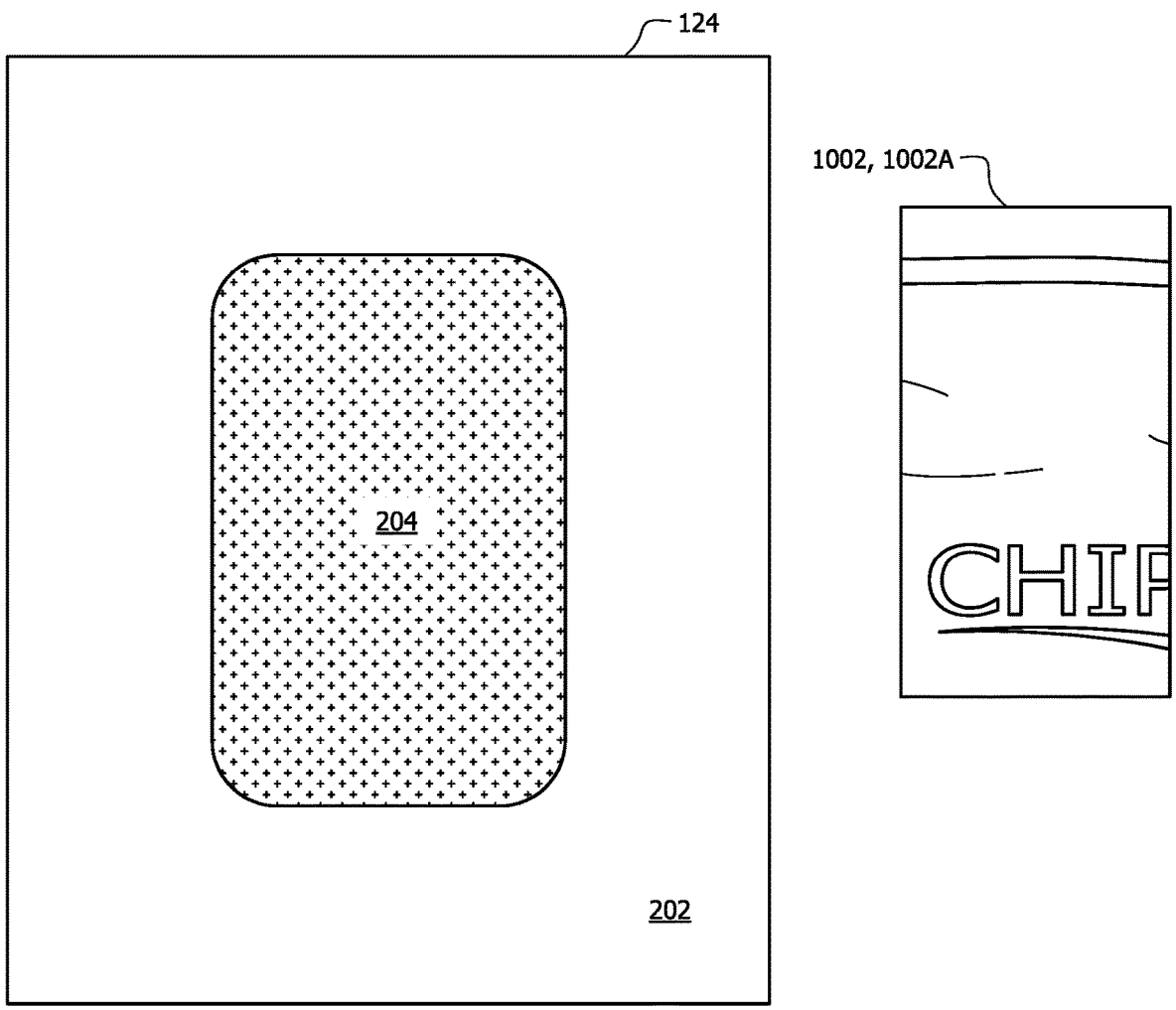
FIG. 10A is an example of a depth image of an item on the platform of the imaging device and a region-of-interest from an image capturing the item.
Figure 10B:
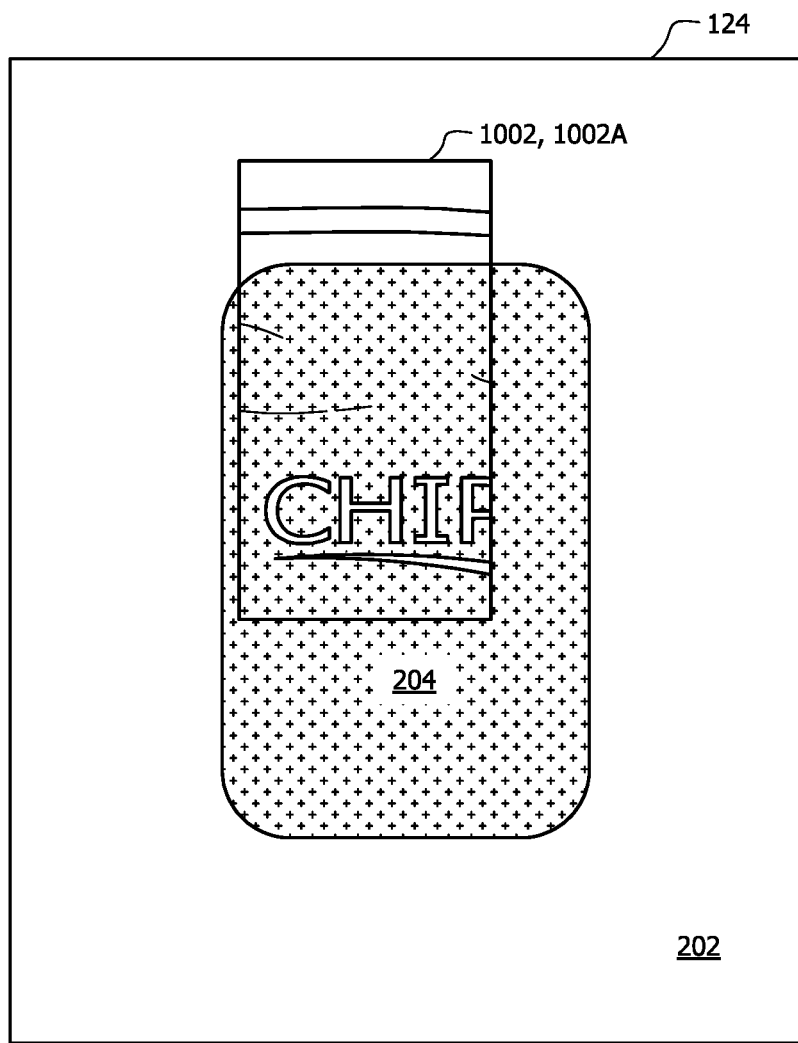
FIG. 10B is an example of overlaying the region-of-interest from the image capturing the item onto the depth image of the item.

At operation 914, the item tracking device 104 determines whether the difference is less than or equal to a difference threshold value. The distance threshold value is a user-defined value that identifies a maximum pixel difference for the identified region-of-interest 1002 to be considered valid for additional processing. An invalid region-of-interest 1002 means that the difference between the number of pixels for the item 204 in the region-of-interest 1002 and the number of pixels for the item 204 in the first depth image 124 is too great. An invalid region-of-interest 1002 indicates that the region-of-interest 1002 captures a smaller portion of the item 204 than is visible from the camera 108 and the 3D sensor 110. Since an invalid region-of-interest 1002 only captures a small portion of the item 204, the region-of-interest 1002 may not be suitable for subsequent image processing after cropping the first image 122 using the region-of-interest 1002. Referring to FIG. 10A as an example of an invalid region-of-interest 1002, the item tracking device 104 identifies a first region-of-interest 1002A and the first depth image 124 of the item 204. In this example, the difference between the number of pixels for the item 204 in the region-of-interest 1002 and the number of pixels for the item 204 in the first depth image 124 is greater than the difference threshold value. An example of the first region-of-interest 1002A overlaid with the item 204 in the first depth image 124 is shown in FIG. 10B.

Figure 10C:
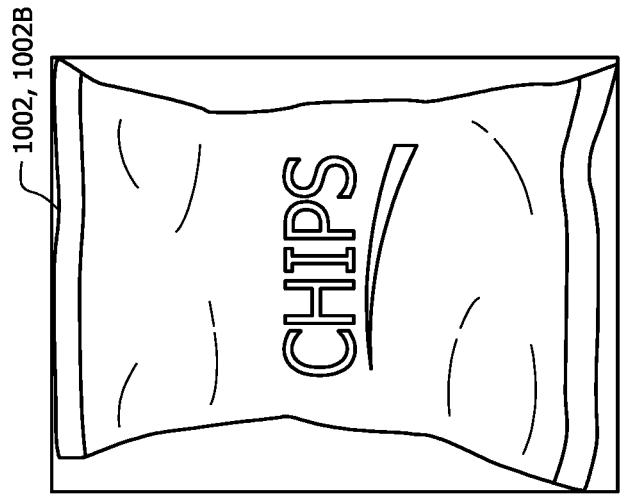
FIG. 10C is another example of a depth image of an item on the platform of the imaging device and a region-of-interest from an image capturing the item.
Figure 10C:
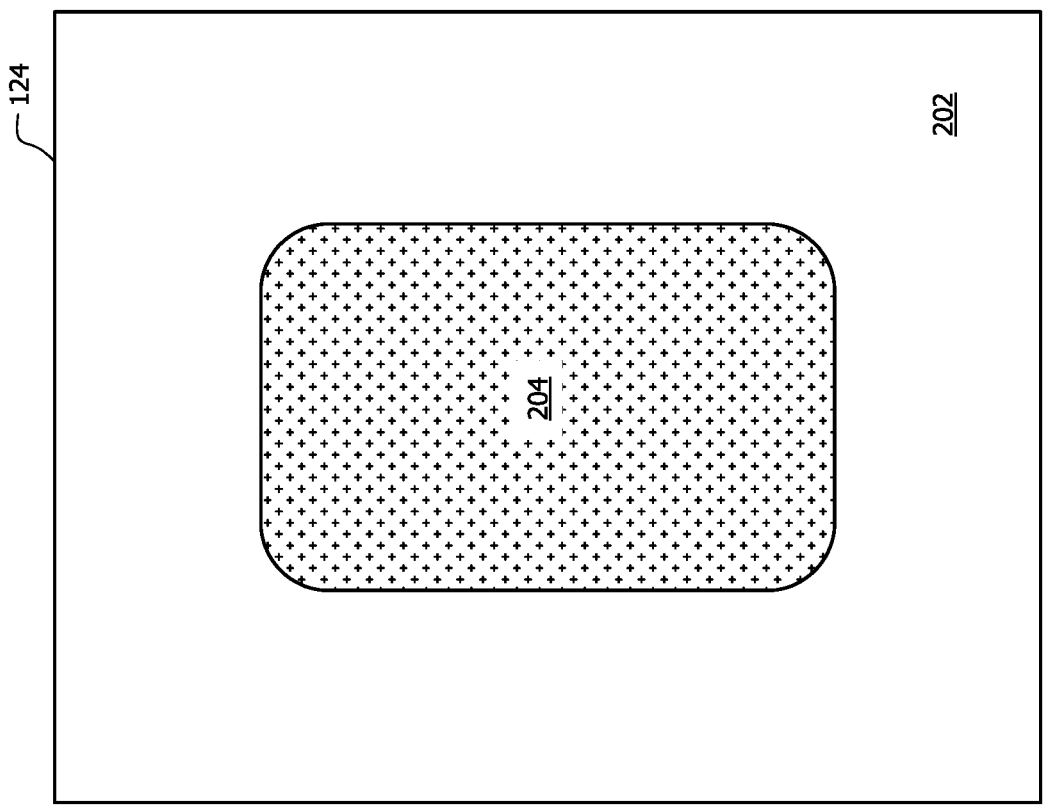
Figure 10D:
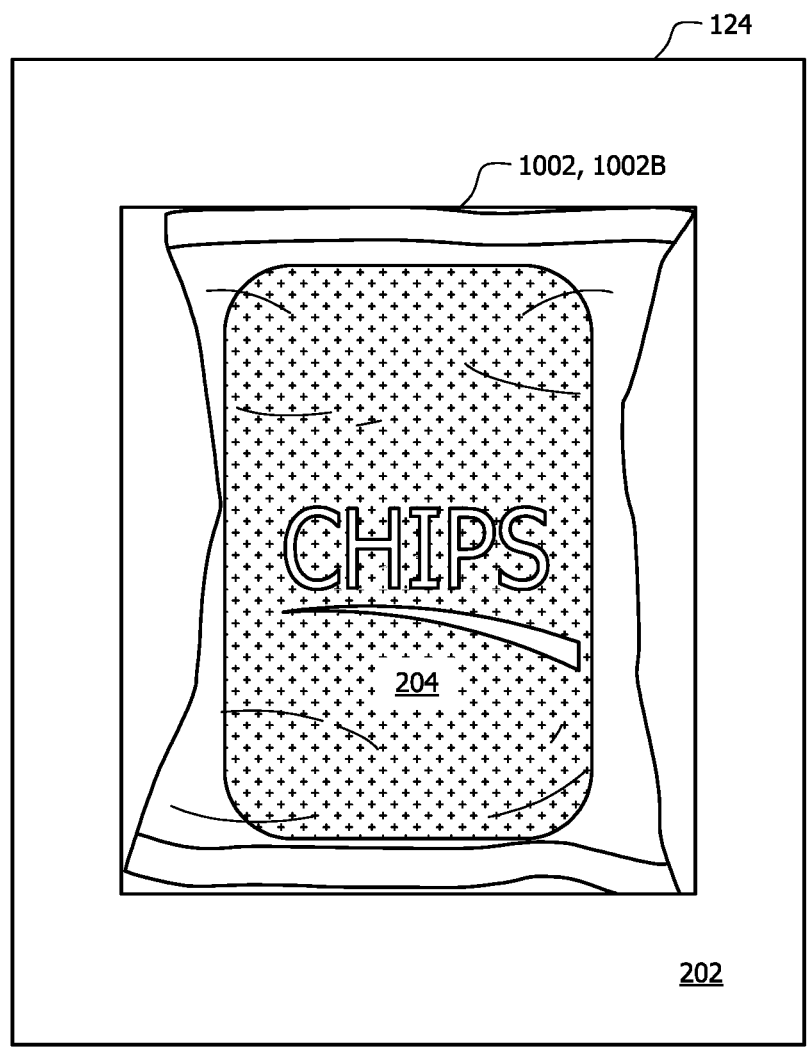
FIG. 10D is another example of overlaying the region-of-interest from the image capturing the item onto the depth image of the item.

A valid region-of-interest 1002 means that the difference between the number of pixels for the item 204 in the region-of-interest 1002 and the number of pixels for the item 204 in the first depth image 124 is within a predetermined tolerance level (i.e. the difference threshold value). Referring to FIG. 10C as an example of a valid region-of-interest 1002, the item tracking device 104 identifies a second region-of-interest 1002B and the first depth image 124 of the item 204. In this example, the difference between the number of pixels for the item 204 in the region-of-interest 1002 and the number of pixels for the item 204 in the first depth image 124 is less than or equal to the difference threshold value. An example of the second region-of-interest 1002B overlaid with the item 204 in the first depth image 124 is shown in FIG. 10D.

Returning to FIG. 9, the item tracking device 104 returns to operation 904 in response to determining that the difference is greater than the difference threshold value. In this case, the item tracking device 104 discards the current region-of-interest 1002 and returns to operation 904 to obtain a new region-of-interest 1002 for the item 204. The item tracking device 104 proceeds to operation 916 in response to determining that the difference is less than or equal to the difference threshold value. In this case, the item tracking device 104 proceeds to operation 916 to crop the first image 122 using the identified region-of-interest 1002.

At operation 916, the item tracking device 104 crops the first image 122 based on the region-of-interest 1002. After determining that the region-of-interest 1002 is valid additional processing, the item tracking device 104 crops the first image 122 by extracting the pixels within the region-of-interest 1002 from the first image 122. By cropping the first image 122, the item tracking device 104 generates a second image 122 that comprises the extracted pixels within the region-of-interest 1002 of the first image 122.

At operation 918, the item tracking device 104 outputs the second image 122. After generating the second image 122, the item tracking device 104 may output the second image 122 for additional processing. For example, the item tracking device 104 may output the second image 122 by inputting or loading the second image 122 into a machine learning model 126 to identify the item 204 using a process similar to process 2300 that is described in FIG. 23. As another example, the item tracking device 104 may associate the second image 122 with feature descriptors 1608 (e.g. an item type 1610, dominant color 1612, dimensions 1614, weight 1616) for the item 204 using a process similar to process 2300 that is described in FIG. 23.

Item Location Detection Process

Figure 11:
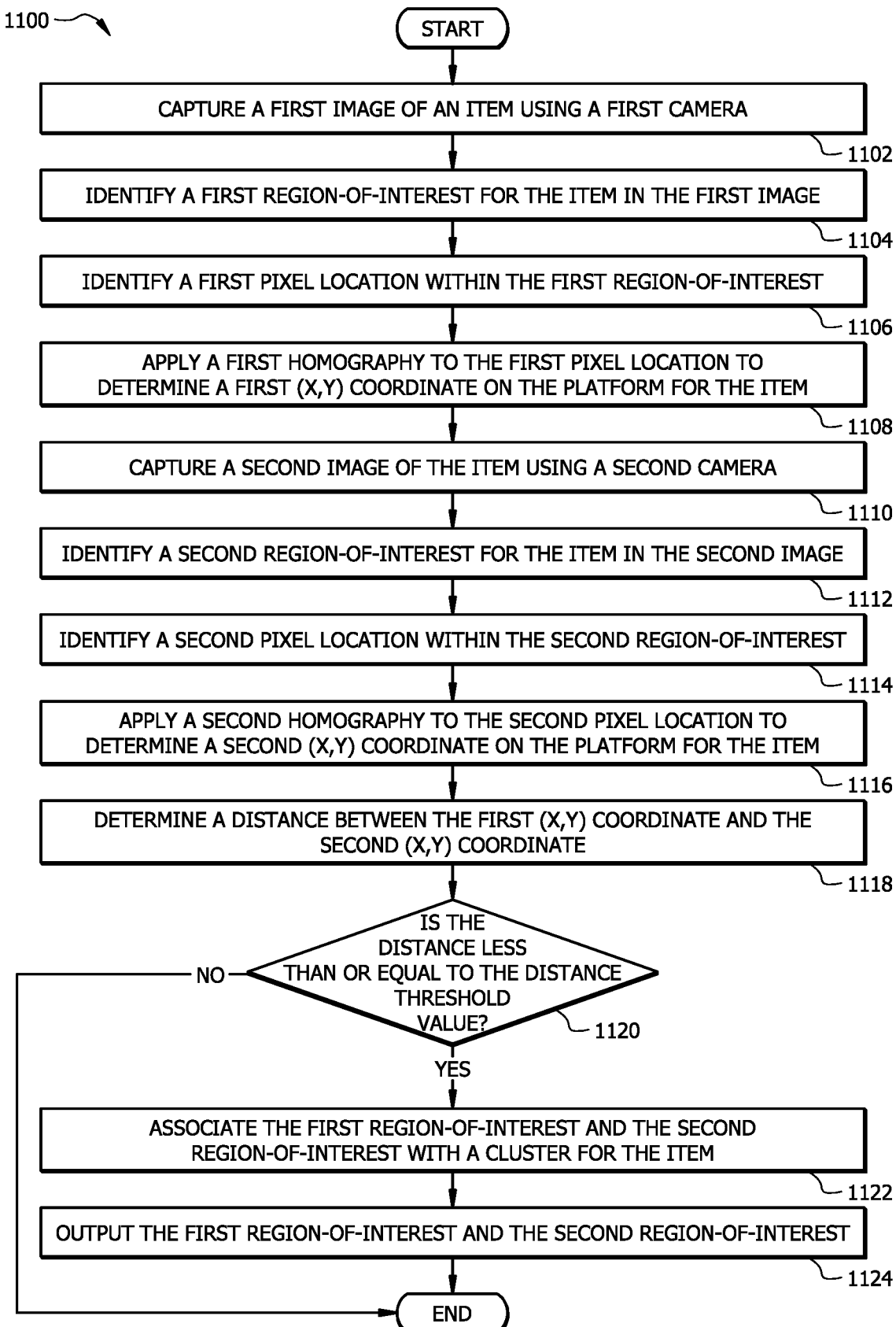
FIG. 11 is a flowchart of an embodiment of an item location detection process.

FIG. 11 is a flowchart of an embodiment of an item location detection process 1100 for the item tracking system 100. The item tracking system 100 may employ process 1100 to identify groups of images 122 that correspond with the same item 204. The item tracking device 104 typically uses multiple cameras 108 to capture images 122 of the items 204 on the platform 202 from multiple perspectives. This process allows the item tracking device 104 to use redundancy to ensure that all of the items 204 are visible in at least one of the captured images 122. Since each camera 108 has a different physical location and perspective of the platform 202, the items 204 will appear in different locations in each of the captured images 122. To resolve this issue, the item tracking device 104 uses homographies 608 to cluster together images 122 of the same item 204 based on each item's 204 physical location on the platform 202. This process allows the item tracking device 104 to generate a set of images 122 for each item 204 that is on the platform 202 using the captured images 122 from the multiple camera perspectives.

Generating a Homography

The item tracking device 104 is configured to generate and use homographies 608 to map pixels from the cameras 108 and 3D sensors 110 to the platform 202. An example of a homography 608 is described below in FIGS. 12A and 12B. By generating a homography 608 the item tracking device 104 is able to use the location of an item 204 within an image 122 to determine the physical location of the item 204 with respect to the platform 202, the cameras 108, and the 3D sensors 110. This allows the item tracking device 104 to use the physical location of the item 204 to cluster images 122 and depth images 124 of an item 204 together for processing. Each homography 608 comprises coefficients that are configured to translate between pixel locations in an image 122 or depth image 124 and (x,y) coordinates in a global plane (i.e. physical locations on the platform 202). Each image 122 and depth image 124 comprises a plurality of pixels. The location of each pixel within an image 122 or depth image 124 is described by its pixel location 1202 which identifies a pixel row and a pixel column for a pixel where the pixel is located within an image 122 or depth image 124.

The item tracking device 104 uses homographies 608 to correlate between a pixel location in a particular camera 108 or 3D sensor 110 with a physical location on the platform 202. In other words, the item tracking device 104 uses homographies 608 to determine where an item 204 is physically located on the platform 202 based on their pixel location 1202 within an image 122 or depth image 124 from a camera 108 or a 3D sensor 110, respectively. Since the item tracking device 104 uses multiple cameras 108 and 3D sensors 110 to monitor the platform 202, each camera 108 and 3D sensor 110 is uniquely associated with a different homography 608 based on the camera's 108 or 3D sensor's 110 physical location on the imaging device 102. This configuration allows the item tracking device 104 to determine where an item 204 is physically located on the platform 202 based on which camera 108 or 3D sensor 110 it appears in and its location within an image 122 or depth image 124 that is captured by that camera 108 or 3D sensor 110. In this configuration, the cameras 108 and the 3D sensors 110 are configured to capture images 122 and depth images 124, respectively, of at least partially overlapping portions of the platform 202.

Figure 12A:
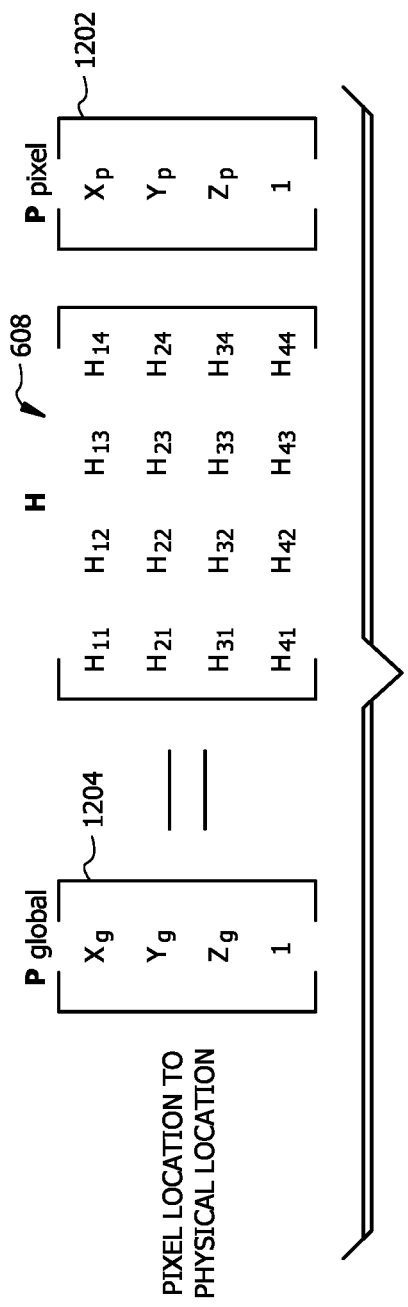
FIG. 12A is an example of a homography for the item tracking system.

Referring to FIG. 12A, a homography 608 comprises a plurality of coefficients configured to translate between pixel locations 1202 in an image 122 or a depth image 124 and physical locations (e.g. (x,y) coordinates 1204) in a global plane that corresponds with the top surface of the platform 202. In this example, the homography 608 is configured as a matrix and the coefficients of the homography 608 are represented as $H_{11}$, $H_{12}$, $H_{13}$, $H_{14}$, $H_{21}$, $H_{22}$, $H_{23}$, $H_{24}$, $H_{31}$, $H_{32}$, $H_{33}$, $H_{34}$, $H_{41}$, $H_{42}$, $H_{43}$, and $H_{44}$. The item tracking device 104 may generate the homography 608 by defining a relationship or function between pixel locations 1202 in an image 122 or a depth image 124 and physical locations (e.g. (x,y) coordinates 1204) in the global plane using the coefficients. For example, the item tracking device 104 may define one or more functions using the coefficients and may perform a regression (e.g. least squares regression) to solve for values for the coefficients that project pixel locations 1202 of an image 122 or a depth image 124 to (x,y) coordinates 1204 in the global plane. Each (x,y) coordinate 1204 identifies an x-value and a y-value in the global plane where an item is located on the platform 202. In other examples, the item tracking device 104 may solve for coefficients of the homography 608 using any other suitable technique. In the example shown in FIG. 5A, the z-value at the pixel location 1202 may correspond with a pixel value that represents a distance, depth, elevation, or height. In this case, the homography 608 is further configured to translate between pixel values in a depth image 124 and z-coordinates (e.g. heights or elevations) in the global plane.

Figure 12B:
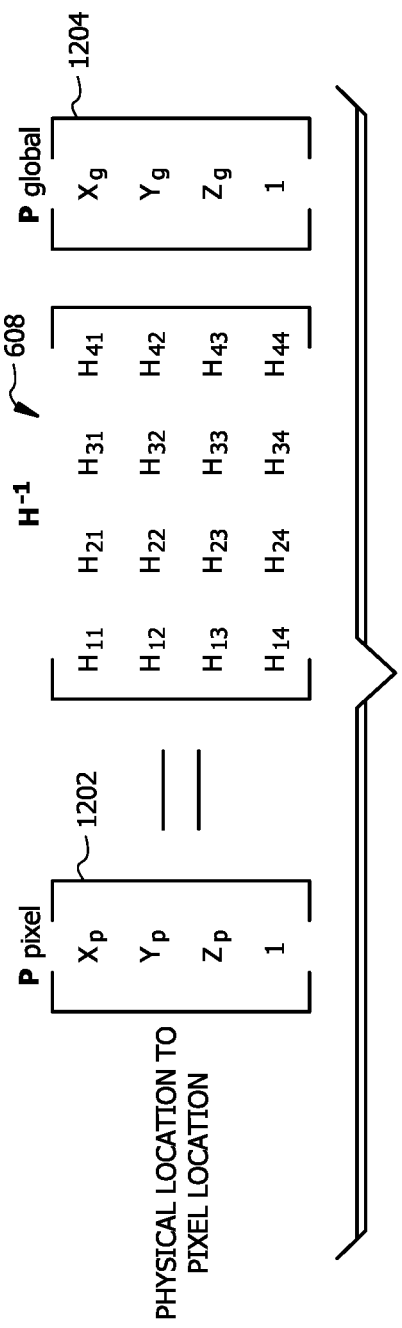
FIG. 12B is an example of an inverse homography for the tracking system.

The item tracking device 104 may use the inverse of the homography 608 to project from (x,y) coordinates 1204 in the global plane to pixel locations 1202 in an image 122 or depth image 124. For example, the item tracking device 104 receives an (x,y) coordinate 1204 in the global plane for an object. The item tracking device 104 identifies a homography 608 that is associated with a camera 108 or 3D sensor 110 where the object is seen. The item tracking device 104 may then apply the inverse homography 608 to the (x,y) coordinate 1204 to determine a pixel location 1202 where the object is located in the image 122 or depth image 124. The item tracking device 104 may compute the matrix inverse of the homograph 608 when the homography 608 is represented as a matrix. Referring to FIG. 12B as an example, the item tracking device 104 may perform matrix multiplication between an (x,y) coordinates 1204 in the global plane and the inverse homography 608 to determine a corresponding pixel location 1202 in the image 122 or depth image 124.

Additional information about generating a homography 608 and using a homography 608 is disclosed in U.S. Pat. No. 11,023,741 entitled, "DRAW WIRE ENCODER BASED HOMOGRAPHY" which is hereby incorporated by reference herein as if reproduced in its entirety.

Using Homographies to Determine an Item's Location

Figure 13A:
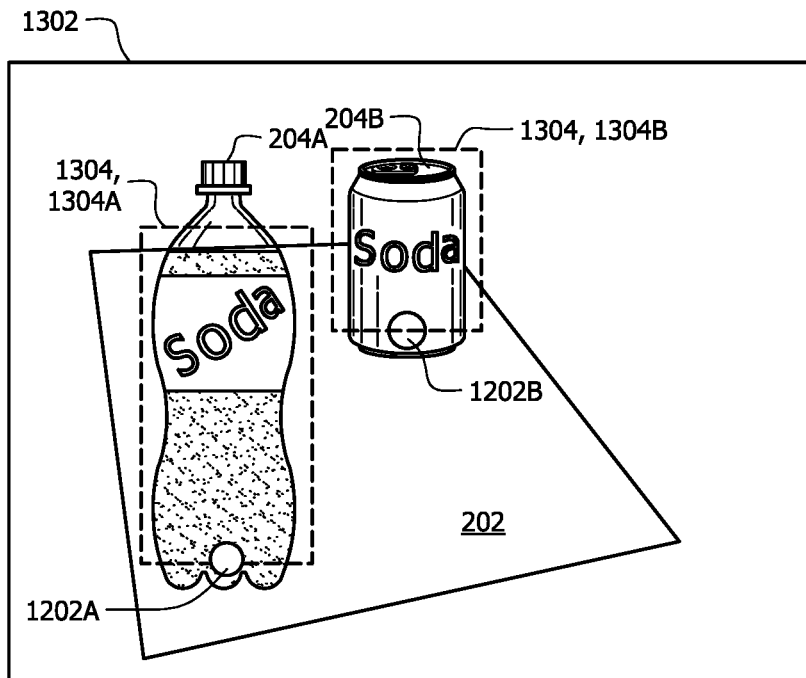
FIG. 13A is an example of an image captured by a camera with regions-of-interest for items on the platform of the imaging device.
Figure 13B:
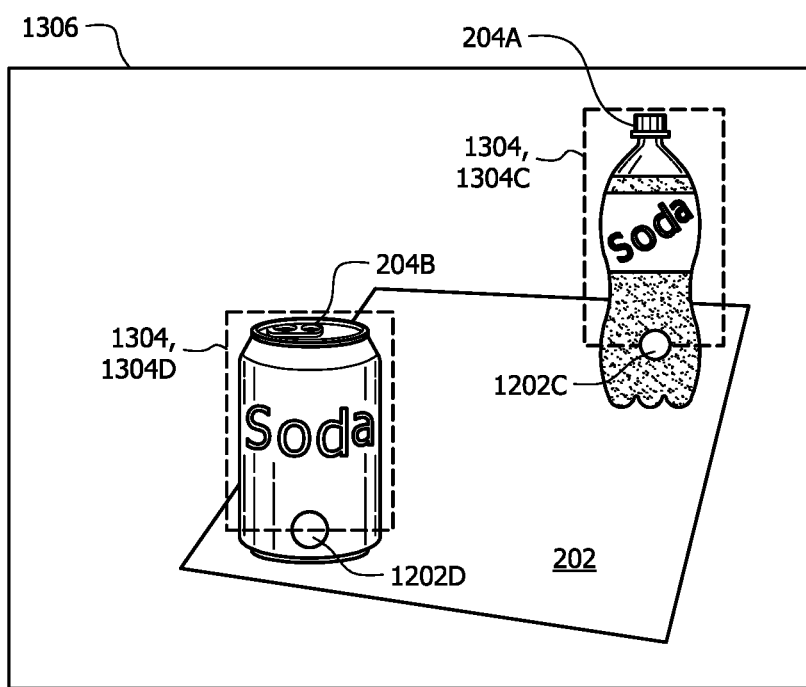
FIG. 13B is another example of an image captured by a camera with regions-of-interest for items on the platform of the imaging device.

Returning to FIG. 11, after generating homographies 608 for the cameras 108 and/or 3D sensors 110, the item tracking device 104 may then use the homographies 608 to cluster images 122 and depth images 124 of items 204 together for processing. At operation 1102, the item tracking device 104 captures a first image 122 of an item 204 using a first camera 108. The first camera 108 may be configured upward-facing surfaces and/or side surfaces of the items 204 on the platform 202. Referring to FIG. 13A, the item tracking device 104 uses a first camera 108 to capture a first image 1302 of items 204A and 204B that are on the platform 202.

Returning to FIG. 11 at operation 1104, the item tracking device 104 identifies a first region-of-interest 1304 for an item 204 in the first image 122. The first region-of-interest 1304 comprises a plurality of pixels that correspond with the item 204 in the first image 122. An example of a region-of-interest 1304 is a bounding box. In some embodiments, the item tracking device 104 may employ one or more image processing techniques to identify a region-of-interest 1304 for an item 204 within the first image 122. For example, the item tracking device 104 may employ object detection and/or OCR to identify text, logos, branding, colors, barcodes, or any other features of an item 204 that can be used to identify the item 204. In this case, the item tracking device 104 may process pixels within an image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g. a product name) from an image 122 and may compare the text to a set of text that is associated with different items 204. As another example, the item tracking device 104 may determine a dominant color within an image 122 and may compare the dominant color to a set of colors that are associated with different items 204. As another example, the item tracking device 104 may identify a barcode within an image 122 and may compare the barcode to a set of barcodes that are associated with different items 204. As another example, the item tracking device 104 may identify logos or patterns within the image 122 and may compare the identified logos or patterns to a set of logos or patterns that are associated with different items 204. In other examples, the item tracking device 104 may identify any other suitable type or combination of features and compare the identified features to features that are associated with different items 204.

After comparing the identified features from an image 122 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within an image 122 match the features of an item 204, the item tracking device 104 may identify a region-of-interest 1304 that corresponds with the matching item 204. In other embodiments, the item tracking device 104 may employ any other suitable type of image processing techniques to identify a region-of-interest 1304. Returning to the example in FIG. 13A, the item tracking device 104 identifies a first region-of-interest 1304A corresponding with the first item 204A and a second region-of-interest 1304B corresponding with the second item 204B in the first image 1302.

Returning to FIG. 11 at operation 1106, the item tracking device 104 identifies a first pixel location 1202 within the first region-of-interest 1304. The pixel location 1202 may be any pixel within the first region-of-interest 1304. In some embodiments, the item tracking device 104 may identify a pixel location 1202 that is closest to the platform 202. For example, the item tracking device 104 may identify a pixel location 1202 at a midpoint on a lower edge of the region-of-interest 1304. Returning to the example in FIG. 13A, the item tracking device 104 may identify a pixel location 1202A within the first region-of-interest 1304A for the first item 204A and a pixel location 1202B within the second region-of-interest 1304B for the second item 204B.

Returning to FIG. 11 at operation 1108, the item tracking device 104 applies a first homography 608 to the first pixel location 1202 to determine a first (x,y) coordinate 1204 on the platform 202 for the item 204. For example, the item tracking device 104 identifies a homography 608 that is associated with the first camera 108 and then applies the identified homography 608 to the pixel location 1202 for each item 204 to determine their corresponding (x,y) coordinate 1204 on the platform 202.

At operation 1110, the item tracking device 104 captures a second image 122 of the item 204 using a second camera 108. Here, the item tracking device 104 uses a different camera 108 to capture a different view of the items 204 on the platform 202. The second camera 108 may be configured upward-facing surfaces and/or side surfaces of the items 204 on the platform 202. Referring to the example in FIG. 13B, the item tracking device 104 uses a second camera 108 to capture a second image 1306 of the items 204A and 204B that are on the platform 202. In this example, the second camera 108 is on the opposite side of the platform 202 from the first camera 108. In this example, the first camera 108 captures a first side of the items 204 on the platform 202 and the second camera 108 captures an opposing side of the items 204 on the platform 202. In other examples, the second camera 108 may be in any other suitable location.

Returning to FIG. 11 at operation 1112, the item tracking device 104 identifies a second region-of-interest 1304 for the item 204 in the second image 122. The second region-of-interest 1304 comprises a second plurality of pixels that correspond with the item 204 in the second image 122. The item tracking device 104 may repeat the process described in operation 1104 to identify the second region-of-interest 1304. Returning to the example in FIG. 13B, the item tracking device 104 identifies a third region-of-interest 1304C corresponding with the first item 204A and a fourth region-of-interest 1304D corresponding with the second item 204B in the second image 1306.

Returning to FIG. 11 at operation 1114, the item tracking device 104 identifies a second pixel location 1202 within the second region-of-interest 1304. Returning to the example in FIG. 13B, the item tracking device 104 may identify a pixel location 1202C within the third region-of-interest 1304C for the first item 204A and a pixel location 1202D within the fourth region-of-interest 1304D for the second item 204B.

Returning to FIG. 11 at operation 1116, the item tracking device 104 applies a second homography 608 to the second pixel location 1202 to determine a second (x, y) coordinate 1204 on the platform 202 for the item 204. Here, the item tracking device 104 identifies a homography 608 that is associated with the second camera 108 and then applies the identified homography 608 to the pixel location 1202 for each item 204 to determine their corresponding (x,y) coordinate 1204 on the platform 202.

Figure 13C:
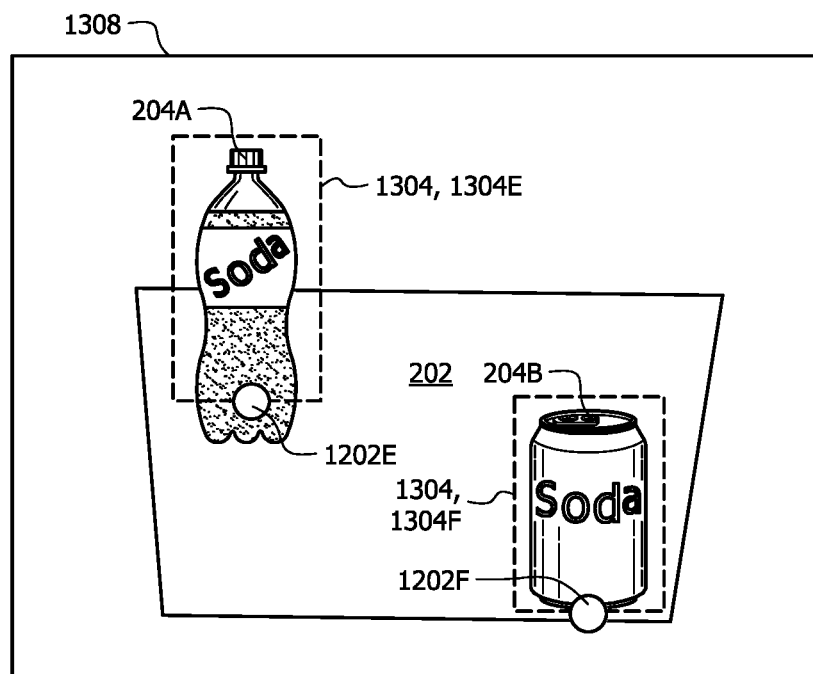
FIG. 13C is another example of an image captured by a camera with regions-of-interest for items on the platform of the imaging device.

The item tracking device 104 may repeat this process for any other suitable number of cameras 108. Referring to FIG. 13C as another example, the item tracking device 104 may use third camera 108 to capture a third image 1308 of the items 204 on the platform 202. The item tracking device 104 may then identify regions-of-interest 1304 and pixel locations 1202 for each item 204. In this example, the item tracking device 104 identifies a region-of-interest 1304E and a pixel location 1202E for the first item 204A and a region-of-interest 1304F and a pixel location 1202F for the second item 204B. After determining the pixel locations 1202 for the items 204, the item tracking device 104 then identifies a homography 608 that is associated with the third camera 108 and applies the identified homography 608 to the pixel location 1202 for each item 204 to determine their corresponding (x,y) coordinate 1204 on the platform 202.

Figure 14:
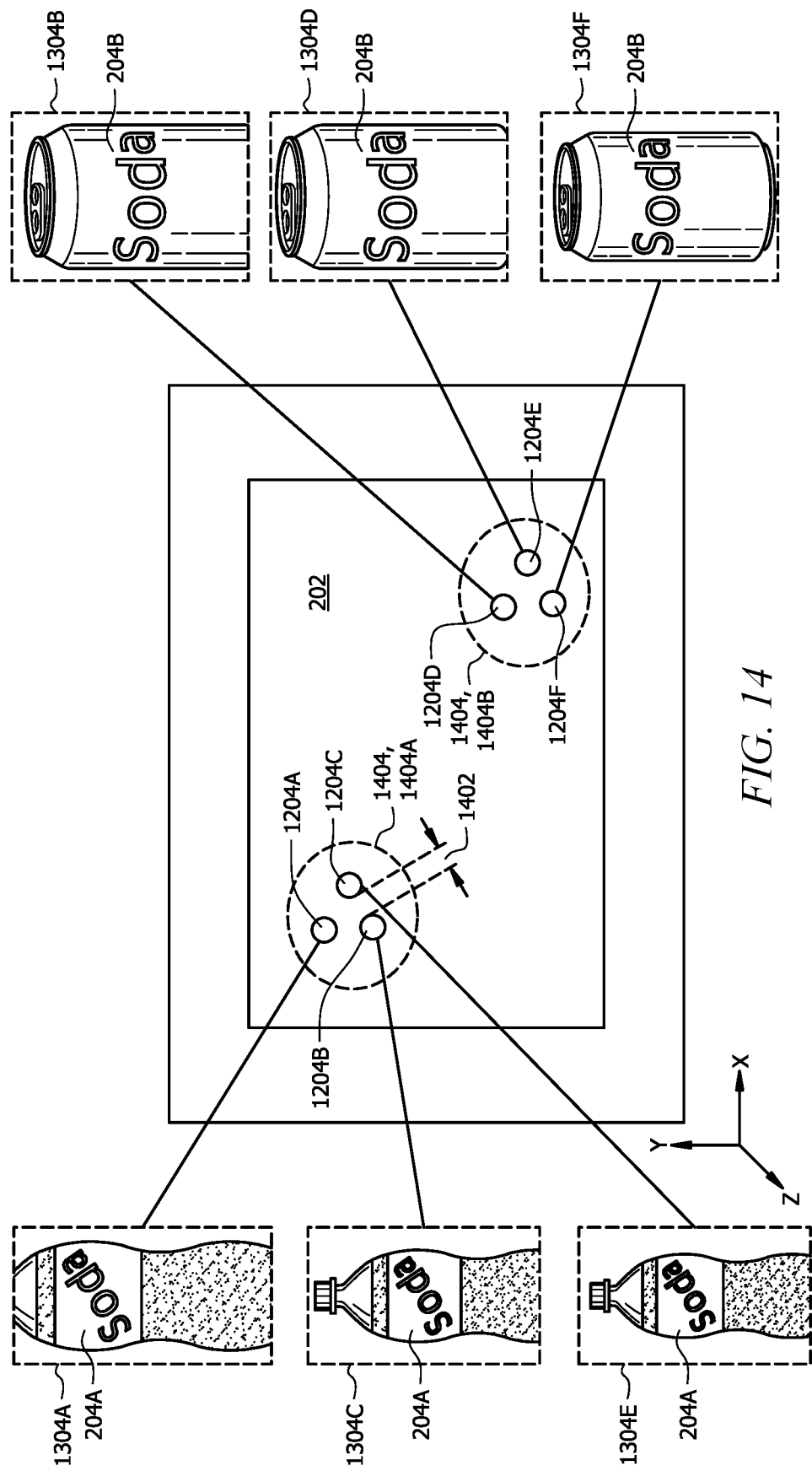
FIG. 14 is an example of an overhead view of the platform of the imaging device with item clusters during item location detection.

Returning to FIG. 11 at operation 1118, the item tracking device 104 determines a distance 1402 between the first (x,y) coordinate 1204 and the second (x,y) coordinate 1204. Referring to FIG. 14 as an example, FIG. 14 shows an overhead view of the platform 202 with the (x,y) coordinates 1204 for each item 204 projected onto the platform 202. In this example, (x,y) coordinates 1204A, 1204B, and 1204C are associated with the first item 204A and (x,y) coordinates 1204D, 1204E, and 1204F are associated with the second item 204B. The item tracking device 104 is configured to iteratively select pairs of (x,y) coordinates 1204 and to determine a distance 1402 between a pair of (x,y) coordinates 1204. In one embodiment, the item tracking device 104 is configured to determine a Euclidian distance between a pair of (x,y) coordinates 1204.

Returning to FIG. 11 at operation 1120, the item tracking device 104 determines whether the distance 1402 is less than or equal to a distance threshold value. The distance threshold value identifies a maximum distance between a pair of (x,y) coordinates 1204 to be considered members of the same cluster 1404 for an item 204. The distance threshold value is a user-defined value that may be set to any suitable value. The distance threshold value may be in units of inches, centimeters, millimeters, or any other suitable units. The item tracking device 104 compares the distance 1402 between a pair of (x,y) coordinates 1204 and the distance threshold value and determines whether the distance 1402 between the pair of (x,y) coordinates 1204 is less than the distance threshold value.

The item tracking device 104 terminates process 1100 in response to determining that the distance 1402 is greater than the distance threshold value. In this case, the item tracking device 104 determines that the pair of (x,y) coordinates 1204 are not members of the same cluster 1404 for an item 204. In some embodiments, the item tracking device 104 may not terminate process 1100, but instead will select another pair of (x,y) coordinates 1204 when additional (x,y) coordinates 1204 are available to compare to the distance threshold value.

The item tracking device 104 proceeds to operation 1122 in response to determining that the distance 1402 is less than or equal to the distance threshold value. In this case, the item tracking device 104 determines that the pair of (x,y) coordinates 1204 are members of the same cluster 1404 for an item 204. At operation 1122, the item tracking device 104 associates the pixels within the first region-of-interest 1304 from the first image 122 and the pixels within the second region-of-interest 1304 from the second image 122 with a cluster 1404 for the item 204. Referring to FIG. 14 as an example, the item tracking device 104 may identify a first cluster 1404A for the first item 204A and a second cluster 1404B for the second item 204B. The first cluster 1404A is associated with (x,y) coordinates 1204A, 1024B, and 1204C and region-of-interest 1304A, 1304C, and 1304E. The second cluster 1404B is associated with (x,y) coordinates 1204D, 1024E, and 1204F and region-of-interest 1304B, 1304D, and 1304F.

Returning to FIG. 11 at operation 1124, the item tracking device 104 outputs the pixels within the first region-of-interest 1304 from the first image 122 and the pixels within the second region-of-interest 1304 from the second image 122. In one embodiment, the item tracking device 104 will crop the captured images 122 by extracting the pixels within identified regions-of-interest 1304 from the images 122. By cropping an image 122, the item tracking device 104 generates a new image 122 that comprises the extracted pixels within a region-of-interest 1304 of the original image 122. This process allows the item tracking device 104 to generate a new set of images 122 for an item 204 that each comprise the extracted pixels from the identified regions-of-interest 1304 that were associated with the item 204. The item tracking device 104 may output the new images 122 for the item 204 for additional processing. For example, the item tracking device 104 may output the images 122 by inputting or loading them into a machine learning model 126 to identify the item 204 based on the physical attributes of the item 204 in the images 122 using a process similar to process 2300 that is described in FIG. 23.

In some embodiments, the item tracking device 104 may also associate any identified feature descriptors with the images 122 for the item 204 and output the feature descriptors with the images 122 of the item 204. For example, while determining the region-of-interest 1304 for an item 204, the item tracking device 104 may identify an item type for the item 204. In this example, the item tracking device 104 may associate the item type with the region-of-interest 1304 and output the item type with the image 122 of the item 204 that is generated based on the region-of-interest 1304. As another example, the item tracking device 104 may obtain a weight for the item 204 using the weight sensor 122. In this example, the item tracking device 104 may associate the weight with the region-of-interest 1304 and output the weight with the image 122 of the item 204 that is generated based on the region-of-interest 1304. In other examples, the item tracking device 104 may be configured to identify and associate any other suitable type of feature descriptors with a region-of-interest 1304 before outputting the region-of-interest 1304.

Search Space Reduction Process for an Encoded Vector Library

Figure 15:
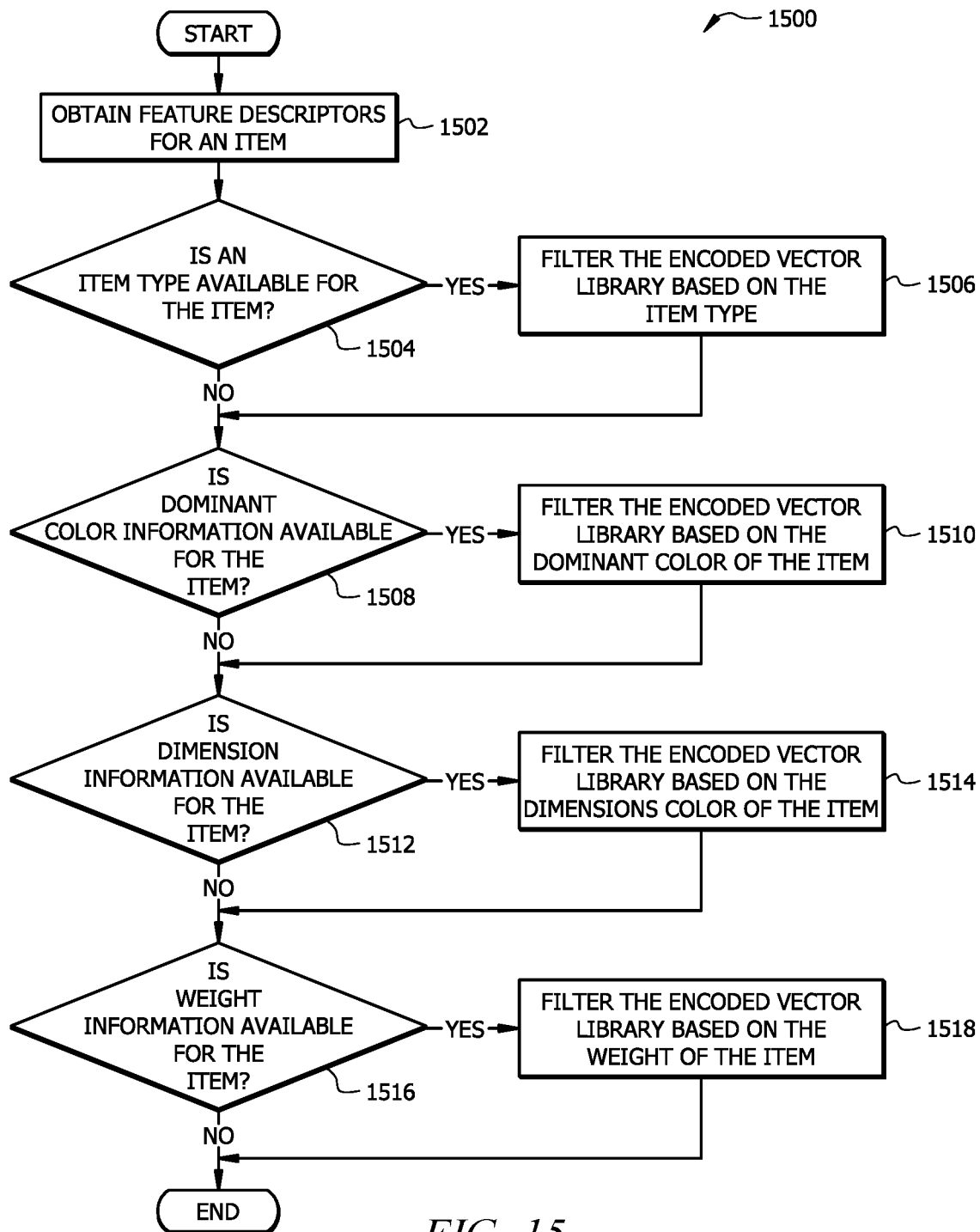
FIG. 15 is a flowchart of an embodiment of a search space reduction process for an encoded vector library.

FIG. 15 is a flowchart of an embodiment of a search space reduction process 1500 for an encoded vector library 128. The item tracking system 100 may employ process 1500 to filter the entries 1602 in the encoded vector library 128 to reduce the amount of items 204 that are considered when attempting to identify an item 204 that is placed on the platform 202. This process reduces the amount of time required to search for a corresponding entry 1602 in the encoded vector library 128 as well as improves the accuracy of the results from identifying an entry 1602 in the encoded vector library 128.

At operation 1502, the item tracking device 104 obtains feature descriptors 1608 for an item 204. Each of the feature descriptors 1608 describes the physical characteristics or attributes of an item 204. Examples of feature descriptors 1608 include, but are not limited to, an item type 1610, a dominant color 1612, dimensions 1614, weight 1616, or any other suitable type of descriptor that describes an item 204. In one embodiment, the item tracking device 104 may obtain feature descriptors using a process similar to the process described in operation 1104 of FIG. 11. For example, the item tracking device 104 may employ object detection and/or OCR to identify text, logos, branding, colors, barcodes, or any other features of an item 204 that can be used to identify the item 204. In some embodiments, the item tracking device 104 may determine the dimensions of the item 204 using a process similar to process 1800 that is described in FIG. 18. The item tracking device 104 may determine the weight of the item 204 using a weight sensor 112. In other embodiments, the item tracking device 104 may use any other suitable process for determining feature descriptors for the item 204.

At operation 1504, the item tracking device 104 determines whether the feature descriptors 1608 identify an item type 1610 for the item 204. Here, the item tracking device 104 determines whether any information associated with an item type 1610 for the item 204 is available. An item type 1610 identifies a classification for the item 204. For instance, an item type 1610 may indicate whether an item 204 is a can, a bottle, a box, a fruit, a bag, etc. The item tracking device 104 proceeds to operation 1506 in response to determining that the feature descriptors 1608 identify an item type 1610 for the item 204. In this case, the item tracking device 104 uses the item type 1610 to filter the encoded vector library 128 to reduce the number of entries 1602 in the encoded vector library 128 before attempting to identify the item 204.

At operation 1506, the item tracking device 104 filters the encoded vector library 128 based on the item type 1610. Referring to FIG. 16 as an example, the encoded vector library 128 comprises a plurality of entries 1602. Each entry 1602 corresponds with a different item 204 that can be identified by the item tracking device 104. Each entry 1602 may comprise an encoded vector 1606 that is linked with an item identifier 1604 and a plurality of feature descriptors 1608. An encoded vector 1606 comprises an array of numerical values. Each numerical value corresponds with and describes an attribute (e.g. item type, size, shape, color, etc.) of an item 204. An encoded vector 1606 may be any suitable length. For example, an encoded vector 1606 may have a size of 1×256, 1×512, 1×1024, or any other suitable length. The item identifier 1604 uniquely identifies an item 204. Examples of item identifiers 1604 include, but are not limited to, a product name, an SKU number, an alphanumeric code, a graphical code (e.g. a barcode), or any other suitable type of identifier. In this example, the item tracking device 104 uses the item type 1610 to filter out or remove any entries 1602 in the encoded vector library 128 that do not contain the same item type 1610. This process reduces the number of entries 1602 in the encoded vector library 128 that will be considered when identifying the item 204.

Returning to FIG. 15 at operation 1504, the item tracking device 104 proceeds to operation 1508 in response to determining that the feature descriptors 1608 do not identify an item type 1610. In this case, the item tracking device 104 checks for other types of feature descriptors 1608 that can be used to filter the entries 1602 in the encoded vector library 128. At operation 1508, the item tracking device 104 determines whether the feature descriptors 1608 identify a dominant color 1612 for the item 204. A dominant color 1612 identifies one or more colors that appear on the surface (e.g. packaging) of an item 204.

The item tracking device 104 proceeds to operation 1510 in response to determining that the feature descriptors 1608 identify a dominant color 1612 for the item 204. In this case, the item tracking device 104 proceeds to operation 1510 to reduce the number of entries 1602 in the encoded vector library 128 based on the dominant color 1612 of the item 204. At operation 1510, the item tracking device 104 filters the encoded vector library 128 based on the dominant color 1612 of the item 204. Here, the item tracking device 104 uses the dominant color 1612 to filter out or remove any entries 1602 in the encoded vector library 128 that do not contain the same dominant color 1612.

Returning to operation 1508, the item tracking device 104 proceeds to operation 1512 in response to determining that the feature descriptors 1608 do not identify a dominant color 1612 for the item 204. At operation 1512, the item tracking device 104 determines whether the feature descriptors 1608 identify dimensions 1614 for the item 204. The dimensions 1614 may identify the length, width, and height of an item 204. In some embodiments, the dimensions 1614 may be listed in ascending order.

The item tracking device 104 proceeds to operation 1514 in response to determining that the feature descriptors 1608 identify dimensions 1614 for the item 204. In this case, the item tracking device 104 proceeds to operation 1514 to reduce the number of entries 1602 in the encoded vector library 128 based on the dimensions 1614 of the item 204. At operation 1514, the item tracking device 104 filters the encoded vector library 128 based on the dimensions 1614 of the item 204. Here, the item tracking device 104 uses the dimensions 1614 to filter out or remove any entries 1602 in the encoded vector library 128 that do not contain the same dimensions 1614 as the item 204 or within a predetermined tolerance of the dimensions 1614 of the item 204. In some embodiments, this dimensions 1614 of the item 204 may be listed in ascending order to make the comparison easier between the dimensions 1614 of the item 204 and the dimensions 1614 of the item 204 in the encoded vector library 128.

Returning to operation 1512, the item tracking device 104 proceeds to operation 1516 in response to determining that the feature descriptors 1608 do not identify dimensions 1614 for the item 204. At operation 1516, the item tracking device 104 determines whether the feature descriptors 1608 identify a weight 1616 for the item 204. The weight 1616 identifies the weight of an item 204. The weight 1616 may be in pounds, ounces, litters, or any other suitable units.

The item tracking device 104 proceeds to operation 1518 in response to determining that the feature descriptors 1608 identify a weight 1616 for the item 204. In this case, the item tracking device 104 proceeds to operation 1518 to reduce the number of entries 1602 in the encoded vector library 128 based on the weight 1616 of the item 204.

At operation 1518, the item tracking device 104 filters the encoded vector library 128 based on the weight of the item 204. Here, the item tracking device 104 uses the weight 1616 to filter out or remove any entries 1602 in the encoded vector library 128 that do not contain the same weight 1616 as the item 204 or within a predetermined tolerance of the weight 1616 of the item 204.

In some embodiments, the item tracking device 104 may repeat a similar process to filter or reduce the number of entries 1602 in the encoded vector library 128 based on any other suitable type or combination of feature descriptors 1608.

Similarity Vectors

Figure 17:
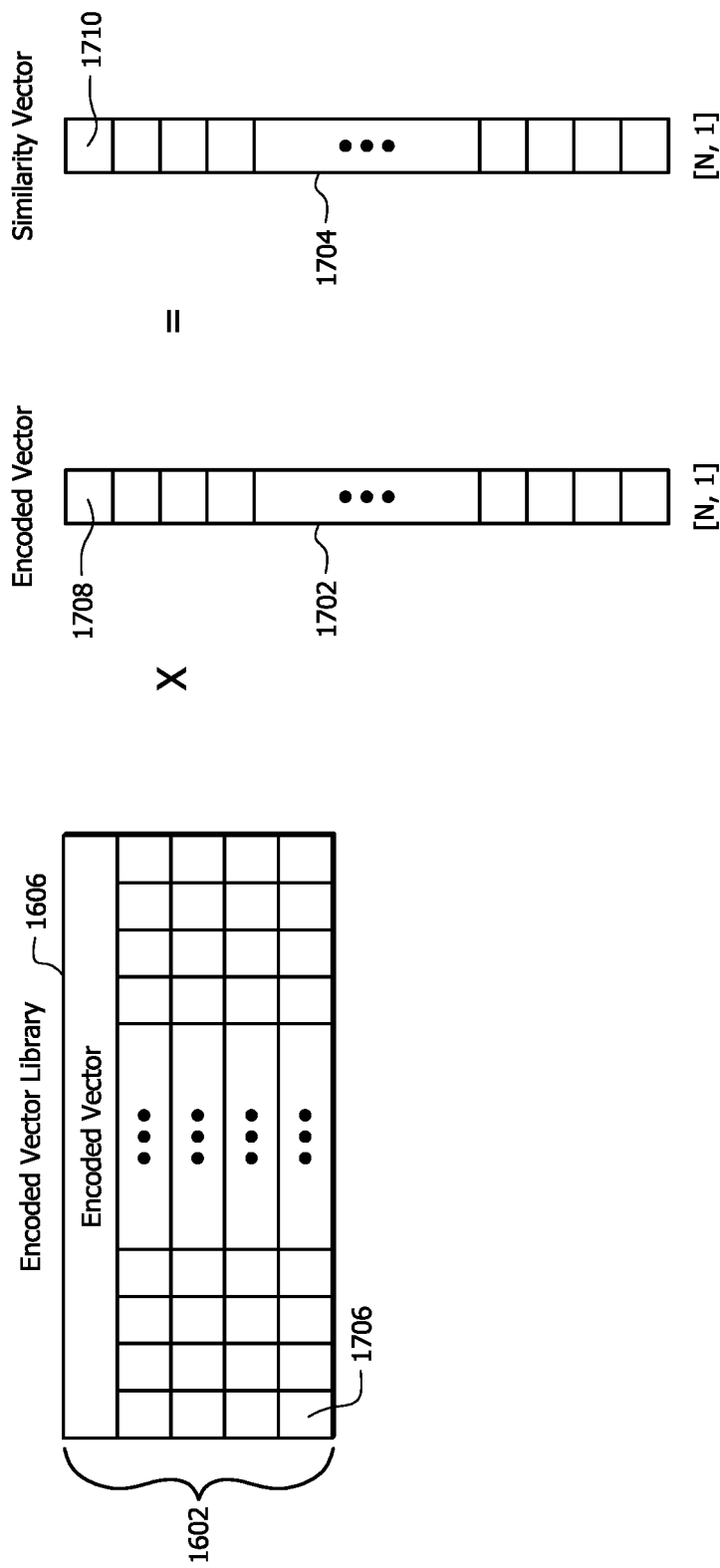
FIG. 17 is an example of a process for generating a similarity vector between an encoded vector and entries in the encoded vector library.

After filtering the encoded vector library 128 based on the feature descriptors 1608 of the item 204, the item tracking device 104 may generate a similarity vector 1704 for a received encoded vector 1702. A similarity vector 1704 comprises an array of numerical values 1710 where each numerical value 1710 indicates how similar the values in the received encoded vector 1702 are to the values in an encoded vector 1606 in the encoded vector library 128. In one embodiment, the item tracking device 104 may generate the similarity vector 1704 by using matrix multiplication between the received encoded vector 1702 and the encoded vectors 1606 in the encoded library 128. Referring to FIG. 17 as an example, the dimensions of the encoded vectors 1606 in the encoded vector library 128 may be M-by-N, where M is the number of entries 1602 in the encoded vector library 128, for example, after filtering the encoded vector library 128, and N is the length of each encoded vector 1606, which corresponds with the number of numerical values 1706 in an encoded vector 1606. The encoded vector 1702 for an unidentified item 204 may have the dimensions of N-by-1 where is N is the length of the encoded vector 1702, which corresponds with the number of numerical values 1708 in the encoded vector 1702. In this example, the item tracking device 104 may generate the similarity vector 1704 by performing matrix multiplication between the encoded vector 1702 and the encoded vectors 1606 in the encoded vector library 128. The resulting similarity vector 1704 has the dimensions of N-by-1 where N is the length of the similarity vector 1704 which is the same length as the encoded vector 1702. Each numerical value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, or entries 1602, in the encoded vector library 128 most closely matches the encoded vector 1702 for the identified item 204. In one embodiment, the entry 1602 that is associated with the highest numerical value 1710 in the similarity vector 1704 corresponds is the entry 1602 that closest matches the encoded vector 1702 for the item 204. After identifying the entry 1602 from the encoded vector library 128 that most closely matches the encoded vector 1702 for the identified item 204, the item tracking device 104 may then identify the item identifier 1604 that is associated with the identified entry 1602. Through this process, the item tracking device 104 is able to determine which item 204 from the encoded vector library 128 corresponds with the unidentified item 204 based on its encoded vector 1702. The item tracking device 104 then output or use the identified item identifier 1604 for other processes such as process 2300 that is described in FIG. 23.

Item Dimensioning Process Using Point Cloud Information

Figure 18:
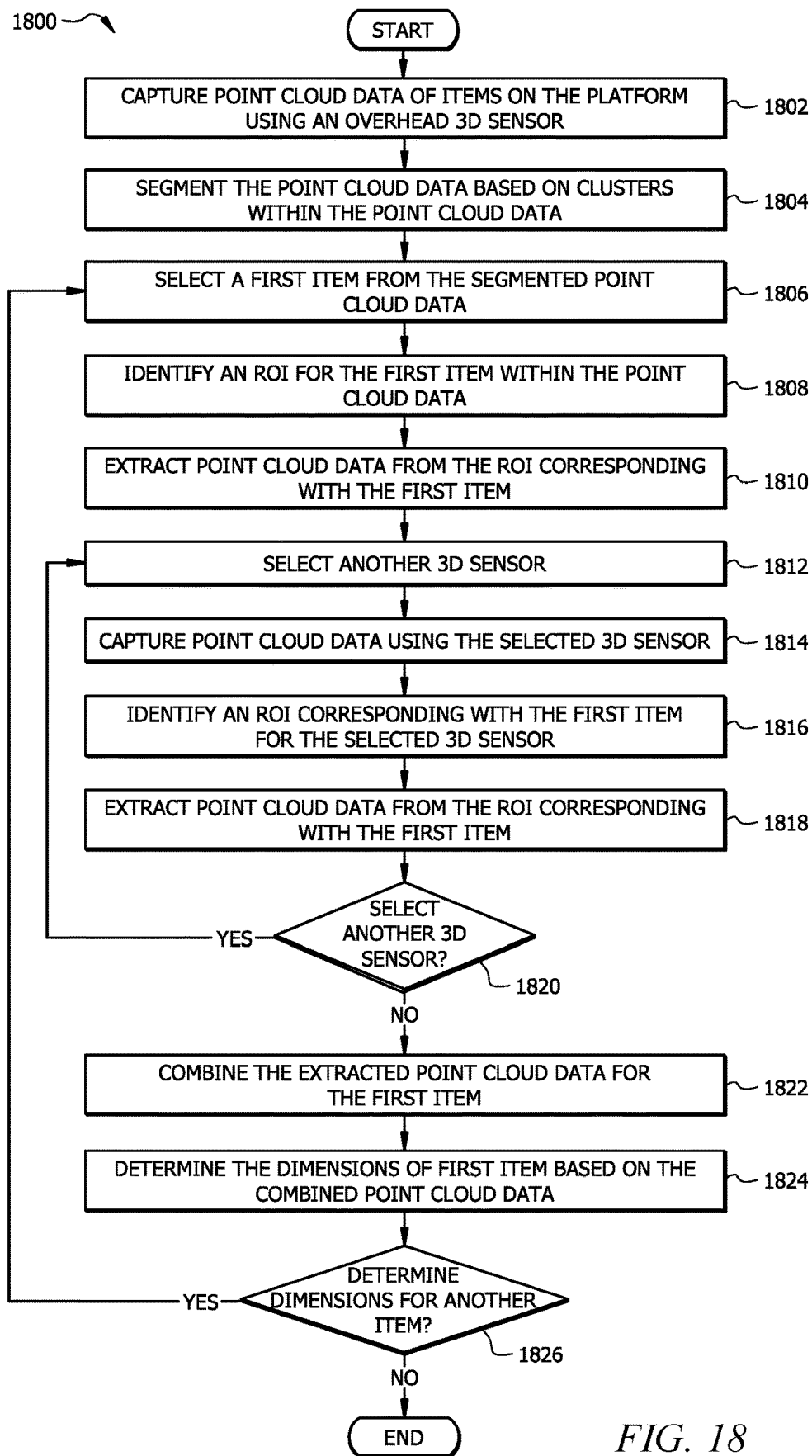
FIG. 18 is a flowchart of an embodiment of item dimensioning process using point cloud information.

FIG. 18 is a flowchart of an embodiment of an item dimensioning process 1800 using point cloud information. The item tracking system 100 may employ process 1800 to determine the dimensions 1614 of an item 204 that is placed on the platform 202. This process generally involves first capturing 3D point cloud data for an item 204 using multiple 3D sensors 110 and then combining the 3D point cloud data from all of the 3D sensors 110 to generate a more complete point cloud representation of the item 204. After combining the point cloud data from the 3D sensors 110, the item tracking device 104 then determines the dimensions 1614 of the item 204 based on the new point cloud data representation. This process allows the item tracking device 104 to determine the dimensions 1614 of an item 204 without having a user take physical measurements of the item 204.

Figure 19:
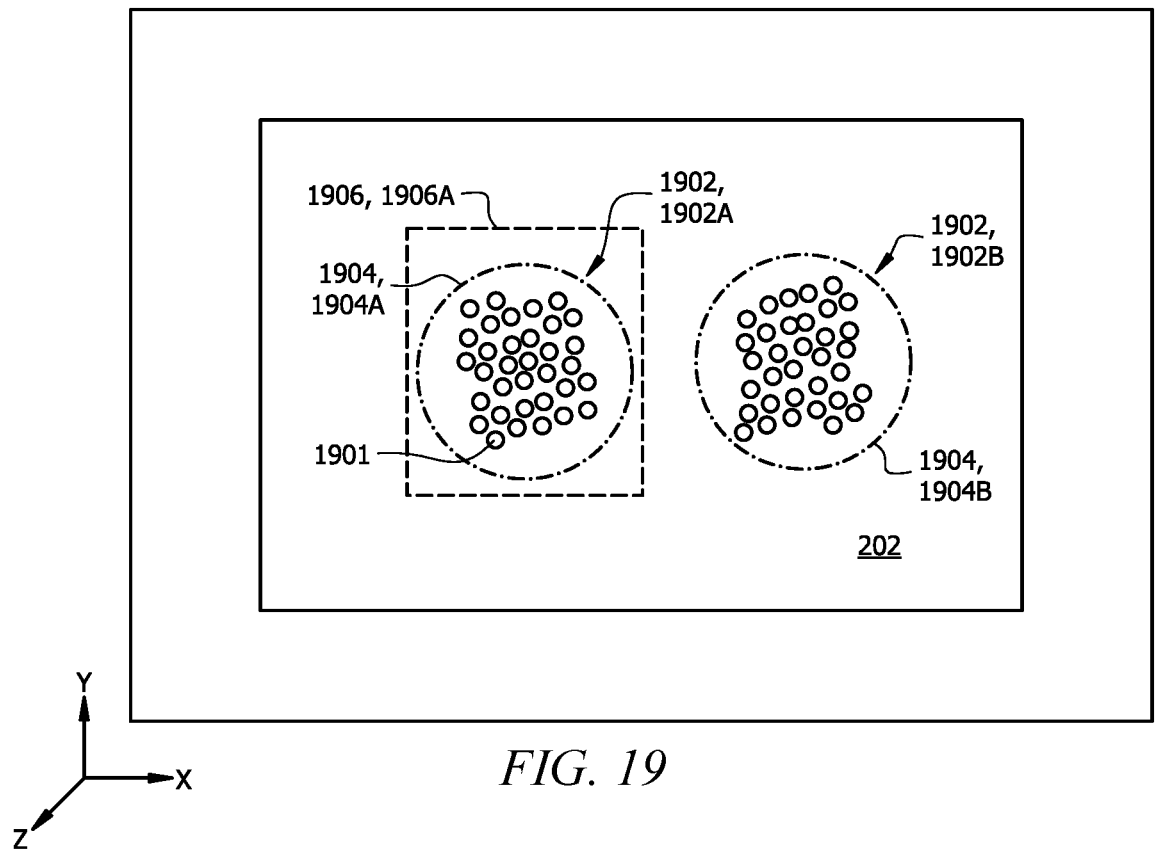
FIG. 19 is an example of an overhead view of point cloud data from a 3D sensor for items on the platform of the imaging device.

At operation 1802, the item tracking device 104 captures point cloud data 1902 of items 204 on the platform 202 using an overhead 3D sensor 110. The point cloud data 1902 comprises a plurality of data points 1901 within a 3D space. Each data point 1901 is associated with an (x, y, z) coordinate that identifies the location of the data point 1901 within the 3D space. In general, the point cloud data 1902 corresponds with the surfaces of objects that are visible to the 3D sensor 110. Referring to FIG. 19 as an example, FIG. 19 illustrates an example of point cloud data 1902 that is captured using an overhead 3D sensor 110. In this example, the 3D sensor 110 is positioned directly above the platform 202 and is configured to capture point cloud data 1902 that represents upward-facing surfaces of the items 204 on the platform 202. The 3D sensor 110 captures point cloud data 1902A that corresponds with a first item 204 and point cloud data 1902B that corresponds with a second item 204.

Returning to FIG. 18 at operation 1804, the item tracking device 104 segments the point cloud data 1902 based on clusters 1904 within the point cloud data 1902. In one embodiment, the item tracking device 104 may identify clusters 1904 within the point cloud data 1902 based on the distance between the data points 1901 in the point cloud data 1902. For example, the item tracking device 104 may use a distance threshold value to identify data points 1901 that are members of the same cluster 1904. In this example, the item tracking device 104 may compute the Euclidian distance between pairs of data points 1901 to determine whether the data points 1901 should be members of the same cluster 1904. For instance, when a pair of data points 1901 are within the distance threshold value from each other, the item tracking device 104 may associate the data points 1901 with the same cluster 1904. When the distance between a pair of data points 1901 is greater than the distance threshold value, the item tracking device 104 determines that the data points 1901 are not members of the same cluster 1904. The item tracking device 104 may repeat this process until one or more clusters 1904 have been identified within the point cloud data 1902. In other examples, the item tracking device 104 may cluster the data points 1901 using k-means clustering or any other suitable clustering technique. After identifying clusters 1904 within the point cloud data 1902, the item tracking device 104 segments the point cloud data 1902 based on the identified clusters 1904. Segmenting the point cloud data 1902 splits the data points 1901 in the point cloud data 1902 into smaller groups of point cloud data 1902 based on the identified clusters 1904. Each cluster 1904 of data points 1901 corresponds with a different item 204 that is placed on the platform 202.

At operation 1806, the item tracking device 104 selects a first item 204 from the segmented point cloud data 1902. Here, the item tracking device 104 identifies one of the items 204 on the platform 202 to begin aggregating the point cloud data 1902 from other 3D sensors 110 that are associated with the first item 204. The item tracking device 104 may iteratively select each item 204 from the platform 202. Returning to the example in FIG. 19, the item tracking device 104 may select a first item 204 that corresponds with cluster 1904A.

Returning to FIG. 18 at operation 1808, the item tracking device 104 identifies a region-of-interest 1906 for the first item 204 within the point cloud data 1902. The region-of-interest 1906 identifies a region within the 3D space. For example, the region-of-interest 1906 may define a range of x-values, y-values, and/or z-values within the 3D space. Returning to the example in FIG. 19, the item tracking device 104 may identify a region-of-interest 1906A that contains the point cloud data 1902A for the first item 204. In this example, the item tracking device 104 identifies the range of x-values, y-values, and z-values within the 3D space that contains the point cloud data 1902A.

Returning to FIG. 18 at operation 1810, the item tracking device 104 extracts point cloud data 1902 from the identified region-of-interest 1906. Here, the item tracking device 104 identifies and extracts the point cloud data 1902 from within the region-of-interest 1906 for the first item 204. By extracting the point cloud data 1902 within the region-of-interest 1906, the item tracking device 104 is able to isolate the data points 1901 for the first item 204 in the point cloud data 1902 from the data points 1901 that are associated with other items 204 on the platform 202. Returning to the example in FIG. 19, the item tracking device 104 may extract the data points 1901 (i.e. point cloud data 1902A) within the region-of-interest 1906A from the point cloud data 1902 for all the items 204 on the platform 202.

Returning to FIG. 18 at operation 1812, the item tracking device 104 selects another 3D sensor 110. After extracting point cloud data 1902 for the first item 204 from the overhead 3D sensor 110, the item tracking device 104 may repeat the same process to extract additional point cloud data 1902 for the first item 204 from the perspective of other 3D sensors 110. Each 3D sensor 110 is only able to capture point cloud data 1902 for the portion of the first item 204 that is visible to the 3D sensor 110. By capturing point cloud data 1902 from multiple 3D sensors 110 with different views of the first item 204, the item tracking device 104 is able to generate a more complete point cloud data representation of the first item 204. The item tracking device 104 may iteratively select a different 3D sensor 110 from among the 3D sensors 110 of the imaging device 102.

Figure 20:
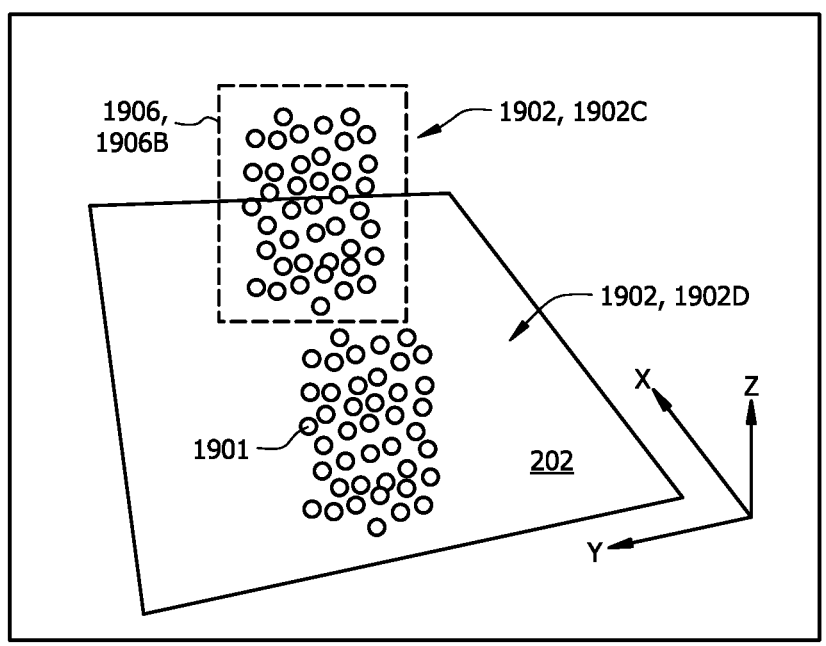
FIG. 20 is an example of a perspective view of point cloud data from a 3D sensor for items on the platform of the imaging device.

At operation 1814, the item tracking device 104 captures point cloud data 1902 using the selected 3D sensor 110. Here, the item tracking device 104 uses a process similar to the process described in operation 1802 to capture point cloud data 1902 using the selected 3D sensor 110. Referring to FIG. 20 as an example, the item tracking device 104 may select a 3D sensor 110 that has a side perspective view of the items 204 on the platform 202. In other words, the selected 3D sensor 110 captures point cloud data 1902 that represents side-facing surfaces of the items 204 on the platform 202. In this example, the 3D sensor 110 captures point cloud data 1902C that corresponds with the first item 204 and point cloud data 1902D that corresponds with the second item 204.

Returning to FIG. 18 at operation 1816, the item tracking device 104 identifies a region-of-interest 1906 corresponding with the first item 204 for the selected 3D sensor 110. In one embodiment, the item tracking device 104 may use a homography 608 to determine the region-of-interest 1906 for the selected 3D sensor 110 based on the region-of-interest 1906 identified by the overhead 3D sensor 110. In this case, the item tracking device 104 may identify a homography 608 that is associated with the selected 3D sensor 110. The homography 608 is configured similarly to as described in FIGS. 12A and 12B. After identifying the homography 608 that is associated with the 3D sensor 110, the item tracking device 104 uses the homography 608 to convert the range of x-values, y-values, and z-values within the 3D space that are associated with the region-of-interest 1906 for the overhead 3D sensor 110 to a corresponding range of x-values, y-values, and z-values within the 3D space that are associated with the selected 3D sensor 110. In other examples, the item tracking device 104 may use any other suitable technique for identifying a region-of-interest 1906 for the first item 204. For example, the item tracking device 104 may use a process similar to the process described in operation 1808. Returning to the example in FIG. 20, the item tracking device 104 identifies a region-of-interest 1906B that contains the point cloud data 1902C for the first item 204. In this example, the item tracking device 104 identifies the range of x-values, y-values, and z-values within the 3D space that contains the point cloud data 1902C.

Returning to FIG. 18 at operation 1818, the item tracking device 104 extracts point cloud data 1902 from the region-of-interest 1906 corresponding with the first item 204. Here, the item tracking device 104 identifies and extracts the point cloud data 1902 from within the identified region-of-interest 1906 for the first item 204. Returning to the example in FIG. 20, the item tracking device 104 may extract the data points 1901 (i.e. point cloud data 1902C) within the region-of-interest 1906B from the point cloud data 1902 for all the items 204 on the platform 202.

Returning to FIG. 18 at operation 1820, the item tracking device 104 determines whether to select another 3D sensor 110. Here, the item tracking device 104 determines whether to collect additional point cloud data 1902 for the first item 204. In one embodiment, the item tracking device 104 may determine whether to select another 3D sensor 110 based on the amount of point cloud data 1902 that has been collected. For example, the item tracking device 104 may be configured to collect point cloud data 1902 from a predetermined number (e.g. three) of 3D sensors 110. In this example, the item tracking device 104 may keep track of how many sets of point cloud data 1902 have been collected. Each set of collected point cloud data 1902 corresponds with point cloud data 1902 that has been obtained from a 3D sensor 110. The item tracking device 104 then compares the number of collected sets of point cloud data 1902 to the predetermined number of 3D sensors 110. The item tracking device 104 determines to select another 3D sensor 110 when the number of collected sets of point cloud data 1902 is less than the predetermined number of 3D sensors 110.

As another example, the item tracking device 104 may determine whether to select another 3D sensor 110 to collect additional point cloud data 1902 based on the number of data points 1901 that have been collected for the first item 204. In this example, the item tracking device 104 may determine the number of data points 1901 that have been obtained from all of the extracted point cloud data 1902 for the first item 204. The item tracking device 104 compares the number of obtained data points 1901 to a predetermined data point threshold value. The data threshold value identifies a minimum number of data points 1901 that should be collected for the first item 204. The item tracking device 104 determines to select another 3D sensor 110 when the number of collected data points 1901 is less than the predetermined data point threshold value. In other examples, the item tracking device 104 may determine whether to select another 3D sensor 110 to collect additional point cloud data 1902 based on any other suitable type of criteria.

Figure 21:
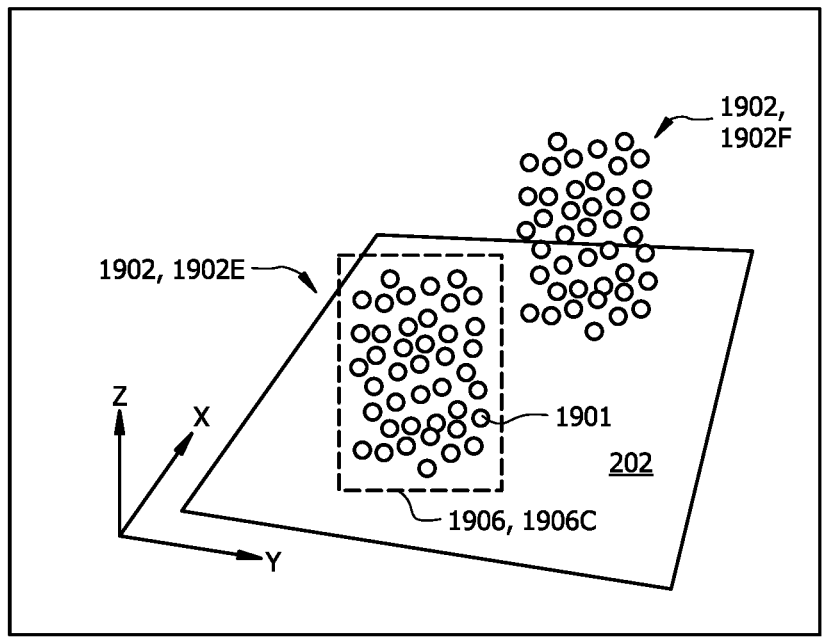
FIG. 21 is another example of a perspective view of point cloud data from a 3D sensor for items on the platform of the imaging device.

The item tracking device 104 returns to operation 1812 in response to determining to select another 3D sensor. In this case, the item tracking device 104 returns to operation 1812 to select another 3D sensor 110 and to obtain additional point cloud data 1902 for the first item 204. Referring to FIG. 21 as an example, the item tracking device 104 may determine to select another 3D sensor 110 that has a side perspective view of the items 204 on the platform 202. In this example, the 3D sensor 110 captures point cloud data 1902E that corresponds with the first item 204 and point cloud data 1902F that corresponds with the second item 204. The item tracking device 104 then identifies a region-of-interest 1906C that contains the point cloud data 1902E for the first item 204. In this example, the item tracking device 104 identifies the range of x-values, y-values, and z-values within the 3D space that contains the point cloud data 1902E. After identifying the region-of-interest 1906C, the item tracking device 104 extracts the data points 1901 (i.e. point cloud data 1902E) within the region-of-interest 1906C from the point cloud data 1902 for all the items 204 on the platform 202. The item tracking device 104 may repeat this process for any other selected 3D sensors 110.

Figure 22:
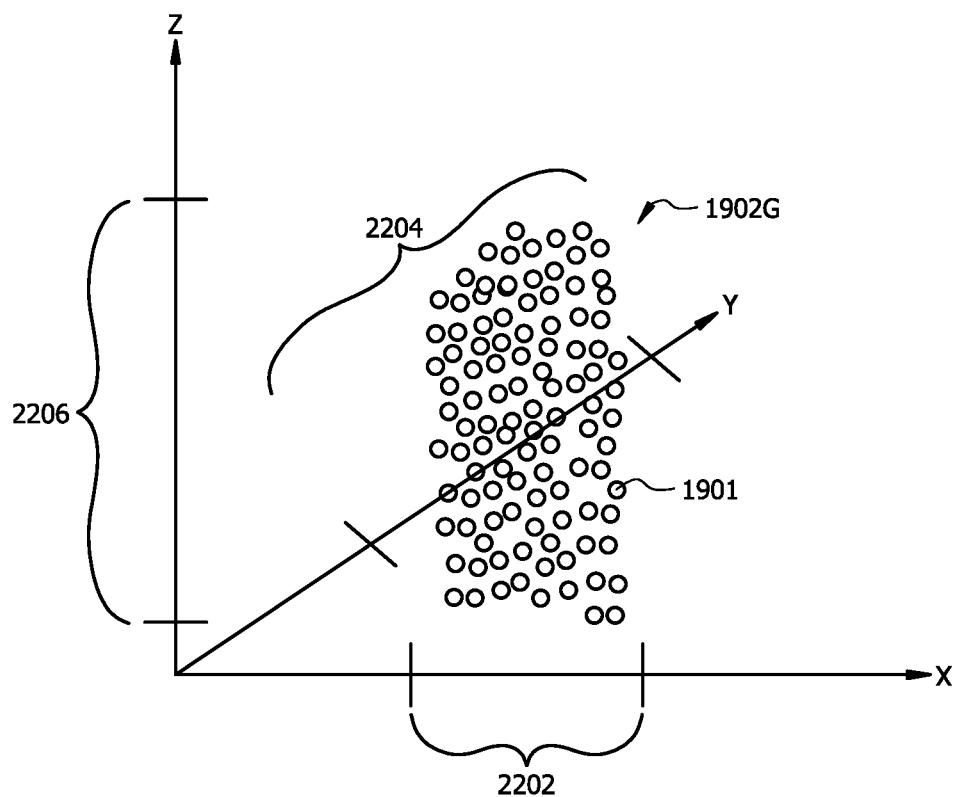
FIG. 22 is example of combined point cloud data for an item from multiple 3D sensors.

Returning to FIG. 18 at operation 1820, the item tracking device 104 proceeds to operation 1822 in response to determining to not select another 3D sensor 110. At operation 1822, the item tracking device 104 combines the extracted point cloud data 1902 for the first item 204. Here, the item tracking device 104 merges all of the collected point cloud data 1902 into a single set of point cloud data 1902. By combining the point cloud data 1902 from multiple 3D sensors 110, the item tracking device 104 can generate a more complete point cloud data representation of the first item 204 that can be used for determining the dimensions 1614 of the first item 204. Referring to FIG. 22 as an example, the item tracking device 104 may combine point cloud data 1902A, 1902C, and 1902E into a single set of point cloud data 1902G. The combined point cloud data 1902G contains all of the data points 1901 from point cloud data 1902A, 1902C, and 1902E.

Returning to FIG. 18 at operation 1824, the item tracking device 104 determines the dimensions 1614 of the first item 204 based on the combined point cloud data 1902. In one embodiment, the item tracking device 104 may determine the dimensions 1614 of the item 204 by determining the distance between data points 1901 at the edges of the combined point cloud data 1902. For example, the item tracking device 104 may identify a pair of data points 1901 on opposing ends of the combined point cloud data 1902 and then compute the distance (e.g. Euclidean distance) between the pair of data points 1901. In this example, the distance between the data points 1901 may correspond with the length 2202, width 2204, or height 2206 of the first item 204. In other examples, the item tracking device 104 may determine the dimensions 1614 of the first item 204 using any other suitable technique. Returning to the example in FIG. 22, the item tracking device 104 may determine a length 2202, a width 2204, and a height 2206 for the first item 204 based on the combined point cloud data 1902G.

Returning to FIG. 18 at operation 1826, the item tracking device 104 determines whether to determine the dimensions 1614 for another item 204. In one embodiment, the item tracking device 104 may be configured to determine the dimensions 1614 for all of the items 204 that are on the platform 202. In this case, the item tracking device 104 may determine whether the dimensions 1614 for all of the items 204 on the platform 202 have been determined. The item tracking device 104 will determine the dimensions 1614 for another item 204 when the dimensions 1614 of an item 204 are still unknown and have not yet been determined. In other examples, the item tracking device 104 may determine whether to determine the dimensions 1614 for another item 204 based on any other suitable criteria.

The item tracking device 104 returns to operation 1806 in response to determining to find the dimensions 1614 for another item 204. In this case, the item tracking device 104 returns to operation 1806 to collect point cloud data 1902 for a different item 204. The item tracking device 104 may then repeat the same process of aggregating point cloud data 1902 from multiple 3D sensors 110, combining the point cloud data 1902, and then determining the dimensions 1614 of the item 204 based on the combined point cloud data 1902.

In response to determining not to determine the dimensions 1614 for another item 204, the item tracking device 104 may store the dimensions 1614 for the first item 204. For example, the item tracking device 104 may obtain an item identifier 1604 for the first item 204 and then generate an entry 1602 in the encoded vector library 128 that associates the determined length 2202, width 2204, and height 2206 with the first item 204 as feature descriptors 1608. In some embodiments, the item tracking device 104 may store the length 2202, width 2204, and height 2206 for the first item 204 in ascending order when generating the entry 1602.

In other embodiments, the item tracking device 104 may output or store the determined length 2202, width 2204, and height 2206 for the first item 204 as feature descriptors 1608 for other processes such as item identification. For instance, the item tracking device 104 may use the feature descriptors 1608 to help identify the first item 204 using a process similar to process 2300 that is described in FIG. 23.

An Item Tracking Process Using Encoded Vectors

FIG. 23 is a flowchart of an embodiment of an item tracking process 2300 for using encoded vectors 1606 for the item tracking system 100. The item tracking system 100 may employ process 2300 to identify items 204 that are placed on the platform 202 of an imaging device 102 and to assign the items 204 to a particular user. As an example, the item tracking system 100 may employ process 2300 within a store to add items 204 to a user's digital cart for purchase. As another example, the item tracking system 100 may employ process 2300 within a warehouse or supply room to check out items to a user. In other examples, the item tracking system 100 may employ process 2300 in any other suitable type of application where items 204 are assigned or associated with a particular user. This process allows the user to obtain items 204 from a space without having the user scan or otherwise identify the items 204 they would like to take.

At operation 2302, the item tracking device 104 performs auto-exclusion for the imaging device 102. The item tracking device 104 may perform auto-exclusion using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 to capture reference images 122 and reference depth images 124, respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values between subsequent depth images 124 and the reference depth image 124 and/or differences in the pixel values between subsequent images 122 and the reference image 122.

At operation 2304, the item tracking device 104 determines whether a hand has been detected above the platform 202. In one embodiment, the item tracking device 104 may use a process similar to process 700 that is described in FIG. 7 for detecting a triggering event that corresponds with a user's hand being detected above the platform 202. For example, the item tracking device 104 may check for differences between a reference depth image 124 and a subsequent depth image 124 to detect the presence of an object above the platform 202. The item tracking device 104 then checks whether the object corresponds with a user's hand or an item 204 that is placed on the platform 202. The item tracking device 104 determines that the object is a user's hand when a first portion of the object (e.g. a user's wrist or arm) is outside a region-of-interest 802 for the platform 202 and a second portion of the object (e.g. a user's hand) is within the region-of-interest 802 for the platform 202. When this condition is met, the item tracking device 104 determines that a user's hand has been detected above the platform 202. In other examples, the item tracking device 104 may use proximity sensors, motion sensors, or any other suitable technique for detecting whether a user's hand has been detected above the platform 202.

The item tracking device 104 remains at operation 2304 in response to determining that a user's hand has not been detected above the platform 202. In this case, the item tracking device 104 remains at operation 2304 to keep checking for the presence of a user's hand as a triggering event. The item tracking device 104 proceeds to operation 2306 in response to determining that a user's hand has been detected. In this case, the item tracking device 104 uses the presence of a user's hand as a triggering event and proceeds to operation 2306 to begin identifying any items 204 that the user has placed on the platform 202.

At operation 2306, the item tracking device 104 performs segmentation using an overhead view of the platform 202. In one embodiment, the item tracking device 104 may perform segmentation using a depth image 124 from a 3D sensor 110 that is configured with overhead or perspective view of the items 204 on the platform 202. In this example, the item tracking device 104 captures an overhead depth image 124 of the items 204 that are placed on the platform 202. The item tracking device 104 may then use a depth threshold value to distinguish between the platform 202 and items 204 that are placed on the platform 202 in the captured depth image 124. For instance, the item tracking device 104 may set a depth threshold value that is just above the surface of the platform 202. This depth threshold value may be determined based on the pixel values corresponding with the surface of the platform 202 in the reference depth images 124 that were captured during the auto-exclusion process in operation 2302. After setting the depth threshold value, the item tracking device 104 may apply the depth threshold value to the captured depth image 124 to filter out or remove the platform 202 from the depth image 124. After filtering the depth image 124, the remaining clusters of pixels correspond with items 204 that are placed on the platform 202. Each cluster of pixels corresponds with a different item 204. After identifying the clusters of pixels for each item 204, the item tracking device 104 then counts the number of items 204 that are placed on the platform 202 based on the number of pixel clusters that are present in the depth image 124. This number of items 204 is used later to determine whether all of items 204 on the platform 202 have been identified.

At operation 2308, the item tracking device 104 captures images 122 of the items 204 on the platform 202. Here, the item tracking device 104 captures multiple images 122 of the items 204 on the platform 202 using multiple cameras 108. For example, the item tracking device 104 may capture images 122 with an overhead view, a perspective view, and/or a side view of the items 204 on the platform 202. The item tracking device 104 may also capture multiple depth images 124 of the items 204 on the platform 202 using one or more 3D sensors 110.

At operation 2310, the item tracking device 104 generates cropped images 122 of the items 204 in each image 122. In one embodiment, the item tracking device 104 generates a cropped image 122 of an item 204 based on the features of the item 204 that are present in an image 122. The item tracking device 104 may first identify a region-of-interest (e.g. a bounding box) for an item 204 based on the detected features of the item 204 that are present in an image 122 and then may crop the image 122 based on the identified region-of-interest. The region-of-interest comprises a plurality of pixels that correspond with the item 204 in a captured image 122 or depth image 124 of the item 204 on the platform 202. The item tracking device 104 may employ one or more image processing techniques to identify a region-of-interest for an item 204 within an image 122 based on the features and physical attributes of the item 204. For example, the item tracking device 104 may employ object detection and/or OCR to identify text, logos, branding, colors, barcodes, or any other features of an item 204 that can be used to identify the item 204. In this case, the item tracking device 104 may process pixels within an image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g. a product name) from an image 122 and may compare the text to a set of text that is associated with different items 204. As another example, the item tracking device 104 may determine a dominant color within an image 122 and may compare the dominant color to a set of colors that are associated with different items 204. As another example, the item tracking device 104 may identify a barcode within an image 122 and may compare the barcode to a set of barcodes that are associated with different items 204. As another example, the item tracking device 104 may identify logos or patterns within the image 122 and may compare the identified logos or patterns to a set of logos or patterns that are associated with different items 204. In other examples, the item tracking device 104 may identify any other suitable type or combination of features and compare the identified features to features that are associated with different items 204.

After comparing the identified features of the item 204 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within an image 122 match the features of an item 204, the item tracking device 104 may identify a region-of-interest that corresponds with the matching item 204.

After identifying a region-of-interest for the item 204, the item tracking device 104 crops the image 122 by extracting the pixels within the region-of-interest for the item 204 from the image 122. By cropping the image 122, the item tracking device 104 generates a second image 122 that comprises the extracted pixels within the region-of-interest for the item 204 from the original image 122. This process allows the item tracking device 104 to generate a new image 122 that contains an item 204 that is on the platform 202. The item tracking device 104 repeats this process for all of the items 204 within a captured image 122 and all of the captured images 122 of the items 204 on the platform 202. The result of this process is a set of cropped images 122 that each correspond with an item 204 that is placed on the platform 202.

In some embodiments, the item tracking device 104 may use a process similar to process 900 in FIG. 9 to generate the cropped images 122 of the items 204. In some embodiments, operation 2310 may be optional and omitted. For example, operation 2310 may be omitted when the item tracking device 104 detects that only one item 204 is placed on the platform 202.

At operation 2312, the item tracking device 104 obtains an encoded vector 1606 for each item 204. An encoded vector 1606 comprises an array of numerical values. Each numerical value in the encoded vector 1606 corresponds with and describes an attribute (e.g. item type, size, shape, color, etc.) of an item 204. An encoded vector 1606 may be any suitable length. The item tracking device 104 obtains an encoded vector 1606 for each item 204 by inputting each of the images 122 (e.g. cropped images 122) from operation 2310 into the machine learning model 126. The machine learning model 126 is configured to output an encoded vector 1606 for an item 204 based on the features or physical attributes of the item 204 that are present in the image 122 of the item 204. Examples of physical attributes include, but are not limited to, an item type, a size, shape, color, or any other suitable type of attribute of the item 204. After inputting the image 122 of the item 204 into the machine learning model 126, the item tracking device 104 receives an encoded vector 1606 for the item 204. The item tracking device 104 repeats this process to obtain an encoded vector 1606 for each item 204 on the platform 202.

At operation 2314, the item tracking device 104 identifies each item 204 in the encoded vector library 128 based on their corresponding encoded vector 1606. Here, the item tracking device 104 uses the encoded vector 1606 for each item 204 to identify the closest matching encoded vector 1606 in the encoded vector library 128. In some embodiments, the item tracking device 104 may first reduce the search space within the encoded vector library 128 before attempting to identify an item 204. In this case, the item tracking device 104 may obtain or identify feature descriptors 1608 for the item 204 using a process similar to the process described in operation 1104 of FIG. 11. Each of the feature descriptors 1608 describes the physical characteristics of an item 204. Examples of feature descriptors 1608 include, but are not limited to, an item type 1610, a dominant color 1612, dimensions 1614, weight 1616, or any other suitable type of descriptor that describes an item 204. The item tracking device 104 may employ object detection and/or OCR to identify text, logos, branding, colors, barcodes, or any other features of an item 204 that can be used to identify the item 204. The item tracking device 104 may determine the dimensions of the item 204 using a process similar to process 1800 that is described in FIG. 18. The item tracking device 104 may determine the weight of the item 204 using a weight sensor 112. In other embodiments, the item tracking device 104 may use any other suitable process for determining feature descriptors 1608 for the item 204. After obtaining feature descriptor 1608 for an item 204, the item tracking device 104 may filter or remove the entries 1602 from consideration in the encoded vector library 128 using a process similar to process 1500 in FIG. 15. After filtering the entries 1602 in the encoded vector library 128, the item tracking device 104 may then identify the closest matching encoded vector 1606 in the encoded vector library 128 to the encoded vector 1606 for an unidentified item 204. This process reduces the amount of time required to search for a corresponding entry 1602 in the encoded vector library 128 as well as improves the accuracy of the results from identifying an entry 1602 in the encoded vector library 128.

In one embodiment, the item tracking device 104 identifies the closest matching encoded vector 1606 in the encoded vector library 128 by generating a similarity vector 1704 between the encoded vector 1606 for an unidentified item 204 and the remaining encoded vectors 1606 in the encoded vector library 128. The similarity vector 1704 comprises an array of numerical values 1710 where each numerical value 1710 indicates how similar the values in the encoded vector 1606 for the item 204 are to the values in an encoded vector 1606 in the encoded vector library 128. In one embodiment, the item tracking device 104 may generate the similarity vector 1704 by using a process similar to the process described in FIG. 17. In this example, the item tracking device 104 uses matrix multiplication between the encoded vector 1606 for the item 204 and the encoded vectors 1606 in the encoded vector library 128. Each numerical value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, or entries 1602, in the encoded vector library 128 most closely matches the encoded vector 1606 for the item 204. In one embodiment, the entry 1602 that is associated with the highest numerical value 1710 in the similarity vector 1704 corresponds is the entry 1602 that most closely matches the encoded vector 1606 for the item 204. After identifying the entry 1602 from the encoded vector library 128 that most closely matches the encoded vector 1606 for the item 204, the item tracking device 104 may then identify the item identifier 1604 from the encoded vector library 128 that is associated with the identified entry 1602. Through this process, the item tracking device 104 is able to which item 204 from the encoded vector library 128 corresponds with the item 204 based on its encoded vector 1606. The item tracking device 104 then outputs the identified item identifier 1604 for the identified item 204. For example, the item tracking device 104 may output the identified item identifier 1604 for the identified item 204 by adding the item identifier 1604 to a list of identified items 204 that is on a graphical user interface. The item tracking device 104 repeats this process for all of the encoded vectors 1606 that were obtained in operation 2312.

At operation 2316, the item tracking device 104 determines whether all of the items 204 have been identified. Here, the item tracking device 104 determines whether the number of identified items 204 matches the number of items 204 that were detected on the platform 202 in operation 2306. The item tracking device 104 determines that all of the items 204 have been identified when the number of identified items 204 matches the number of items 204 that were detected on the platform 202. Otherwise, the item tracking device 104 determines that one or more items 204 have not been identified when the number of identified items 204 does not match the number of items 204 that were detected on the platform 202.

Figure 24:
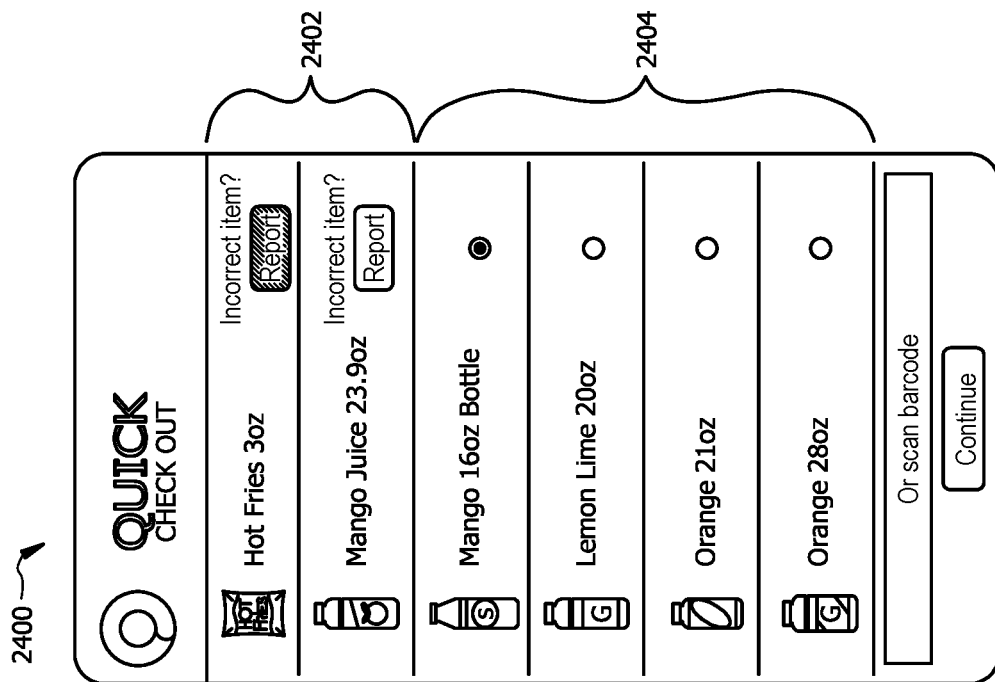
FIG. 24 is an example of a graphical user interface displaying items that are detected on the platform of the imaging device.

The item tracking device 104 proceeds to operation 2318 in response to determining that one or more items 204 have not been identified. In this case, the item tracking device 104 proceeds to operation 2318 to ask the user to identify the one or more items 204 that have not been identified. At operation 2318, the item tracking device 104 outputs a prompt requesting the user to identify one or more items 204 on the platform 202. In one embodiment, the item tracking device 104 may request for the user to identify an item 204 from among a set of similar items 204. Referring to FIG. 24 as an example, the item tracking device 104 may output a screen 2400 that displays items 204 that were detected (shown as display elements 2402) as well as any items 204 that were not identified. In this example, the screen 2400 displays the recommendations (shown as display elements 2404) for other similar items 204 in the event that an item 204 is not identified. In one embodiment, the item recommendations may correspond with other items 204 that were identified using the similarity vector 1704. For example, the item recommendations may comprise items 204 that are associated with the second and third highest values in the similarity vector 1704. The user may provide a user input to select the any items 204 that were not identified.

Figure 25:
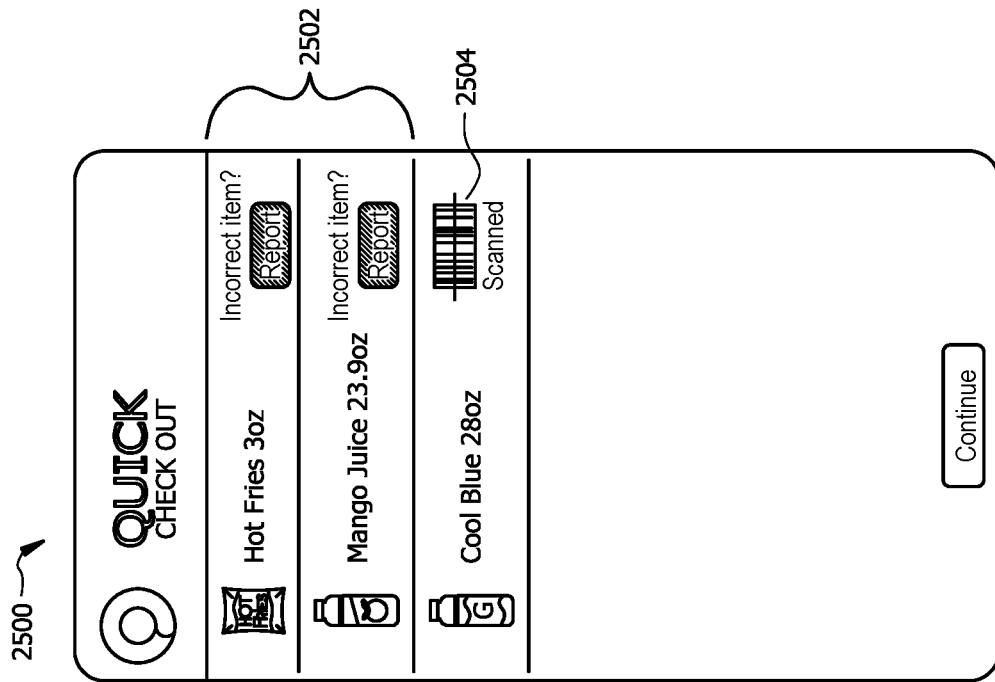
FIG. 25 is another example of a graphical user interface displaying items that are detected on the platform of the imaging device.

In some embodiments, the item tracking device 104 may prompt the user scan any items 204 that were not identified. For example, the item tracking device 104 may provide instructions for the user to scan a barcode of an item 204 using a barcode scanner. In this case, the item tracking device 104 may use the graphical user interface to display a combination of items 204 that were detected on the platform 202 as well as items 204 that were manually scanned by the user. Referring to FIG. 25 as an example, the item tracking device 104 may output a screen 2500 that displays items 204 (shown as display elements 2502) that were detected on the platform 202 and items 204 (shown as display elements 2504) that were manually scanned by the user.

Returning to FIG. 23 at operation 2316, the item tracking device 104 proceeds to operation 2320 in response to determining that all of the items 204 have been identified. At operation 2320, the item tracking device 104 determines whether there are any additional items 204 to detect for the user. In some embodiments, the user may provide a user input that indicates that the user would like to add additional items 204 to the platform 202. In other embodiments, the item tracking device 104 may use the presence of the user's hand removing and adding items 204 from the platform 202 to determine whether there are additional items 204 to detect for the user. The item tracking device 104 returns to operation 2304 in response to determining that there are additional items 204 to detect. In this case, the item tracking device 104 returns to operation 2304 to begin detecting additional items 204 that the user places on the platform 202. The item tracking device 104 proceeds to operation 2322 in response to determining that there are no additional items 204 to detect for the user. In this case, the item tracking device 104 proceeds to operation 2322 to associate the detected items 204 with the user.

Figure 26:
FIG. 26 is an example a graphical user interface displaying a confirmation message for removing an item from the platform of the imaging device.

Before associating the items 204 with the user, the item tracking device 104 may allow the user to remove one or more items 204 from the list of identified items 204 by selecting the items 204 on the graphical user interface. Referring to FIG. 26 as an example, the item tracking device 104 may receive a user input that identifies an item 204 to remove from the list of identified items 204 and output a screen 2600 that confirms that the user would like to remove the item 204. This feature allows the user to edit and finalize the list of detected items 204 that they would like to purchase.

Returning to FIG. 23 at operation 2322, the item tracking device 104 associates the items 204 with the user. In one embodiment, the item tracking device 104 may identify the user that placed the items 204 on the platform 202. For example, the user may identify themselves using a scanner or card reader that is located at the imaging device 102. Examples of a scanner include, but are not limited to, a QR code scanner, a barcode scanner, an NFC scanner, or any other suitable type of scanner that can receive an electronic code embedded with information that uniquely identifies a person. In other examples, the user may identify themselves by providing user information on a graphical user interface that is located at the imaging device 102. Examples of user information include, but are not limited to, a name, a phone number, an email address, an identification number, an employee number, an alphanumeric code, or any other suitable type of information that is associated with the user.

The item tracking device 104 uses the information provided by the user to identify an account that is associated with the user and then to add the identified items 204 to the user's account. For example, the item tracking device 104 may use the information provided by the user to identify an account within the user account information 120 that is associated with the user. As an example, the item tracking device 104 may identify a digital cart that is associated with the user. In this example, the digital cart comprises information about items 204 that the user has placed on the platform 202 to purchase. The item tracking device 104 may add the items 204 to the user's digital cart by adding the item identifiers 1604 for the identified items 204 to the digital cart. The item tracking device 104 may also add other information to the digital cart that is related to the items 204. For example, the item tracking device 104 may use the item identifiers 1604 to look up pricing information for the identified items 204 from the stored item information 118. The item tracking device 104 may then add pricing information that corresponds with each of the identified items 204 to the user's digital cart.

After the item tracking device 104 adds the items 204 to the user's digital cart, the item tracking device 104 may trigger or initiate a transaction for the items 204. In one embodiment, the item tracking device 104 may use previously stored information (e.g. payment card information) to complete the transaction for the items 204. In this case, the user may be automatically charged for the items 204 in their digital cart when they leave the space. In other embodiments, the item tracking device 104 may collect information from the user using a scanner or card reader that is located at the imaging device 102 to complete the transaction for the items 204. This process allows the items 204 to be automatically added to the user's account (e.g. digital cart) without having the user scan or otherwise identify the items 204 they would like to take. After adding the items 204 to the user's account, the item tracking device 104 may output a notification or summary to the user with information about the items 204 that were added to the user's account. For example, the item tracking device 104 may output a summary on a graphical user interface that is located at the imaging device 102. As another example, the item tracking device 104 may output a summary by sending the summary to an email address or a user device that is associated with the user.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An item tracking system, comprising:
 a memory operable to store an encoded vector library, wherein the encoded vector library comprises a plurality of encoded vectors, wherein:
  each encoded vector comprises an array of numerical values;
  each numerical value describes a physical attribute of a first object based on an image of the first object;
  each encoded vector is associated with an item identifier for the first object; and
  each encoded vector is associated with a plurality of feature descriptors for the first object, wherein the plurality of feature descriptors for the first object describe physical characteristics of the first object;
 a processor operably coupled to the memory, and configured to:
  receive a first encoded vector for a second object, wherein the first encoded vector comprises an array of numerical values that each describe a physical attribute of the second object;
  receive one or more feature descriptors for the second object, wherein the one or more feature descriptors each describe a physical characteristic of the second object;
  remove one or more encoded vectors from the encoded vector library that are not associated with the one or more feature descriptors;
  compare the first encoded vector to encoded vectors in the encoded vector library;
  identify a second encoded vector in the encoded vector library that most closely matches the first encoded vector based on the numerical values within the first encoded vector;
  identify a first item identifier in the encoded vector library that is associated with the second encoded vector; and
  output the first item identifier.

2. The system of claim 1, wherein the one or more feature descriptors identifies an item type for the second object.

3. The system of claim 1, wherein the one or more feature descriptors identifies a dominant color for the second object.

4. The system of claim 1, wherein the one or more feature descriptors identifies dimensions for the second object.

5. The system of claim 1, wherein the one or more feature descriptors identifies a weight for the second object.

6. The system of claim 1, wherein comparing the first encoded vector to encoded vectors in the encoded vector library comprises:
 multiplying the first encoded vector by the encoded vectors in the encoded vector library to generate a similarity vector, wherein:
  the similarity vector comprises a second array of values; and
  each value indicates how similar numerical values in an encoded vector from the encoded vector library is to the numerical values in the first encoded vector.

7. The system of claim 6, wherein multiplying the first encoded vector by the encoded vectors in the filtered encoded vector library to generate the similarity vector is performed using matrix multiplication.

8. A search space reduction method, comprising:
 receiving a first encoded vector for a first object, wherein the first encoded vector comprises an array of numerical values that each describe a physical attribute of the first object;
 receiving one or more feature descriptors for the first object, wherein the one or more feature descriptors each describe a physical characteristic of the first object;
 removing one or more encoded vectors from an encoded vector library that are not associated with the one or more feature descriptors, wherein the encoded vector library comprises a plurality of encoded vectors, wherein:

each encoded vector comprises an array of numerical values;
each numerical value describes a physical attribute of a second object based on an image of the second object;
each encoded vector is associated with an item identifier for the second object; and
each encoded vector is associated with a plurality of feature descriptors for the second object, wherein the plurality of feature descriptors for the second object describe physical characteristics of the second object;
comparing the first encoded vector to encoded vectors in the encoded vector library;
identifying a second encoded vector in the encoded vector library that most closely matches the first encoded vector based on the numerical values within the first encoded vector;
identifying a first item identifier in the encoded vector library that is associated with the second encoded vector; and
outputting the first item identifier.

9. The method of claim 8, wherein the one or more feature descriptors identifies an item type for the second object.

10. The method of claim 8, wherein the one or more feature descriptors identifies a dominant color for the second object.

11. The method of claim 8, wherein the one or more feature descriptors identifies dimensions for the second object.

12. The method of claim 8, wherein the one or more feature descriptors identifies a weight for the second object.

13. The method of claim 8, wherein comparing the first encoded vector to encoded vectors in the encoded vector library comprises:
multiplying the first encoded vector by the encoded vectors in the encoded vector library to generate a similarity vector, wherein:
the similarity vector comprises a second array of values; and
each value indicates how similar numerical values in an encoded vector from the encoded vector library is to the numerical values in the first encoded vector.

14. The method of claim 13, wherein multiplying the first encoded vector by the encoded vectors in the filtered encoded vector library to generate the similarity vector is performed using matrix multiplication.

15. A computer program product comprising executable instructions stored in a non-transitory computer-readable medium that when executed by a processor causes the processor to:
receive a first encoded vector for a first object, wherein the first encoded vector comprises an array of numerical values that each describe a physical attribute of the first object;
receive one or more feature descriptors for the first object, wherein the one or more feature descriptors each describe a physical characteristic of the first object;
remove one or more encoded vectors from an encoded vector library that are not associated with the one or more feature descriptors, wherein the encoded vector library comprises a plurality of encoded vectors, wherein:
each encoded vector comprises an array of numerical values;
each numerical value describes a physical attribute of a second object based on an image of the second object;
each encoded vector is associated with an item identifier for the second object; and
each encoded vector is associated with a plurality of feature descriptors for the second object, wherein the plurality of feature descriptors for the second object describe physical characteristics of the second object;
compare the first encoded vector to encoded vectors in the encoded vector library;
identify a second encoded vector in the encoded vector library that most closely matches the first encoded vector based on the numerical values within the first encoded vector;
identify a first item identifier in the encoded vector library that is associated with the second encoded vector; and
output the first item identifier.

16. The computer program product of claim 15, wherein the one or more feature descriptors identifies an item type for the second object.

17. The computer program product of claim 15, wherein the one or more feature descriptors identifies a dominant color for the second object.

18. The computer program product of claim 15, wherein the one or more feature descriptors identifies dimensions for the second object.

19. The computer program product of claim 15, wherein the one or more feature descriptors identifies a weight for the second object.

20. The computer program product of claim 15, wherein comparing the first encoded vector to encoded vectors in the encoded vector library comprises:
multiplying the first encoded vector by the encoded vectors in the encoded vector library to generate a similarity vector, wherein:
the similarity vector comprises a second array of values; and
each value indicates how similar numerical values in an encoded vector from the encoded vector library is to the numerical values in the first encoded vector.

* * * * *